US009582695B2

(12) United States Patent
Hoppensteadt et al.

(10) Patent No.: US 9,582,695 B2
(45) Date of Patent: *Feb. 28, 2017

(54) COMPUTATIONS USING A POLYCHRONOUS WAVE PROPAGATION SYSTEM

(71) Applicant: New York University, New York, NY (US)

(72) Inventors: Frank C. Hoppensteadt, Carefree, AZ (US); Varun Narendra, Jamaica, NY (US); Eugene M. Izhikevich, San Diego, CA (US)

(73) Assignee: New York University, New York, NY (US)

( * ) Notice: Subject to any disclaimer, the term of this patent is extended or adjusted under 35 U.S.C. 154(b) by 18 days.

This patent is subject to a terminal disclaimer.

(21) Appl. No.: 14/826,963

(22) Filed: Aug. 14, 2015

(65) Prior Publication Data

US 2015/0347796 A1 Dec. 3, 2015

Related U.S. Application Data

(63) Continuation of application No. 13/015,147, filed on Jan. 27, 2011, now Pat. No. 9,110,771, which is a
(Continued)

(51) Int. Cl.
*H04Q 5/22* (2006.01)
*G06K 7/10* (2006.01)
(Continued)

(52) U.S. Cl.
CPC ......... *G06K 7/10366* (2013.01); *G06F 15/00* (2013.01); *G06F 17/11* (2013.01); *G06N 99/00* (2013.01)

(58) Field of Classification Search
CPC ........ G06K 7/00; G06K 7/10; G06K 7/10009; G06K 7/10366; G06F 15/00; G06F 17/11; G06N 99/00
(Continued)

(56) References Cited

U.S. PATENT DOCUMENTS 3,706,096 A * 12/1972 Hammack ............... G01S 1/302
342/103
4,727,370 A 2/1988 Shih
(Continued)

OTHER PUBLICATIONS

Abeles, M., "Local Cortical Circuits: An Electrophysiological Study," Springer, 1982, pp. 5-95.
(Continued)

*Primary Examiner* — George Bugg
*Assistant Examiner* — Anthony D Afrifa-Kyei
(74) *Attorney, Agent, or Firm* — Withrow & Terranova, P.L.L.C.

(57) ABSTRACT

The present invention relates to a polychronous wave propagation system that is based on relative timing between two or more propagated waves through a wave propagation medium. The relative timing may be associated with interference patterns of energy between the propagated waves. Operational behavior of the polychronous wave propagation system is based on the relative timing of the propagated waves and distances between initiators that transmit the propagated waves and responders that receive the propagated waves. The operational behavior may include arithmetical computations, memory storage, Boolean functions, frequency-based computations, or the like. The polychronous wave propagation system relies on time delays between the propagated waves that result from propagation velocities of the propagated waves through the wave propagation medium. By incorporating the time delays into the system, operational capacity may be greatly enhanced.

20 Claims, 52 Drawing Sheets

Related U.S. Application Data continuation-in-part of application No. 12/826,146, filed on Jun. 29, 2010, now abandoned, which is a continuation-in-part of application No. 12/484,615, filed on Jun. 15, 2009, now abandoned.

(60) Provisional application No. 61/061,436, filed on Jun. 13, 2008.

(51) Int. Cl.
  *G06F 15/00* (2006.01)
  *G06F 17/11* (2006.01)
  *G06N 99/00* (2010.01)

(58) Field of Classification Search
  USPC ............... 340/10.1; 708/100, 131, 146, 160
  See application file for complete search history.

(56) References Cited

U.S. PATENT DOCUMENTS

| | | | |
|---|---|---|---|
| 7,728,830 B2 | 6/2010 | Patton | |
| 7,783,584 B1 | 8/2010 | Hoppensteadt | |
| 9,110,771 B2 | 8/2015 | Hoppensteadt et al. | |
| 2002/0149480 A1* | 10/2002 | Shanks | G06K 7/0008 340/572.1 |
| 2005/0204074 A1 | 9/2005 | Gray, III et al. | |
| 2008/0162391 A1 | 7/2008 | Izhikevich | |
| 2008/0217560 A1* | 9/2008 | Rodgers | B23K 26/0078 250/492.2 |
| 2008/0258916 A1* | 10/2008 | Diorio | G06K 7/0008 340/572.1 |
| 2008/0279287 A1* | 11/2008 | Asahina | H04B 1/69 375/242 |
| 2009/0185480 A1 | 7/2009 | Saltsidis | |
| 2009/0254626 A1 | 10/2009 | Ahtisaari | |
| 2010/0176929 A1* | 7/2010 | Ozdemir | H04W 74/06 340/10.4 |
| 2011/0059688 A1* | 3/2011 | Noonan | H04W 8/005 455/1 |
| 2011/0274141 A1 | 11/2011 | Jantunen et al. | |
| 2014/0025716 A1 | 1/2014 | Hoppensteadt et al. | |

OTHER PUBLICATIONS

Afshari, E. et al., "Ultrafast Analog Fourier Transform Using 2-D LC Lattice," IEEE Transactions on Circuits and Systems-I, vol. 55 No. 8, Sep. 2008, pp. 2332-2343.
Bellman, R., et al., "Differential-difference equations," Academic Press, 1963, pp. 98.
Buzsaki, G. "Rhythms of the Brain," Oxford University Press, 2006, 448 pages.
Chua, L.O. et al., "Cellular Neural Network: Theory," IEEE Transactions on Circuits Systems, vol. 35 No. 10, Oct. 1988, pp. 1257-1272.
Constantindis, C. et al., "A Role for Inhibition in Shaping the Temporal Flow of Information in Prefrontal Cortex," Nature Neuroscience, vol. 5, No. 2, Jan. 22, 2002, pp. 175-180.
Engquist, B. et al., "Absorbing Boundary Conditions for the Numerical Simulation of Waves," Mathematics of Computation, American Math Society, vol. 31, No. 139, Jul. 1977, pp. 629-651.
Gerstner, W. et al., "Spike-Timing Dependent Plasticity," Scholarpedia, 5 (2):1362, 2010, Accessed Nov. 14, 2011, 19 pages.
Gurevich, A. G. et al., "Magnetization Oscillations and Waves," CRC Press, 1996, 179-180; 186, 5 pages.
Hopfield, J. J., "Neural Networks and Physical Systems with Emergent Collective Computational Abilities," PNAS, vol. 79, Apr. 1982, pp. 2554-2558.
Hoppensteadt, F. et al, "Propagating Coalitions in Networks of Nonlinear Oscillators," Scientiae Mathematicae Japonicae, International Society for Mathematical Sciences, vol. 64, No. 2, Issue 239, Apr. 29, 2006, 7 pages.
Hoppensteadt, F.C., "An Introduction to the Mathematics of Neurons," 2nd Edition, Cambridge University Press, 1997, pp. 59-61.
Hoppensteadt, F., "Spin Torque Oscillator Neuroanalog of von Neumann's Microwave Computer," presented at Neural Coding 2014, Versailles, France, Oct. 2014, preprint was published in arXiv:1411.1401, 2014, 19 pages.
Izhikevich, E. M. et al., "Polychronous Wavefront Computations," International Journal of Bifurcation and Chaos, vol. 19 No. 5, May 2009, pp. 1733-1739.
Izhikevich, E. M., "Polychronization: Computation With Spikes," Neural Computation, vol. 18, Feb. 2006, pp. 245-282.
Izhikevich, E.M. et al., "Large-Scale Model of Mammalian Thalamocortical Systems," PNAS, vol. 105, No. 9, Mar. 4, 2008, pp. 3593-3598.
Jeffress, L.A., "A Place Theory of Sound Localization," Journal of Comparative and Physiological Psychology, vol. 41, No. 1, Sep. 16, 1947, pp. 35-39.
Girt, R. et al.,"Common-Duty-Ratio Control of Input-Series Connected Modular DC-DC Convertors with Active Input Voltage and Load-Current Sharing," IEEE Transactions on Industry Applications, vol. 42 No. 4, Jul./Aug. 2006, pp. 1101-1111.
Landau, L.D. et al., "On the Theory of the Dispersion of Magnetic Permeability in Ferromagnetic Bodies," Ukrainian Journal of Physics, vol. 53, 2008, pp. 14-22.
Likharev, K.K. et al., "RSFQ Logic/Memory Family: A New Josephson-Junction Technology for Sub-Terahertz-Clock-Frequency Digital Systems," IEEE Transactions on Applied Superconductivity, vol. 1 No. 1, Mar. 1991, pp. 3-28.
McCulloch, W. et al., "A Logical Calculus of Ideas of Immanent in Nervous Activity," Bulletin of Mathematical Biophysics, vol. 5, 1943, pp. 115-133.
Unknown, "Modular Arithmetic," Wikipedia, Accessed Nov. 15, 2011, 8 pages, http://en.wikipedia.org/wiki/Modular_arithmetic.
Rall, W., "Core Conductor Theory and Cable Properties of Neurons," in Handbook of Physiology: Cellular Biology of Neurons edited by Kandel, E. R. et al. American Physiological Society, Bethesda, MD, 1977, pp. 39-97.
Rall, W., "Rall model," revision #61828, Scholarpedia, 2009, vol. 4, No. 4, Accessed May 5, 2011, Web site hosted by Brain Corporation, 19 pages.
Rosenblatt, F, "The Perceptron: A Probabilistic Model of Information Storage and Organization in the Brain," Psychological Review, vol. 65, No. 4, Jul. 1958, pp. 386-408.
Roska, T., "Cellular Wave Computers for Brain-Like Spatial-Temporal Sensory Computing," IEEE Circuits and Systems Magazine, Second Quarter, Jun. 2005, pp. 5-19.
Singer, W., "Binding by Synchrony," Scholarpedia, vol. 2 No. 12, 2007, Accessed May 4, 2011, Revision No. 73618, 11 pages.
Slavin, A., "Theory of Mutual Phase-Locking of Spin-Torque Nano-Sized Oscillators," Physical Review B, Sep. 2006, vol. 74, 104401-1 to 104401-7, 4 pages.
Slavin, A.N. et al., "Nonlinear Spinwaves in One and Two-Dimensional Magnetic Waveguides," Spin Dynamics in Confined Magnetic Structures I, Topics in Applied Physics, Springer 2002, pp. 35-66.
Slonczewski, J. C., "Current-driven excitation of magnetic multilayers," Journal of Magnetism and Magnetic Materials, Jun. 1996, vol. 159, pp. L1-L7, 7 pages.
Swadlow, H.A., "Efferent Neurons and Suspected Interneurons in Motor Cortex of the Awake Rabbit: Axonal Properties, Sensory Receptive Fields, and Subthreshold Synaptic Inputs," Journal of Neurophysiology, vol. 71, No. 2, Feb. 1994, pp. 437-453.
Swadlow, H.A., "Monitoring the Excitability of Neocortial Efferent Neurons to Direct Activation by Extracellular Current Pulses," Journal of Neurophysiology, vol. 68, No. 2, Aug. 1992, pp. 605-619.
Swadlow, H.A., "Physiological Properties of Individual Cerebral Axons Studied in Vivo for as Long as One Year," Journal of Neurophysiology, vol. 54, No. 5, Nov. 1985, pp. 1346-1362.
Whitehead, A.N. et al., "Principia Mathematica," New York: Cambridge University Press, 1957, pp. xv-xvi, 3 pages.
Notice of Allowance for U.S. Appl. No. 13/015,147, mailed Apr. 10, 2015, 8 pages.
Non-final Office Action for U.S. Appl. 12/484,615 mailed Feb. 29, 2012, 12 pages.

(56) References Cited

OTHER PUBLICATIONS

Non-Final Office Action for U.S. Appl. No. 12/826,146, mailed Jun. 5, 2013, 12 pages.
Final Office Action for U.S. Appl. No. 12/826,146, mailed Dec. 31, 2013, 14 pages.
Advisory Action for U.S. Appl. No. 12/826,146, mailed May 1, 2014, 3 pages.
Non-Final Office Action for U.S. Appl. No. 13/015,147, mailed Apr. 24, 2014, 12 pages.
Final Office Action for U.S. Appl. No. 13/015,147, mailed Nov. 14, 2014, 13 pages.

* cited by examiner

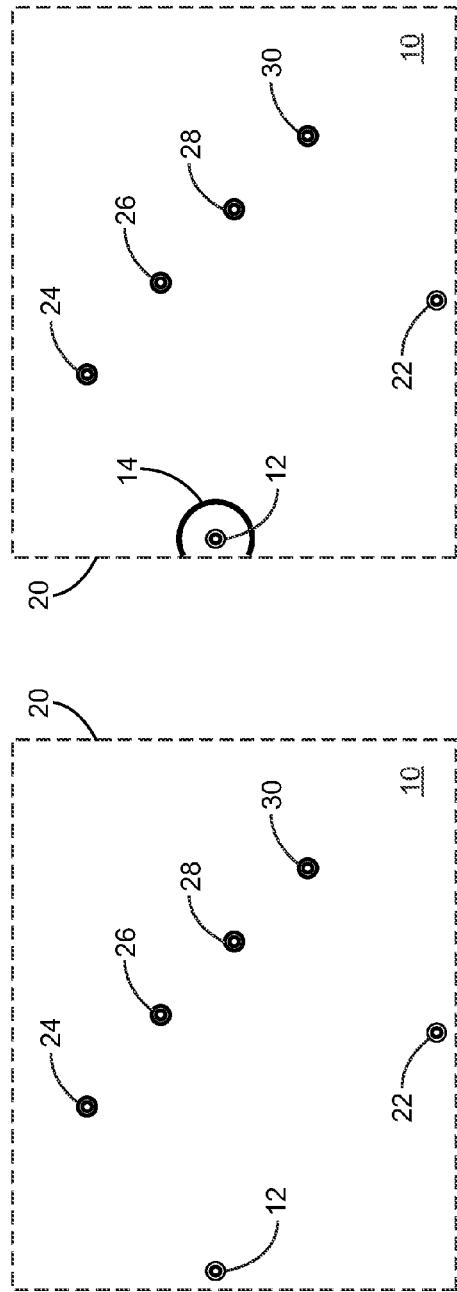
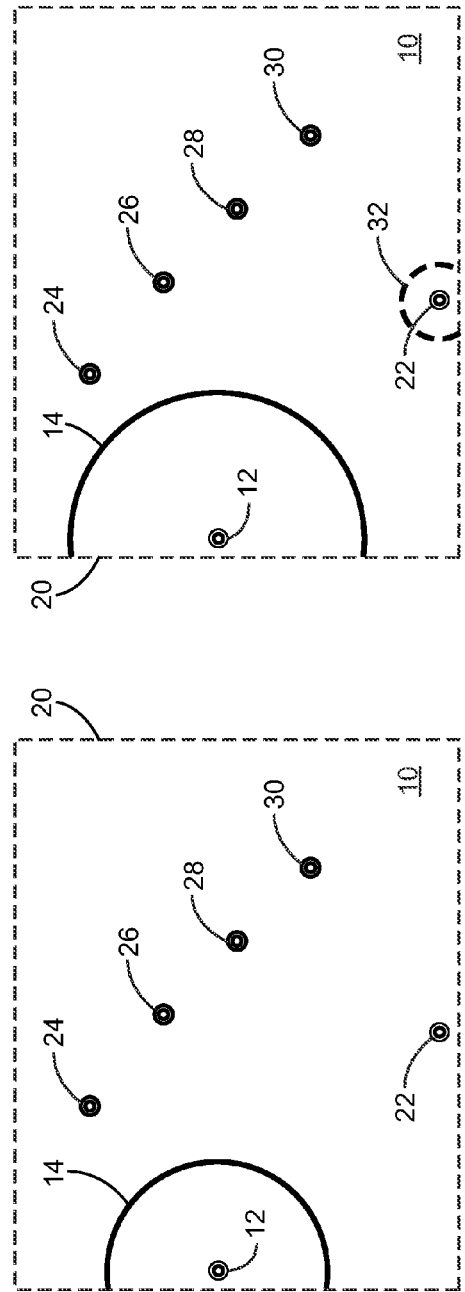
FIG. 2A  FIG. 2B  FIG. 2C  FIG. 2D

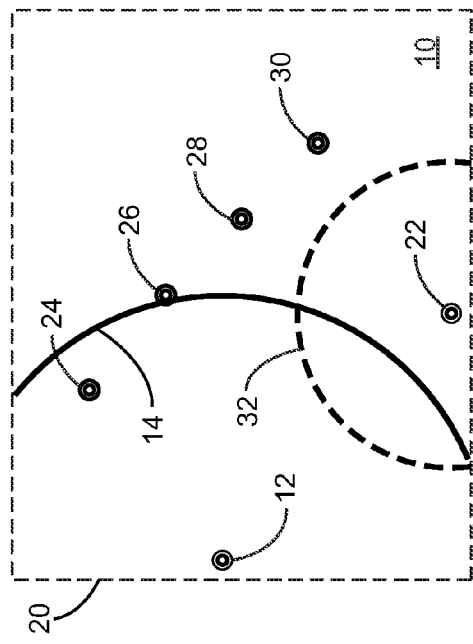
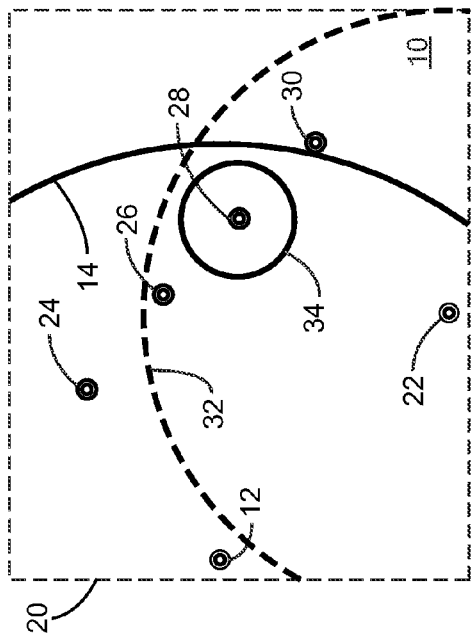
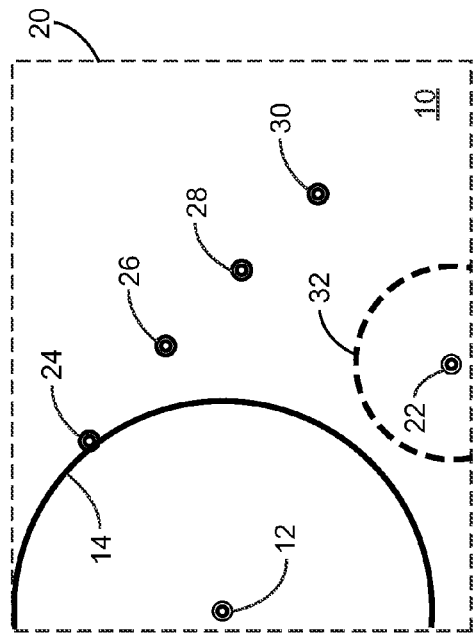
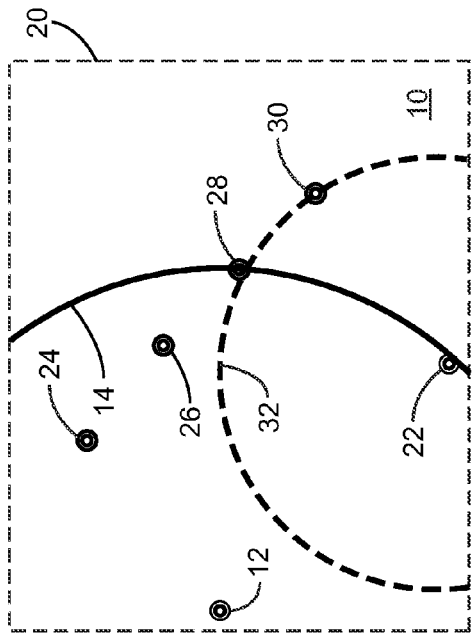
FIG. 2E
FIG. 2F
FIG. 2G
FIG. 2H

FIG. 11A
FIG. 11B
FIG. 11C
FIG. 11D
FIG. 11E
FIG. 11F

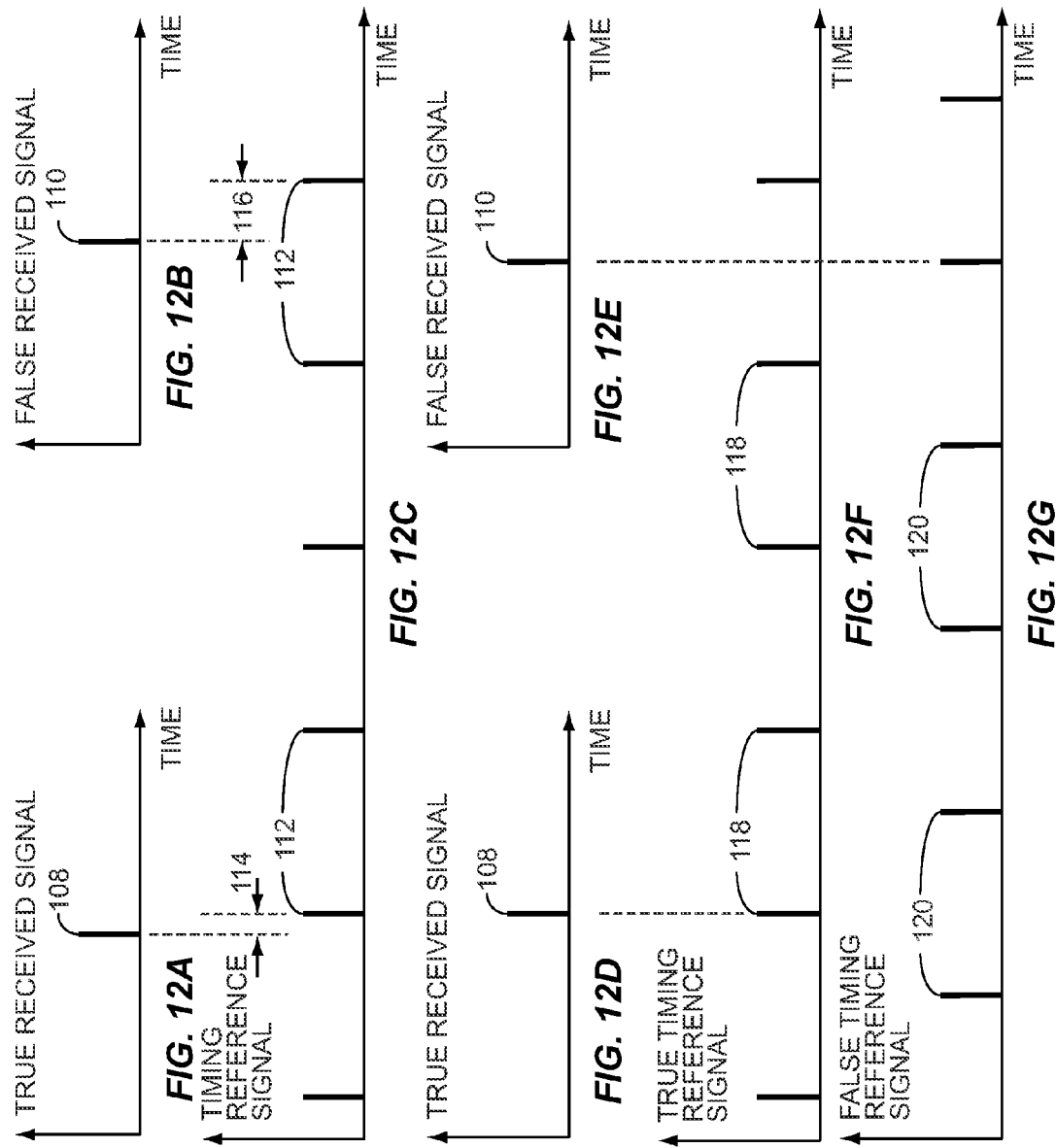

COMPUTATIONS USING A POLYCHRONOUS WAVE PROPAGATION SYSTEM

RELATED APPLICATIONS

The present application is a continuation of U.S. patent application Ser. No. 13/015,147, filed Jan. 27, 2011, now U.S. Pat. No. 9,110,771, entitled "COMPUTATIONS USING A POLYCHRONOUS WAVE PROPAGATION SYSTEM," which is a continuation-in-part of U.S. patent application Ser. No. 12/826,146, filed Jun. 29, 2010, entitled "POLYCHRONOUS WAVE PROPAGATION SYSTEM," which is a continuation-in-part of U.S. patent application Ser. No. 12/484,615, filed Jun. 15, 2009, entitled "POLYCHRONOUS WAVE PROPAGATION SYSTEM," which claims the benefit of U.S. Provisional Patent Application No. 61/061,436, filed Jun. 13, 2008.

All of the applications listed above are hereby incorporated herein by reference in their entireties.

This invention was made with government support under HR0011-07-3-0002 awarded by DARPA. The government may have certain rights in this invention.

FIELD OF THE INVENTION

Embodiments of the present invention relate to autonomous asynchronous computing systems, which relate timing of asynchronous activity signals to one another to perform useful functions, such as memory storage, Boolean functions, frequency-based computations, or the like.

BACKGROUND OF THE INVENTION

In researching theories of the brain, certain operational fundamentals, such as memory registration and recall, associative memory, and pattern recognition, suggest much greater complexity than what the basic underlying physical structure provides. For example, a human brain can store more information than would be expected given the number of synapses in the human brain. Therefore, human brain memory is more than just synaptic memory. Other factors come into play in conjunction with the synapses to store all of the information. Since the brain operates in an autonomous asynchronous environment, one theory is that time delays may be important.

For example, if two neurons fire at a common post synaptic target, their spikes travel along axons to the target, and if their spikes arrive simultaneously at the target, a stronger response may be evoked than if their spikes arrive separately. However, axons have propagation velocities that introduce conduction delays; therefore, both the distances from the neurons to the target and the firing times of the neuron spikes determine when the spikes arrive at their target. The propagation velocity may be about one millimeter per millisecond for myelinated fibers and about one-hundred micrometers per millisecond for non-myelinated fibers. Specifically, if a conduction path from a first neuron to the target is about ten millimeters long and a conduction path from a second neuron to the target is about two millimeters long, the first neuron will have to fire about eight milliseconds before the second neuron fires in order for both spikes to arrive simultaneously.

In general, neurons in spiking networks with conduction delays may fire with certain time-locked asynchronous patterns so that their spikes may arrive at targets simultaneously. The additional dimension of time delays in a brain may significantly increase a brain's capacity to represent and process information. Such an activity may be called polychrony. Polychrony may be derived from poly, meaning many, and chronos, meaning time or clock. With an appropriate type of spike-timing dependent synaptic plasticity, spiking networks may self-organize and generate such polychronous activity, which may have relevance to memory, binding and gamma rhythms, mechanisms of attention, pattern recognition, and the like. Polychronous activity in the brain depends on specificity of synaptic connections, geometry and dimensions of axonal fibers, activity-dependent propagation velocities, dynamics of various neurotransmitters, spike-generation mechanisms of neurons, and other biological factors.

Applying polychronous techniques to physical systems, electronic systems, or both may significantly increase the capacities, the functionalities, or both of such systems. Such systems may operate at much higher frequencies than a brain, which may operate in a frequency range up to about 100 hertz. For example, networks having time delays can encompass greater functionalities than comparable networks without time delays. A dynamic system having a given number of state variables may be represented by a differential equation that has a solution space of the same dimension as the number of state variables. However, when asynchronous time delays are added to the dynamic system, a differential-delay equation that is representative of the dynamic system with delays has an infinite dimensional solution space. Thus, there may be significant benefits from a polychronous physical or electronic system, such as arithmetical computations.

SUMMARY OF THE EMBODIMENTS

The present invention relates to a polychronous wave propagation system that is based on relative timing between two or more propagated waves through a wave propagation medium. The relative timing may be associated with interference patterns of energy between the propagated waves. Operational behavior of the polychronous wave propagation system is based on the relative timing of the propagated waves and distances between initiators that transmit the propagated waves and responders that receive the propagated waves. The operational behavior may include arithmetical computations, memory storage, Boolean functions, frequency-based computations, or the like. The polychronous wave propagation system relies on time delays between the propagated waves that result from propagation velocities of the propagated waves through the wave propagation medium. By incorporating the time delays into the system, operational capacity may be greatly enhanced.

In one embodiment of the present invention, the propagated wave may be a pulsed wave lasting just a few cycles. Further, a responder and an initiator may be combined to form a transponder, which may receive two or more propagated waves and initiate a response transmission of a propagated wave based on the relative timing between the received propagated waves. In an exemplary embodiment of the present invention, the response transmission is initiated based on simultaneous reception of the received propagated waves. In general, the relative timing may be associated with interference patterns of energy between the received propagated waves. The transponder may include a controllable oscillator block, which may be controlled based on the responder section of the transponder and may provide a controlled signal upon which the response transmission is based. In one embodiment of the controllable oscillator block, the controllable oscillator block oscillates at a controllable frequency, which may be based on frequencies of received pulsed propagated waves. The initiated transmission may be a pulsed propagated wave that may be at the frequency of the controllable oscillator block.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

FIGS. 2A through 2H show a polychronous wave propagation system, in which asynchronous waves that have timing relationships to one another are transmitted and propagate through the wave propagation medium.

FIGS. 11A through 11F and 12A through 12G illustrate different approaches to defining TRUE and FALSE states, which are used by the polychronous wave propagation system to provide Boolean functionality.

DETAILED DESCRIPTION OF THE PREFERRED EMBODIMENTS

Figure 1A:
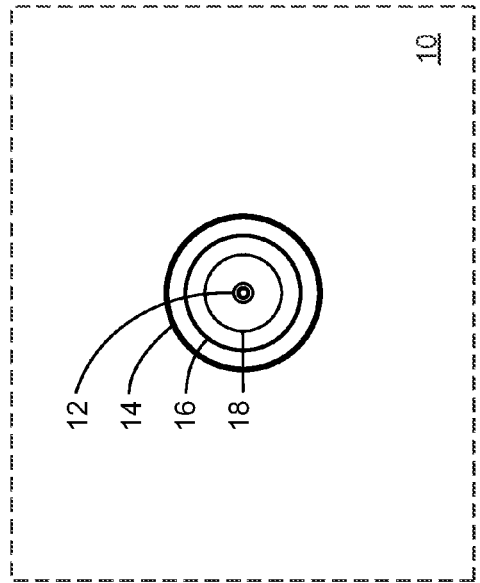
FIGS. 1A through 1D show a first initiator transmitting a first wave that propagates through a wave propagation medium.

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The present invention relates to a polychronous wave propagation system that is based on relative timing between two or more propagated waves through a wave propagation medium. The relative timing may be associated with interference patterns of energy between the propagated waves. Operational behavior of the polychronous wave propagation system is based on the relative timing of the propagated waves and distances between initiators that transmit the propagated waves and responders that receive the propagated waves. The operational behavior may include arithmetical computations, memory storage, Boolean functions, frequency-based computations, or the like. The arithmetical computations may include additions, subtractions, multiplications, divisions, or any combination thereof. Navigation systems may use interference patterns and transponders in a variety of ways. However, embodiments of the present disclosure differ from such systems by using a polychronous wave propagation system that is analogous to polychronous activity in a brain. Further, the polychronous wave propagation system may store the results of computations using reverberating systems.

The polychronous wave propagation system relies on time delays between the propagated waves that result from propagation velocities of the propagated waves through the wave propagation medium. By incorporating the time delays into the polychromous wave propagation system, operational capacity may be greatly enhanced. Functionally, the propagated waves may be used to actuate certain events after certain time delays. As such, the operational behavior may be based on the actuation of the certain events. Computations may be carried out by utilizing interference patterns of activity associated with precisely placed transponders. Reverberating arrays may be used to store results of specific computational tasks.

In one embodiment of the present invention, the propagated wave may be a pulsed wave lasting just a few cycles. Further, a responder and an initiator may be combined to form a transponder, which may receive two or more propagated waves and initiate a response transmission of a propagated wave based on the relative timing between the received propagated waves. In an exemplary embodiment of the present invention, the response transmission is initiated based on simultaneous reception of the received propagated waves. In general, the relative timing may be associated with interference patterns of energy between the received propagated waves. The transponder may include a controllable oscillator block, which may be controlled based on the responder section of the transponder and may provide a controlled signal upon which the response transmission is based. In one embodiment of the controllable oscillator block, the controllable oscillator block oscillates at a controllable frequency, which may be based on frequencies of received pulsed propagated waves. The initiated transmission may be a pulsed propagated wave that may be at the frequency of the controllable oscillator block.

Figure 1B:
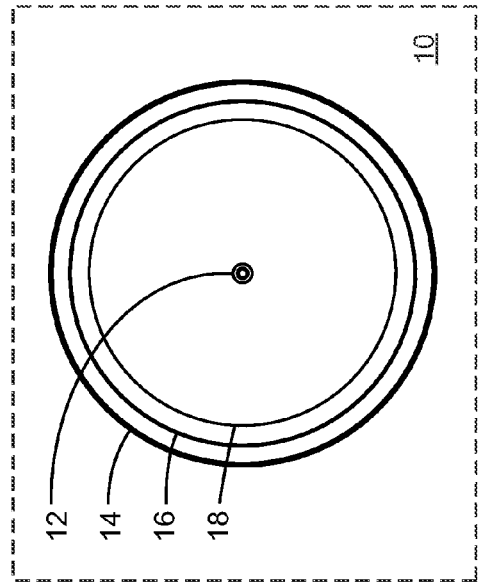
Figure 1C:
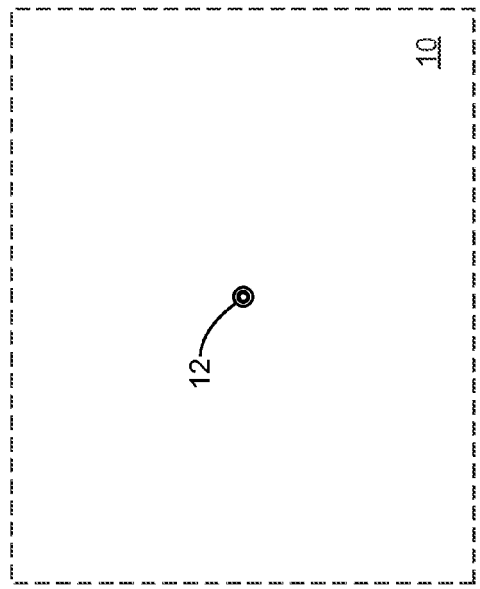
Figure 1D:
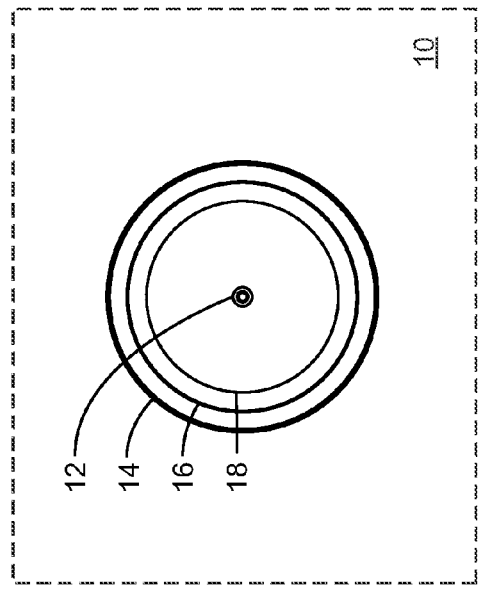

FIGS. 1A, 1B, 1C, and 1D may represent snapshots in time of a first wave propagation medium 10 at zero seconds elapsed time, one second elapsed time, two seconds elapsed time, and three seconds elapsed time, respectively. Behaviors of a polychronous wave propagation system involve propagating waves through the first wave propagation medium 10. To illustrate the behaviors, an analogy of waves on a lake will be used. A smooth surface of a lake may function as the first wave propagation medium 10. A first bobber, which may serve as a first initiator 12, may float on the surface of the lake. At an elapsed time of zero seconds, the first initiator 12 is about to generate a first wave pulse 14 (not shown) as illustrated in FIG. 1A. In the waves on a lake analogy, the first bobber may generate a wave, which may be similar to dropping an object, such as a rock, into the water. The first wave pulse 14 radiates outward in a radial manner from the first initiator 12, as illustrated in FIG. 1B, which is a snapshot at an elapsed time of one second. In the waves on a lake analogy, the first wave pulse 14 may be represented as a leading crest of the wave, which has a maximum height. The leading crest of the wave may be followed by a second crest 16 of lesser height and a third crest 18 of even lesser height. FIG. 1C shows the outward propagation of the wave at an elapsed time of two seconds and FIG. 1D shows the outward propagation of the wave at an elapsed time of three seconds.

FIGS. 2A through 2H show a polychronous wave propagation system 20, in which asynchronous waves that have timing relationships to one another are transmitted and propagate through the first wave propagation medium 10. FIGS. 2A, 2B, 2C, 2D, 2E, 2F, 2G, and 2H may represent snapshots in time of the first wave propagation medium 10 at zero seconds elapsed time, two seconds elapsed time, six seconds elapsed time, eight seconds elapsed time, eleven seconds elapsed time, fourteen seconds elapsed time, eighteen seconds elapsed time, and twenty-two seconds elapsed time, respectively.

The polychronous wave propagation system 20 includes the first initiator 12, which is positioned along an edge of the first wave propagation medium 10, a second initiator 22, which is positioned along another edge of the first wave propagation medium 10, a first transponder 24, a second transponder 26, a third transponder 28, and a fourth transponder 30. The first and the second initiators 12, 22, the first, the second, the third, and the fourth transponders 24, 26, 28, 30 may be carefully located with respect to one another in fixed positions in the first wave propagation medium 10 to produce desired behaviors in the polychronous wave propagation system 20. The first and the second initiators 12, 22 are only capable of transmitting waves, whereas the first, the second, the third, and the fourth transponders 24, 26, 28, 30 are capable of both receiving propagated waves and transmitting waves. In a first exemplary embodiment of the present invention, any of the first, the second, the third, and the fourth transponders 24, 26, 28, 30 transmit a wave in response to receiving two wave pulses simultaneously.

In the waves on a lake analogy, the first and the second initiators 12, 22 may be represented as first and second bobbers, respectively, that are only capable of creating waves in the smooth lake surface. The first, the second, the third, and the fourth transponders 24, 26, 28, 30 may be represented as third, fourth, fifth and sixth bobbers, respectively, that are floating on the smooth lake surface waiting for waves to come along. When any of the third, the fourth, the fifth and the sixth bobbers encounters two simultaneous leading wave crests, which is representative of receiving two wave pulses simultaneously, the simultaneous leading wave crests add to one another, thereby creating a wave height that may be about double the height of an individual leading wave crest. In the first exemplary embodiment of the present invention, the third, the fourth, the fifth and the sixth bobbers are only responsive to about double height wavecrests, thereby transmitting a wave in response.

At an elapsed time of zero seconds, the first initiator 12 is about to generate a first wave pulse 14 (not shown) as illustrated in FIG. 2A. The first wave pulse 14 propagates outward in a radial manner from the first initiator 12, as illustrated in FIG. 2B, which is a snapshot at an elapsed time of two seconds. At an elapsed time of six seconds, the second initiator 22 is about to generate a second wave pulse 32 (not shown) and the first wave pulse 14 continues to propagate outward in a radial manner from the first initiator 12 as illustrated in FIG. 2C. The second wave pulse 32 propagates outward in a radial manner from the second initiator 22 and the first wave pulse 14 continues to propagate outward in a radial manner from the first initiator 12 as illustrated in FIG. 2D, which is a snapshot at an elapsed time of eight seconds. Therefore, the second wave pulse 32 lags the first wave pulse 14 by six seconds. At an elapsed time of eleven seconds, the first wave pulse 14 reaches the first transponder 24; however, since the first transponder 24 is only responsive to simultaneous reception of two wave pulses, the first transponder 24 doesn't respond, and both the first and the second wave pulses 14, 32 continue to propagate outward in a radial manner from the first and the second initiators 12, 22 as illustrated in FIG. 2E.

At an elapsed time of fourteen seconds, the first wave pulse 14 reaches the second transponder 26; however, since the second transponder 26 is only responsive to simultaneous reception of two wave pulses, the second transponder 26 does not respond, and both the first and the second wave pulses 14, 32 continue to propagate outward in a radial manner from the first and the second initiators 12, 22, respectively, as illustrated in FIG. 2F. At an elapsed time of eighteen seconds, both the first and the second wave pulses 14, 32 reach the third transponder 28, and since the third transponder 28 is responsive to simultaneous reception of two wave pulses, the third transponder 28 is about to respond by transmitting a third wave pulse 34 (not shown) as illustrated in FIG. 2G. At an elapsed time of twenty-two seconds, the first, the second, and the third wave pulses 14, 32, 34 propagate outward in a radial manner from the first and the second initiators 12, 22, and the third transponder 28, respectively, as illustrated in FIG. 2H.

The operational behavior of the polychronous wave propagation system 20 is demonstrated by the specific outcome illustrated in FIGS. 2A through 2H, which is an initiation of transmission of the third wave pulse 34 from the third transponder 28 at an elapsed time of eighteen seconds and no response from any of the first, the second, and the fourth transponders 24, 26, 30 is due to the timing relationship between the first and the second wave pulses 14, 32 and the precise physical locations of the first, the second, the third, and the fourth transponders 24, 26, 28, 30, and the first and the second initiators 12, 22 with respect to one another. Any other timing relationship, any other physical arrangement, or both may have significantly affected the outcome.

The first and the second initiators 12, 22 transmitted waves having encoded information. In the waves on a lake analogy, the height of the leading wave crests is the encoded information. Responders in the first, the second, the third, and the fourth transponders 24, 26, 28, 30 receive and detect information based on timing between reception of the encoded information from the first and the second initiators 12, 22. In the waves on a lake analogy, the transponders are only responsive to double height wave crests; therefore, the detected information is based on simultaneous reception of leading wave crests that produces a double height wave.

Figure 3:
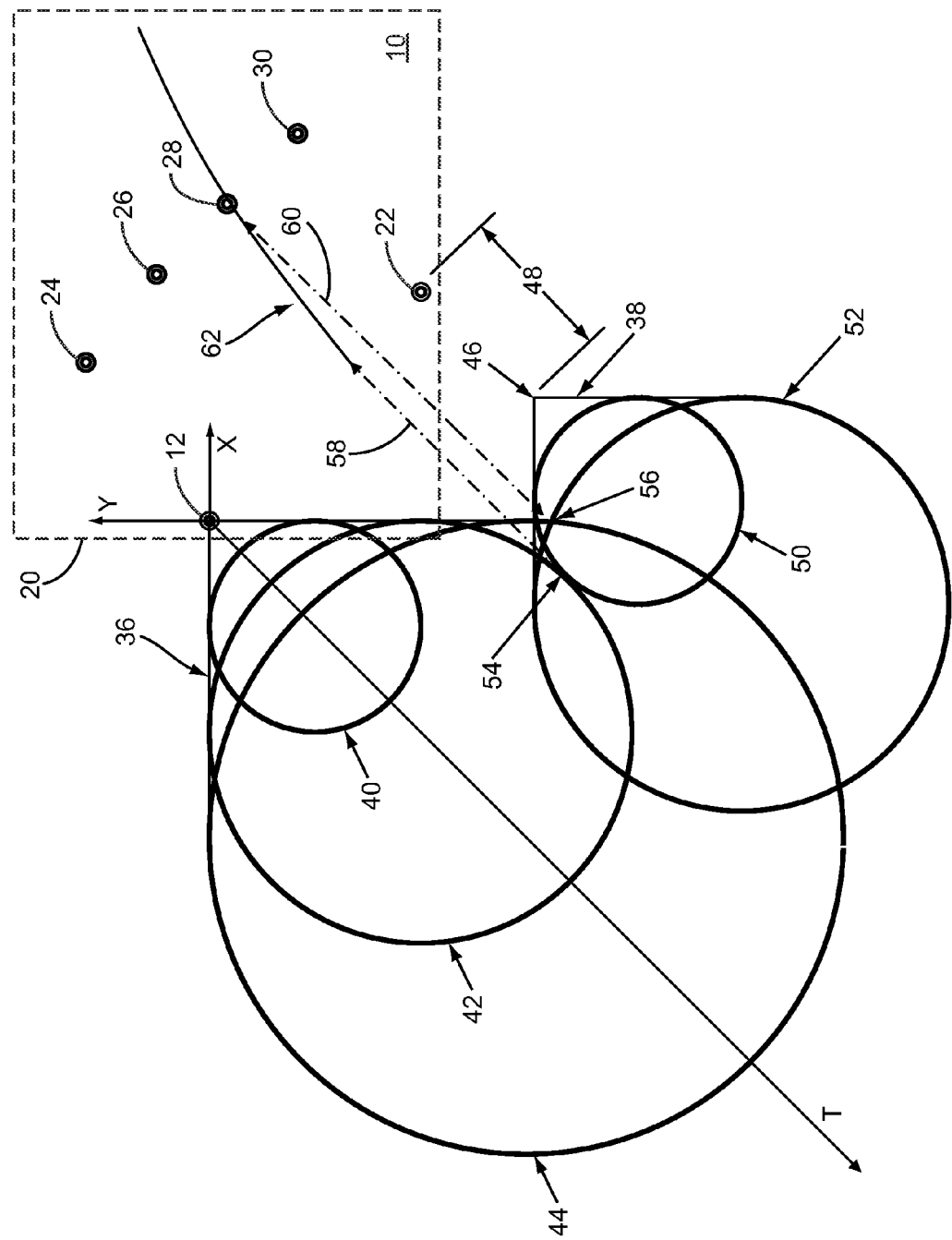
FIG. 3 is a three-dimensional graph showing space-time relationships of the polychronous wave propagation system illustrated in FIGS. 2A through 2H.

FIG. 3 is a three-dimensional graph showing space-time relationships of the polychronous wave propagation system 20 illustrated in FIGS. 2A through 2H. The purpose of the three-dimensional graph is to simultaneously illustrate relationships between the physical locations of the devices and the timing relationships between the wave pulses to help understand the operational behavior of the polychronous wave propagation system 20. The three-dimensional graph includes X, Y, and T axes. The first wave propagation medium 10 is overlaid on the X-Y plane with the origin of the X-Y plane located at the location of the first initiator 12. The T-axis represents elapsed time. The origin of the X, Y, and T axes represents an elapsed time of zero seconds. As one moves in a positive direction along the T-axis, elapsed time increases. Space-time cones may represent the propagation of waves through the first wave propagation medium 10. A first space-time cone 36 represents propagation of the first wave pulse 14 (not shown) and a second space-time cone 38 represents propagation of the second wave pulse 32 (not shown).

At the elapsed time of zero seconds, the first initiator 12 is about to transmit the first wave pulse 14; therefore, the vertex of the first space-time cone 36 is located at the origin of the X, Y, and T axes. The first space-time cone 36 includes a first ring 40, a second ring 42, and a third ring 44, which are representative of the first wave pulse 14 at elapsed times of six seconds, twelve seconds, and eighteen seconds, respectively. At the elapsed time of six seconds, the second initiator 22 is about to transmit the second wave pulse 32; therefore, a vertex 46 of the second space-time cone 38 is located at the location of the second initiator 22 in the X-Y plane and at six seconds along the T-axis. The distance from the second initiator 22 in the X-Y plane and the vertex 46 of the second space-time cone 38 represents a delay 48 between the start of the transmission of the first wave pulse 14 and the start of the transmission of the second wave pulse 32 (not shown).

The second space-time cone 38 includes a fourth ring 50 and a fifth ring 52, which are representative of the second wave pulse 32 at elapsed times of twelve seconds and eighteen seconds, respectively. At an elapsed time of twelve seconds, the first wave pulse 14 and the second wave pulse 32 intersect each other for the first time; therefore, the second ring 42 and the fourth ring 50 intersect each other at a first intersection point 54. At an elapsed time of eighteen seconds, the first wave pulse 14 and the second wave pulse 32 intersect each other at the location of the third transponder 28; therefore, the third ring 44 and the fifth ring 52 intersect each other at a second intersection point 56.

By taking a first projection 58 of the first intersection point 54 onto the X-Y plane parallel to the T-axis, a point on a first parabola 62 is located. By taking a second projection 60 of the second intersection point 56 onto the X-Y plane parallel to the T-axis, the third transponder 28 is located, which is also a point that falls on the first parabola 62. If all of the intersection points between the first and the second space-time cones 36, 38 are projected onto the X-Y plane, all would fall on the first parabola 62, which is called a parabola of intersection. Any of the first, the second, the third, and the fourth transponders 24, 26, 28, 30 located on the parabola of intersection would simultaneously receive the first and the second wave pulses 14, 32, but at different elapsed times. Different locations of the first initiator 12, the second initiator 22, or both, different delays between the first and the second wave pulses 14, 32, or any combination thereof, would normally have different parabolas of intersection. Therefore, identifying the parabolas of intersection may be very important in identifying operational behaviors of the polychronous wave propagation system 20 and designing the polychronous wave propagation system 20. As will be apparent to one of ordinary skill in the art, the parabola of intersection may be defined by the actual propagation of the first wave pulse 14 and the second wave pulse 32 through the first wave propagation medium 10, and is defined by the timing relationship between the first wave pulse 14 and the second wave pulse 32. Small variations in the first wave pulse 14 and the second wave pulse 32 as they propagate through the first wave propagation medium 10 may cause the parabola of intersection to not be in the shape of a perfect parabola. In this regard, the term "parabola of intersection" may refer to a shape formed in the first wave propagation medium 10 based on the timing of transmission between the first wave pulse 14 and the second wave pulse 32. As such, the parabola of intersection is generally in the shape of a parabola, but may not be in the shape of a perfect parabola.

Figure 4:
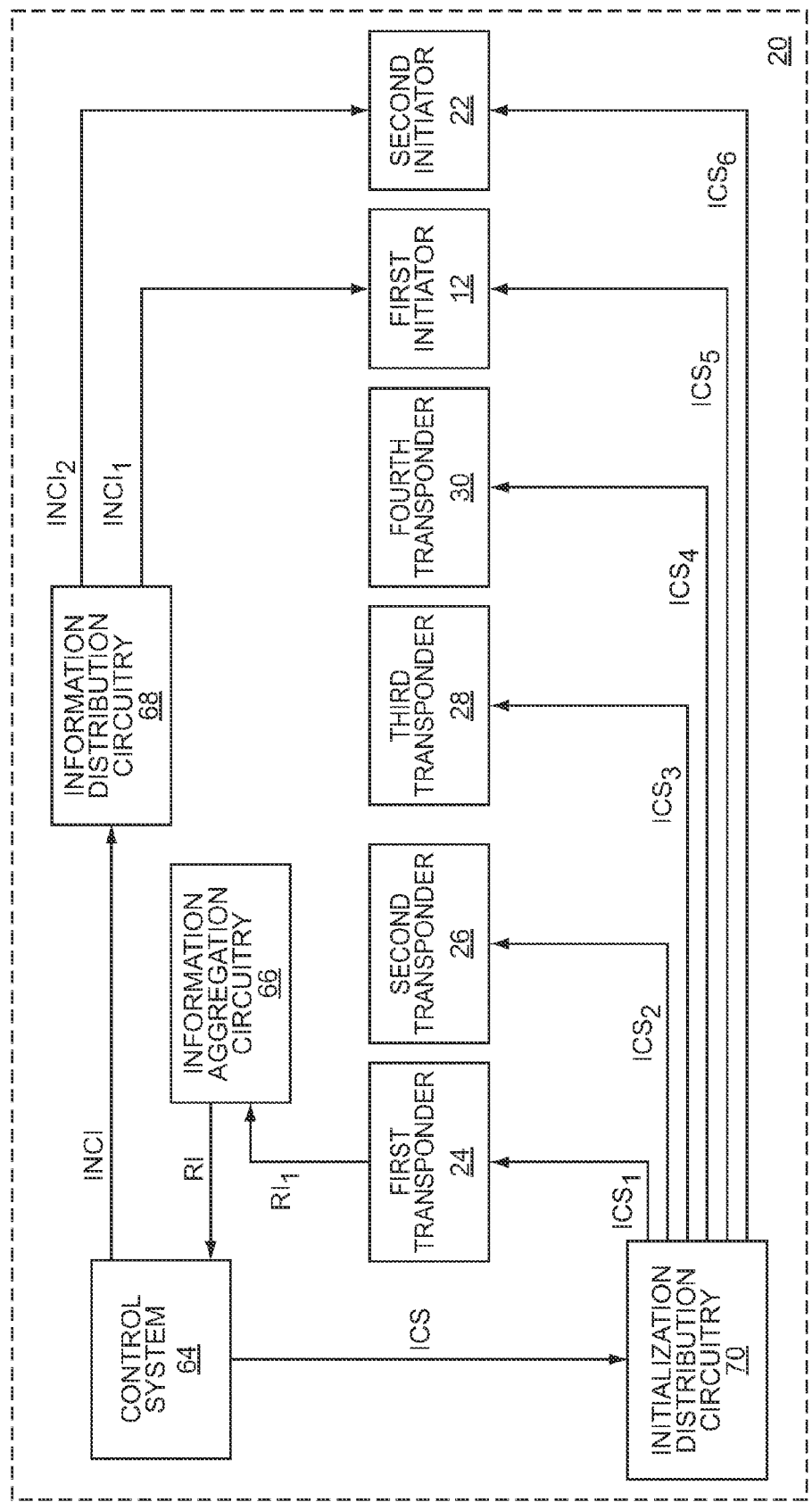
FIG. 4 shows details of the polychronous wave propagation system illustrated in FIGS. 2A through 2H, according to one embodiment of the polychronous wave propagation system.

FIG. 4 shows details of the polychronous wave propagation system 20 illustrated in FIGS. 2A through 2H, according to one embodiment of the polychronous wave propagation system 20. The polychronous wave propagation system 20 includes the first and the second initiators 12, 22, the first, the second, the third, and the fourth transponders 24, 26, 28, 30, a control system 64, information aggregation circuitry 66, information distribution circuitry 68, and initialization distribution circuitry 70. The control system 64, which may include control circuitry, provides an aggregated initialization control signal ICS to the initialization distribution circuitry 70, which provides a first initialization control signal $ICS_1$ to the first transponder 24, a second initialization control signal $ICS_2$ to the second transponder 26, a third initialization control signal $ICS_3$ to the third transponder 28, a fourth initialization control signal $ICS_4$ to the fourth transponder 30, a fifth initialization control signal $ICS_5$ to the first initiator 12, and a sixth initialization control signal $ICS_6$ to the second initiator 22 based on the aggregated initialization control signal ICS. The first, the second, the third, the fourth, the fifth, and the sixth initialization control signals $ICS_1$, $ICS_2$, $ICS_3$, $ICS_4$, $ICS_5$, $ICS_6$ may provide initialization information from the control system 64 to the first, the second, the third, and the fourth transponders 24, 26, 28, 30, and the first and the second initiators 12, 22, respectively, which may use the initialization information to prepare the polychronous wave propagation system 20 for initial use, for use between operating sessions, for use during operating sessions, or the like.

The control system 64 provides aggregated initiator control information INCI to the information distribution circuitry 68, which provides first initiator control information $INCI_1$ to the first initiator 12 and second initiator control information $INCI_2$ to the second initiator 22 based on the aggregated initiator control information INCI. The first and the second initiator control information $INCI_1$, $INCI_2$ may provide operational control information from the control system 64 to the first and the second initiators 12, 22, respectively, which may use the operational control information to control operations of the first and the second initiators 12, 22. Such control operations may include initiating transmission of waves or wave pulses, selecting wave pulse durations, establishing timing relationships between the first and the second initiators 12, 22, or the like.

The control system 64 receives aggregated responder information RI from the information aggregation circuitry 66, which receives first responder information $RI_1$ from the first transponder 24. In general, the aggregated responder information RI is the mechanism for conveying information from one or more responders in the polychronous wave propagation system 20 to the control system 64, which may convey the information to entities outside of the polychronous wave propagation system 20.

Figure 5:
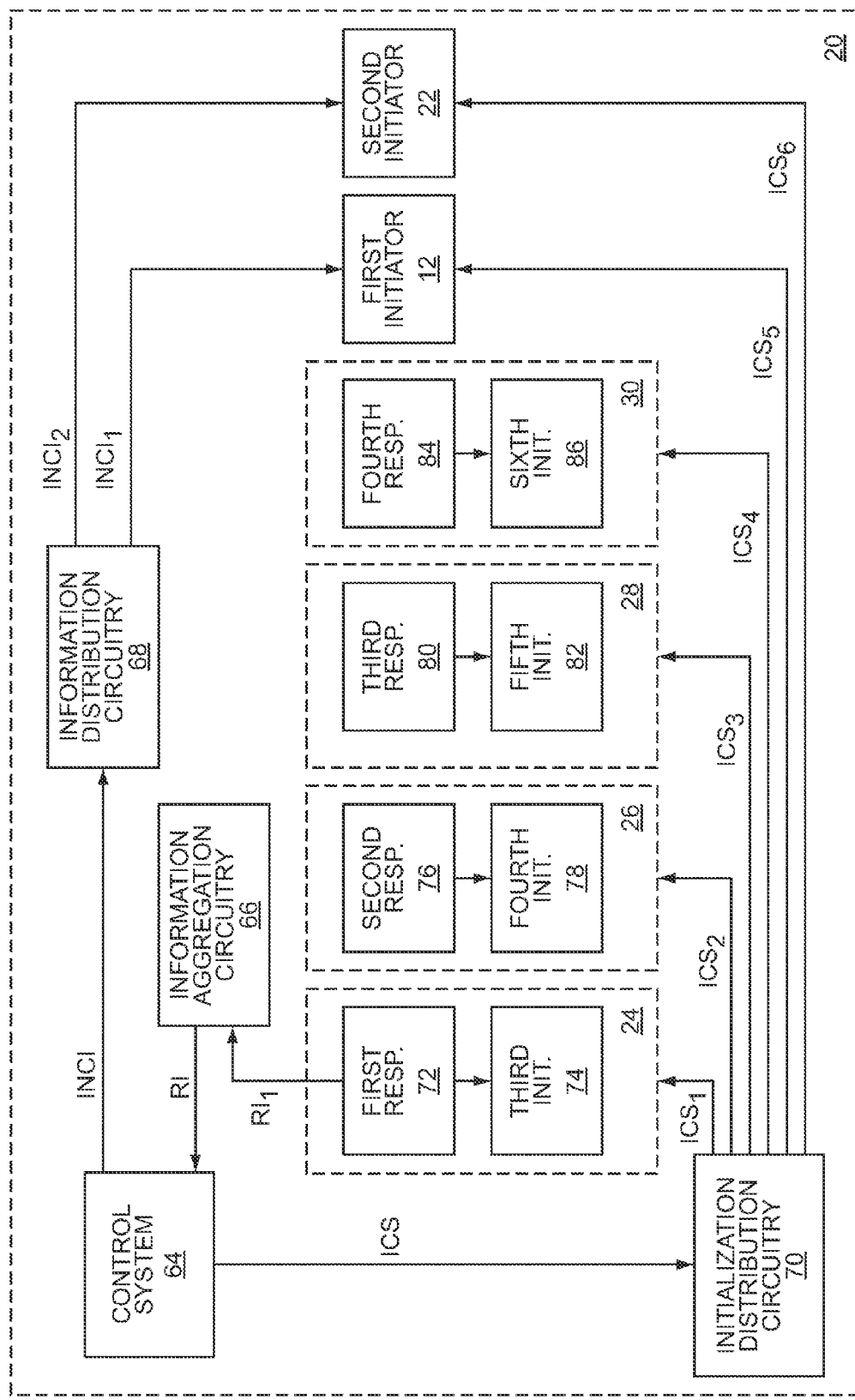
FIG. 5 shows details of a first, a second, a third, and a fourth transponder illustrated in FIG. 4, according to one embodiment of the polychronous wave propagation system.

FIG. 5 shows details of the first, the second, the third, and the fourth transponders 24, 26, 28, 30 illustrated in FIG. 4, according to one embodiment of the polychronous wave propagation system 20. The first transponder 24 includes a first responder 72 and a third initiator 74, the second transponder 26 includes a second responder 76 and a fourth initiator 78, the third transponder 28 includes a third responder 80 and a fifth initiator 82, and the fourth transponder 30 includes a fourth responder 84 and a sixth initiator 86.

Figure 6:
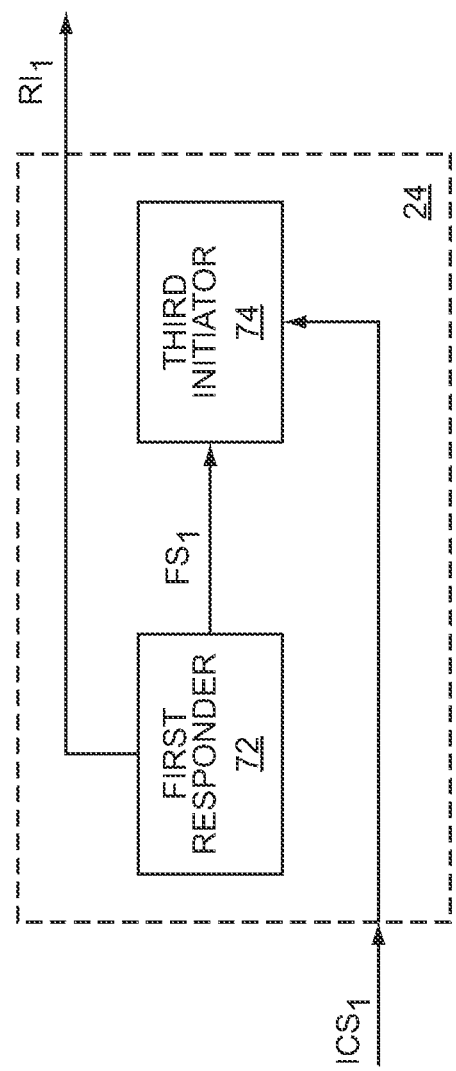
FIG. 6 shows details of the first transponder illustrated in FIG. 5, according to one embodiment of the first transponder.

FIG. 6 shows details of the first transponder 24 illustrated in FIG. 5, according to one embodiment of the first transponder 24. As mentioned above, the first transponder 24 includes the first responder 72 and the third initiator 74. The first responder 72 provides the first responder information $RI_1$ to the control system 64 (not shown), the third initiator 74 receives the first initialization control signal $ICS_1$ from the control system 64 (not shown), and the first responder 72 provides a first forcing signal $FS_1$ to the third initiator 74. Since the first transponder 24 transmits a wave in response to receiving two wave pulses simultaneously, when the first responder 72 receives two wave pulses simultaneously, the first responder 72 drives the first forcing signal $FS_1$ to cause the third initiator 74 to transmit a response wave. Additionally, the first responder 72 may indicate to the control system 64 that two wave pulses were received simultaneously by providing the appropriate first responder information $RI_1$.

Figure 7:
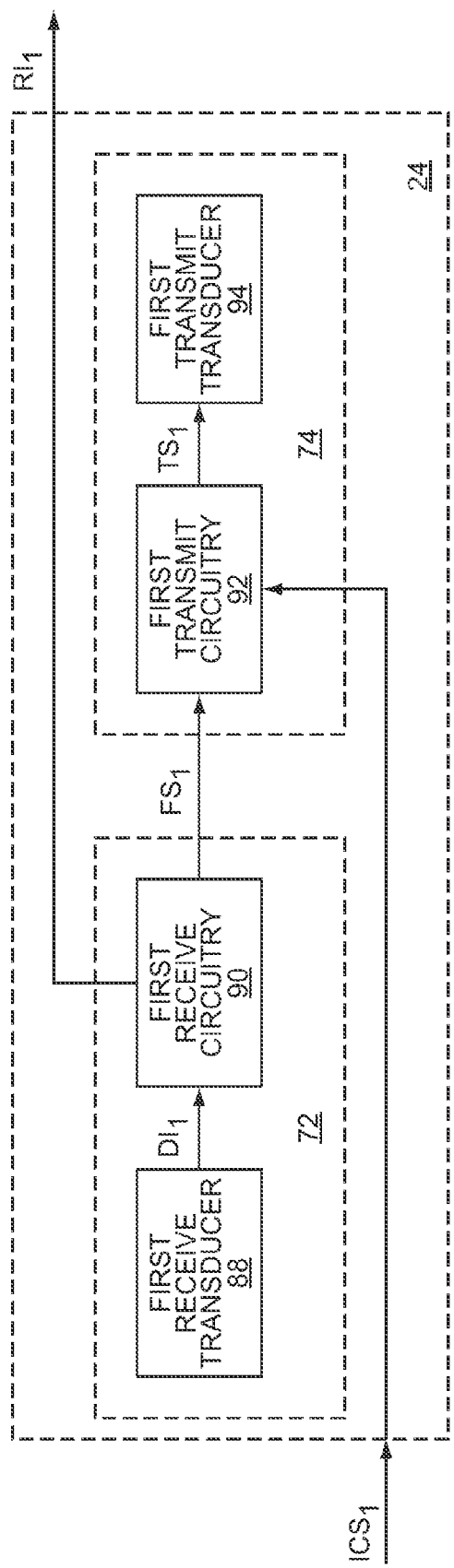
FIG. 7 shows details of a first responder and a third initiator illustrated in FIG. 6, according to one embodiment of the first transponder.

FIG. 7 shows details of the first responder 72 and the third initiator 74 illustrated in FIG. 6, according to one embodiment of the first transponder 24. The first responder 72 includes a first receive transducer 88 and first receive circuitry 90. The third initiator 74 includes first transmit circuitry 92 and a first transmit transducer 94. The first receive circuitry 90 provides the first responder information $RI_1$ to the control system 64 (not shown), the first transmit circuitry 92 receives the first initialization control signal $ICS_1$ from the control system 64 (not shown), the first receive transducer 88 provides first detected information $DI_1$ to the first receive circuitry 90, which provides the first forcing signal $FS_1$ to the first transmit circuitry 92, and the first transmit circuitry 92 provides a first transmit signal $TS_1$ to the first transmit transducer 94. The first transmit signal $TS_1$ includes appropriate response information to be transmitted.

The first wave propagation medium 10 may include air; vacuum; a liquid, such as water; a solid material, such as insulating material; semiconductor material; a surface of a semiconductor layer; multiple layers of semiconductor material; conducting material; magnetic material; magnetic films; ferromagnetic material; ferromagnetic material having an array of spin-torque nano-oscillators; ferrimagnetic material; any other material; an interface between any two of the aforementioned; any combination thereof; or the like. The first wave propagation medium 10 may be three dimensional, planar, multiple planes, circular, square, rectangular, triangular, spherical, cubic, cylindrical, cone-shaped, dodecahedronal, any size, any shape, any combination thereof, or the like. The first wave propagation medium 10 may form a micro-structure or a nano-structure. As such, the first wave propagation medium 10 may be relatively small. The temporal resolution of the polychronous wave propagation system 20 may be in the range of gigahertz and the space scale of the polychronous wave propagation system 20 may be in the range of tens of nanometers.

In a first embodiment of the first wave propagation medium 10, a longest dimension of the first wave propagation medium 10 is less than about one meter. In a second embodiment of the first wave propagation medium 10, the longest dimension of the first wave propagation medium 10 is less than about one centimeter. In a third embodiment of the first wave propagation medium 10, the longest dimension of the first wave propagation medium 10 is less than about 100 micrometers. In a fourth embodiment of the first wave propagation medium 10, the longest dimension of the first wave propagation medium 10 is less than about one micrometer. In a fifth embodiment of the first wave propagation medium 10, the longest dimension of the first wave propagation medium 10 is less than about 500 nanometers.

The propagating waves may be surface waves on a lake, waves on the surface of other fluids, acoustic waves on a semiconductor substrate, waves in a gaseous or liquid medium, such as Mercury, electro-magnetic waves, such as light, radio frequency signals, or x-rays, shock-waves in elastic materials, solitons in super-conducting circuits, quantum wave packets in arrays of spin-torque oscillators, such as nano-oscillators or ferromagnetic oscillators, or the like. The waves may be isolated radial activity waves or other types of waves. The waves may be capable of passing through one another without significant interaction with one another, with some interaction with one another, such as imparting a phase-shift, or with significant interaction with one another, such as reinforcement or attenuation. In general, a propagating wave is associated with a packet of energy that can actuate something in the first wave propagation medium 10 after a certain wave propagation time delay. The propagating waves may be represented by the wave equation or by Schrodinger's equation, which may be indicative of certain wave-like characteristics and certain particle-like characteristics.

The wave equation is a second-order linear partial differential equation of waves and is a prototypical example of a hyberbolic partial differential equation as shown below.

$$\frac{\partial^2 u}{\partial t^2} = c^2 \nabla^2 u$$

where $\nabla^2$ is the Laplacian and where c is a fixed constant equal to the propagation speed of the waves characterized by the wave equation. In its simplest form, the wave equation refers to a scalar function $u=u(x_1, x_2, \ldots, X_n, t)$ that satisfies the wave equation. The general form of Schrodinger's equation for a general quantum system is shown below.

$$i\hbar \frac{\partial}{\partial t} \Psi = \hat{H}\Psi$$

where $\psi$ is the wave function, which is the probability amplitude for different configurations of the system at different times, $$i\hbar \frac{\partial}{\partial t}$$

is the energy operator (i is the imaginary unit and $\hbar$ is the reduced Planck's constant), and $\hat{H}$ is the Hamiltonian operator.

Since the propagating waves may have such a wide range of characteristics, the first receive transducer 88 may be needed to properly receive and extract the first detected information $DI_1$ from received propagating waves. Similarly, the first transmit transducer 94 properly transmits the response waves using the appropriate response information contained in the first transmit signal $TS_1$.

Figure 8:
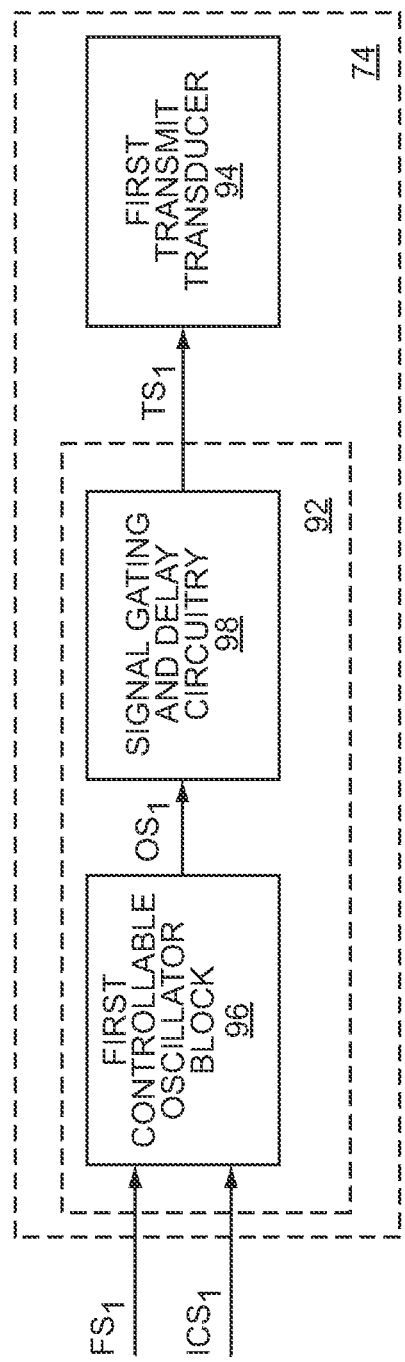
FIG. 8 shows details of first transmit circuitry illustrated in FIG. 7, according to one embodiment of the first transmit circuitry.

FIG. 8 shows details of the first transmit circuitry 92 illustrated in FIG. 7, according to one embodiment of the first transmit circuitry 92. As mentioned above, the third initiator 74 includes the first transmit circuitry 92 and the first transmit transducer 94. The first transmit circuitry 92 includes a first controllable oscillator block 96 and signal gating and delay circuitry 98. The first controllable oscillator block 96 receives the first initialization control signal $ICS_1$ from the control system 64 (not shown) and the first forcing signal $FS_1$ from the first receive circuitry 90 (not shown). The first controllable oscillator block 96 provides a first output signal $OS_1$, which is representative of first output information, to the signal gating and delay circuitry 98, which provides the first transmit signal $TS_1$ to the first transmit transducer 94 based on the first output information. In general, the first controllable oscillator block 96 is a device that can receive signals, process the received signals in ways that may be complex, and emit signals based on the processing of the received signals. The first controllable oscillator block 96 may express self-sustained oscillatory output or may be excitable, depending on control signals provided to the first controllable oscillator block 96. A mechanical example of the first controllable oscillator block 96 is a mechanical pendulum having a torque applied to the supporting point. When at rest, a few precisely timed pushes may cause the pendulum to exhibit a complete rotation, or if the forcing torque is sufficiently large, the pendulum might exhibit ongoing oscillations. In one embodiment of the present invention, the first controllable oscillator block 96 may include a voltage controlled oscillator neuron (VCON) oscillator. The first output information may include a first frequency and the first detected information $DI_1$ may include a second frequency. The first receive circuitry 90 may provide the first forcing signal $FS_1$ to control the first controllable oscillator block 96, such that the first frequency is controlled to be about equal to the second frequency.

In alternate embodiments of the present invention, controllable oscillator blocks, such as the first controllable oscillator block 96, may be implemented using phase-locked loops, frequency-locked loops, memristors, spin-torque nano-oscillators, voltage controlled oscillator blocks, current controlled oscillator blocks, frequency controlled oscillator blocks, Josephson junctions, single-electron transistors, certain chemical reaction arrays, any combination thereof, or the like.

Figure 9:
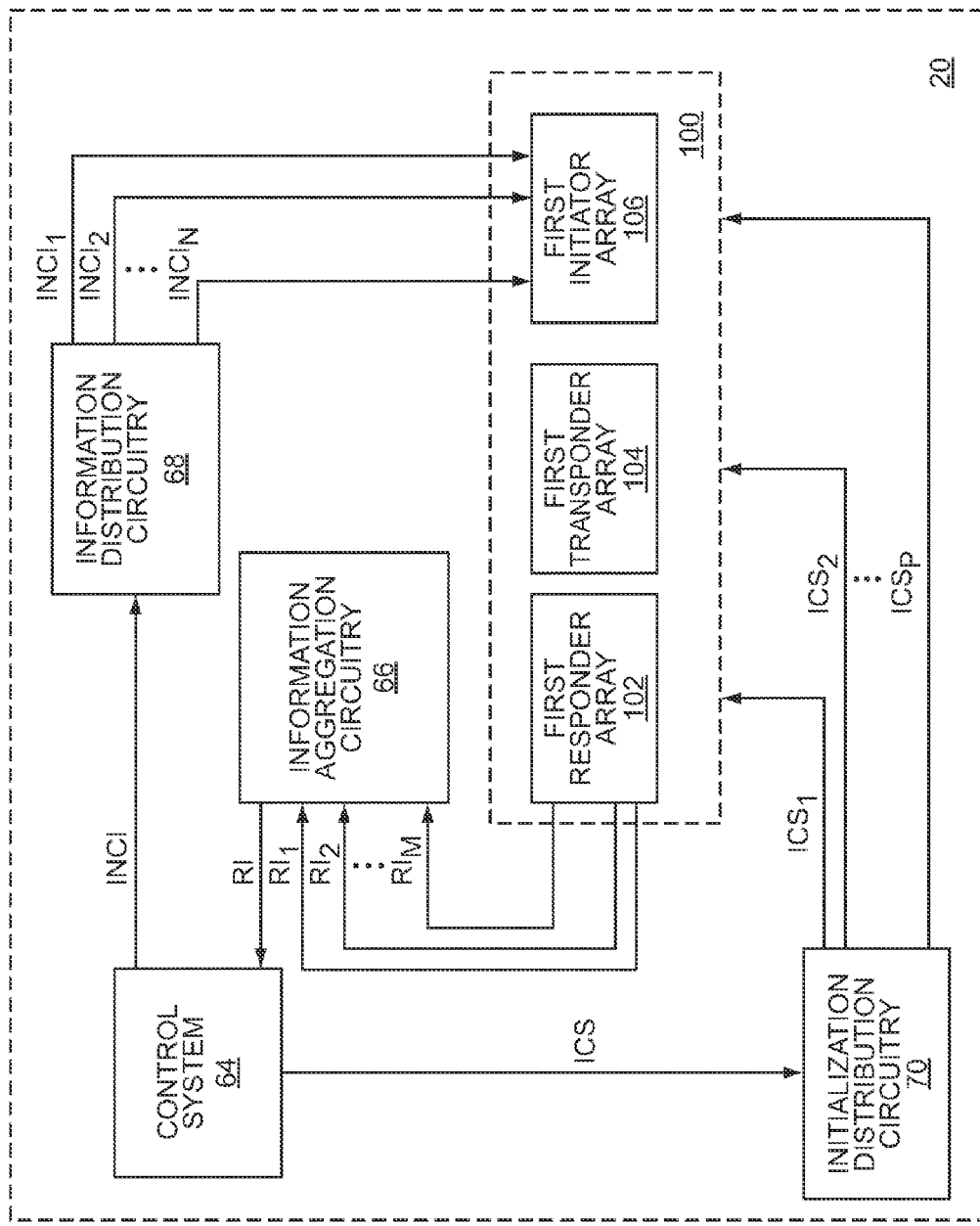
FIG. 9 shows details of the polychronous wave propagation system, according to an alternate embodiment of the polychronous wave propagation system.

FIG. 9 shows details of the polychronous wave propagation system 20, according to an alternate embodiment of the polychronous wave propagation system 20. The polychronous wave propagation system 20 includes a system array 100, which includes a first responder array 102, a first transponder array 104, and a first initiator array 106. Additionally, the polychronous wave propagation system 20 includes the control system 64, the information aggregation circuitry 66, the information distribution circuitry 68, and the initialization distribution circuitry 70. The control system 64 provides an aggregated initialization control signal ICS to the initialization distribution circuitry 70, which provides a first initialization control signal $ICS_1$, a second initialization control signal $ICS_2$, up to and including a Pth initialization control signal $ICS_P$ to the system array 100 based on the aggregated initialization control signal ICS. The first, the second, up to and including the Pth initialization control signals $ICS_1$, $ICS_2$, $ICS_P$ may provide initialization information from the control system 64 to the system array 100, which may use the initialization information to prepare the polychronous wave propagation system 20 for initial use, for use between operating sessions, for use during operating sessions, or the like.

The control system 64 provides aggregated initiator control information INCI to the information distribution circuitry 68, which provides first initiator control information $INCI_1$, second initiator control information $INCI_2$, up to and including Nth initiator control information $INCI_N$ to the first initiator array 106 based on the aggregated initiator control information INCI. The first, the second, up to and including the Nth initiator control information $INCI_1$, $INCI_2$, $INCI_N$ may provide operational control information from the control system 64 to the first initiator array 106, which may use the operational control information to control operations of the first initiator array 106. Such operations may include initiating transmission of waves or wave pulses, selecting wave pulse durations, establishing timing relationships between elements in the first initiator array 106, or the like.

The control system 64 receives aggregated responder information RI from the information aggregation circuitry 66, which receives first responder information $RI_1$, second responder information $RI_2$, up to and including Mth responder information $RI_M$ from the first responder array 102. In general, the aggregated responder information RI is the mechanism for conveying information from one or more responders in the polychronous wave propagation system 20 to the control system 64, which may convey the information to entities outside of the polychronous wave propagation system 20.

Figure 10:
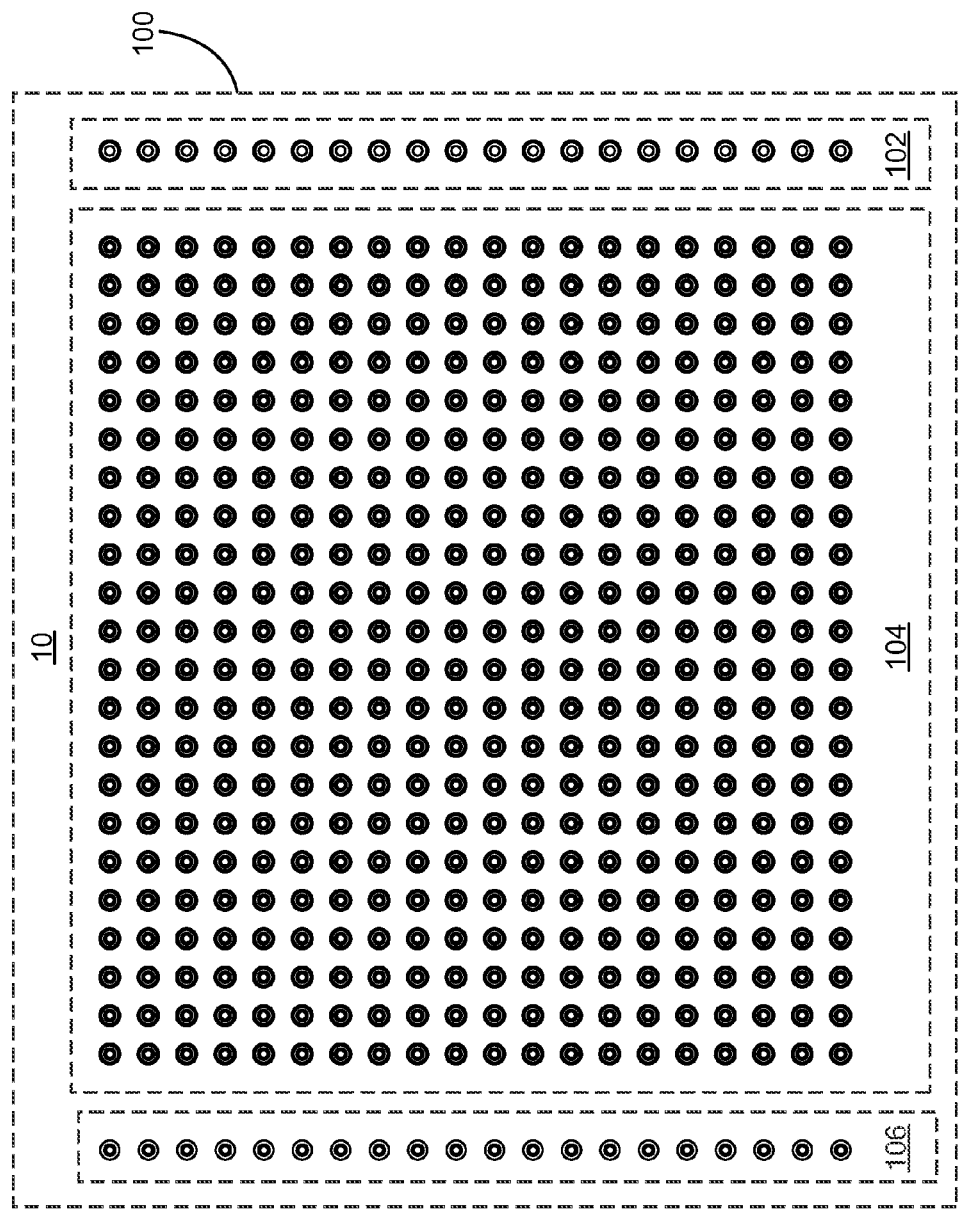
FIG. 10 shows details of a system array of initiators, responders, and transponders.

FIG. 10 shows details of the system array 100 of initiators, responders, and transponders disposed in the first wave propagation medium 10. The system array 100 includes the first responder array 102, the first transponder array 104, and the first initiator array 106. The first responder array 102 includes a column of responders disposed along an edge of the first wave propagation medium 10. The responders are only capable of receiving waves. The first initiator array 106 includes a column of initiators disposed along an opposite edge of the first wave propagation medium 10. The initiators are only capable of transmitting waves. The first transponder array 104 includes multiple columns of transponders disposed between the first responder array 102 and the first initiator array 106. The transponders are capable of both receiving propagated waves and transmitting waves. Each of the transponders in the first transponder array 104 has a responder and initiator pair.

In one embodiment of the present invention, each of at least two initiators in the first initiator array 106, in the first transponders array 104, or both are used to provide stimulus into the polychronous wave propagation system 20 by transmitting waves having encoded information through the first wave propagation medium 10 to at least one responder in the first transponder array 104, the first responder array 102, or both. The transmitted waves may be received mainly by nearest neighbors in the first transponder array 104 or may pass by the nearest neighbors to other responders. The timing of transmission of the transmitted waves having the encoded information is based on the aggregated initiator control information INCI, which is provided by the control system 64. Each of at least two responders in the first transponder array 104, the first responder array 102, or both are capable of receiving transmitted waves from at least two initiators in the first transponder array 104, the first initiator array 106, or both, and detecting information based on timing between reception of the encoded information in each of the received waves. In an exemplary embodiment of the present invention, the detected information is based on simultaneous reception of the encoded information in each of the received waves.

In the first transponder array 104, each initiator in at least one responder and initiator pair transmits response waves in response to the detected information associated with the waves that were received by the responder in the responder and initiator repair. The timing of transmission of the encoded information in the response waves is based on the detected information.

Aggregated responder information RI is provided to the control system 64 based on the detected information from each of at least one responder in the first responder array 102. Operational behavior of the polychronous wave propagation system 20 is based on the detected information provided by the responders and distances between each active initiator and each active responder in the polychronous wave propagation system 20.

In alternate embodiments of the polychronous wave propagation system 20, initiator control information based on the aggregated initiator control information INCI may be provided to initiators in the first transponder array 104, aggregated responder information RI may be provided to the control system 64 based on the detected information from each of at least one responder in the first transponder array 104. The first transponder array 104 includes at least one responder and initiator pair, the first responder array 102 includes any number of responders, which may include zero, and the first initiator array 106 includes any number of initiators, which may include zero.

In other embodiments of the present invention, the polychronous wave propagation system 20 includes any number of initiators and any number of responders. Further, any number of initiators may be combined with an equal number of responders to form transponders.

In one embodiment of the present invention, the transmitted waves from at least one of the initiators in the first initiator array 106, the first transponder array 104, or both, are amplitude modulated waves and the encoded information associated with the transmitted waves includes amplitude modulation information. Amplitude modulation associated with the amplitude modulated waves may include ON-OFF keying, such that the amplitude modulated waves are pulsed waves.

In one embodiment of the present invention, the transmitted waves from at least one of the initiators in the first initiator array 106, the first transponder array 104, or both have a first frequency and the encoded information associated with the transmitted waves includes first frequency information.

In one embodiment of the present invention, the transmitted waves from at least one of the initiators in the first initiator array 106, the first transponder array 104, or both are TRUE reference signals and the encoded information associated with the transmitted waves includes TRUE reference information. Further, the transmitted waves from at least another of the initiators in the first initiator array 106, the first transponder array 104, or both are FALSE reference signals and the encoded information associated with the transmitted waves includes FALSE reference information.

In one embodiment of the present invention, operational behavior of the polychronous wave propagation system 20 is representative of at least one Boolean function. In an alternate embodiment of the present invention, operational behavior of the polychronous wave propagation system 20 includes frequency detection of the transmitted waves associated with each of at least one of the initiators in the first initiator array 106, the first transponder array 104, or both. In an additional embodiment of the present invention, operational behavior of the polychronous wave propagation system 20 is representative of at least one reverberating memory cell. In another embodiment of the present invention, operational behavior of the polychronous wave propagation system 20 is representative of at least one reverberating memory doublet cell.

In one embodiment of the present invention, the first wave propagation medium 10 includes a ferromagnetic thin film of magnetic material, which has an array of spin-torque nano-oscillators, such that each nano-oscillator has a magnetization vector. In the absence of any external influences, the magnetization vectors may be about aligned to one another. However, in the presence of an external magnetic field that is misaligned with respect to the magnetization vectors at an edge of the array, some of the nano-oscillators at the edge of the array may re-align themselves with the external magnetic field. Then, nano-oscillators that are adjacent to the edge nano-oscillators may re-align themselves with the edge nano-oscillators. Next, adjacent oscillators to re-aligned oscillators may re-align themselves with the re-aligned oscillators, and so on. The re-alignment of nano-oscillators may propagate through the array as waves through a wave propagation medium, which is the array of spin-torque nano-oscillators. The wave propagation is the propagation of a spin wave by spin-torque. When the external magnetic field is removed, the edge nano-oscillators may revert back to being aligned with their corresponding magnetization vectors. The nano-oscillators that are adjacent to the edge nano-oscillators may revert back to being aligned with their corresponding magnetization vectors, and so on.

In a polychronous wave propagation system 20 that includes the ferromagnetic thin film of magnetic material having the array of spin-torque nano-oscillators as the first wave propagation medium 10, initiators may have the capability of applying an external magnetic field to some of the spin-torque nano-oscillators in the first wave propagation medium 10. Further, responders may include spin-torque nano-oscillators that are responsive to the spin wave and may include a detection device to detect the re-alignment of the spin-torque nano-oscillators.

Examples of different applications using the polychronous wave propagation system 20 are presented in different embodiments of the present invention. In a first example, Boolean functionality using the polychronous wave propagation system 20 is presented. Boolean functions are the fundamental building blocks of most digital computers. Basic Boolean building blocks are binary in nature, such that any given node may be in a TRUE state or a FALSE state. In one embodiment of the present invention, the polychronous wave propagation system 20 is used to implement a NOR gate. Combinations of NOR gates may be used to provide any Boolean function.

FIGS. 11A through 11F and 12A through 12G illustrate different approaches to defining TRUE and FALSE states, which are used by the polychronous wave propagation system 20 to provide Boolean functionality. In a first approach, FIGS. 11A and 11B illustrate a received signal indicating a TRUE state and a FALSE state, respectively. In the TRUE received signal, a first pulse 108 is indicative of the TRUE state and in the FALSE received signal, an absence of pulses is indicative of the FALSE state. The first approach is not very practical since a silent transponder could be interpreted as constantly transmitting FALSE signals.

In a second approach, FIGS. 11C and 11D illustrate a received signal indicating the TRUE state and the FALSE state, respectively. In the TRUE received signal, the presence of the first pulse 108 and a second pulse 110 is indicative of the TRUE state and in the FALSE received signal, the presence of only the first pulse 108 is indicative of the FALSE state.

In a third approach, FIGS. 11E and 11F illustrate a received signal indicating the TRUE state and the FALSE state, respectively. In the TRUE received signal, the presence of the first pulse 108 and the second pulse 110 separated by a first inter-pulse interval is indicative of the TRUE state and in the FALSE received signal, the presence of the first pulse 108 and the second pulse 110 separated by a second inter-pulse interval is indicative of the FALSE state, such that the first inter-pulse interval is not equal to the second inter-pulse interval to allow differentiation between the TRUE state and the FALSE state.

In a fourth approach, FIGS. 12A and 12B illustrate a received signal indicating the TRUE state and the FALSE state, respectively. FIG. 12C illustrates a timing reference signal having equally spaced timing reference pulses 112. In the TRUE received signal, the presence of the first pulse 108 separated from one of the timing reference pulses 112 by a first interval 114 is indicative of the TRUE state and in the FALSE received signal, the presence of the second pulse 110 separated from one of the timing reference pulses 112 by a second interval 116 is indicative of the FALSE state, such that the first interval 114 is not equal to the second interval 116 to allow differentiation between the TRUE state and the FALSE state. Further, the first pulse 108 may be called a TRUE pulse and the second pulse 110 may be called a FALSE pulse, such that the first pulse 108 and the second pulse 110 are differentiated from one another. For example, pulse widths of the first and the second pulses 108, 110 may be different from one another, or carrier frequencies of the first and the second pulses 108, 110 may be different from one another.

In a fifth approach, FIGS. 12D and 12E illustrate a received signal indicating the TRUE state and the FALSE state, respectively. FIG. 12F illustrates a TRUE timing reference signal having equally spaced TRUE timing reference pulses 118 and FIG. 12G illustrates a FALSE timing reference signal having equally spaced FALSE timing reference pulses 120. In the TRUE received signal, the presence of the first pulse 108 received about simultaneously with one of the TRUE timing reference pulses 118 is indicative of the TRUE state and in the FALSE received signal, the presence of the second pulse 110 received about simultaneously with one of the FALSE timing reference pulses 120 is indicative of the FALSE state. As mentioned above, the first pulse 108 may be called a TRUE pulse and the second pulse 110 may be called a FALSE pulse, such that the first pulse 108 and the second pulse 110 are differentiated from one another. For example, pulse widths of the first and the second pulses 108, 110 may be different from one another, or carrier frequencies of the first and the second pulses 108, 110 may be different from one another. Similarly, TRUE timing reference pulses 118 may be differentiated from FALSE timing reference pulses 120. For example, pulse widths of the TRUE and the FALSE timing reference pulses 118, 120 may be different from one another, or carrier frequencies of the TRUE and the FALSE timing reference pulses 118, 120 may be different from one another.

The fifth approach presented above is used by the polychronous wave propagation system 20 in the first example to provide a NOR gate. The NOR gate has an A input, a B input, and an inverting output. When either or both of the A input or the B input is TRUE, the inverting output is FALSE. When both the A input and the B input are FALSE, the inverting output is TRUE. The NOR gate is implemented as an OR gate and an inverter. The OR gate has the A input, the B input, and a non-inverting output. The inverter takes the non-inverting output and provides the inverting output of the NOR gate based on inverting the state of the non-inverting output. In the OR gate, when either or both of the A input or the B input is TRUE, the non-inverting output is TRUE. When both the A input and the B input are FALSE, the inverting output is FALSE.

FIGS. 13A through 16E illustrate behaviors of the polychronous wave propagation system 20 in which asynchronous waves that have timing relationships to one another are transmitted and propagate through the first wave propagation medium 10. The polychronous wave propagation system 20 includes the first initiator 12, which is positioned along an edge of the first wave propagation medium 10 and provides the FALSE timing reference signal, the second initiator 22, which is positioned along another edge of the first wave propagation medium 10 and provides the TRUE timing reference signal, the first transponder 24, which provides the non-inverting output, the second transponder 26, which provides the A input, the third transponder 28, which provides the B input, the fourth transponder 30, which is used to provide the appropriate behavior, and a fifth transponder 122, which is used to provide the inverting output. The first and the second initiators 12, 22, the first, the second, the third, the fourth, and the fifth transponders 24, 26, 28, 30, 122 may be carefully located with respect to one another to produce desired behaviors in the polychronous wave propagation system 20.

The second and the third transponders 26, 28 are only responsive to timing pulses that match the states of the A input and the B input, respectively. For example, if the A input is in a TRUE state, the second transponder 26 will ignore FALSE timing reference pulses 120 but be responsive to TRUE timing reference pulses 118. Likewise, if the A input is in a FALSE state, the second transponder 26 will ignore TRUE timing reference pulses 118 but be responsive to FALSE timing reference pulses 120. The B input and third transponder 28 behave in a similar manner. The first transponder 24, which provides the non-inverting output is not responsive to single pulses, but is responsive to simultaneous pulses having the same state by transmitting a pulse with the same state. For example if the first transponder 24 receives two or more TRUE pulses simultaneously, the first transponder 24 responds by transmitting a TRUE pulse. Similarly, if the first transponder 24 receives two or more FALSE pulses simultaneously, the first transponder 24 responds by transmitting a FALSE pulse.

The fourth transponder 30 is only responsive to two simultaneous FALSE pulses, such that if the fourth transponder 30 receives two or more FALSE pulses simultaneously, the fourth transponder 30 responds by transmitting a FALSE pulse. The fifth transponder 122, which provides the inverting output is not responsive to single pulses, but is responsive to simultaneous pulses having the same state by transmitting a pulse with the opposite state. For example if the fifth transponder 122 receives two or more TRUE pulses simultaneously, the fifth transponder 122 responds by transmitting a FALSE pulse. Similarly, if the fifth transponder 122 receives two or more FALSE pulses simultaneously, the fifth transponder 122 responds by transmitting a TRUE pulse.

FIGS. 13A through 13E illustrate behavior of the NOR gate using the polychronous wave propagation system 20 with both A and B inputs of the NOR gate being TRUE; therefore, the inverting output of the NOR gate should be FALSE. The states of the A and B inputs may have been driven into these states by other initiators (not shown), by circuitry driven by the aggregated initiator control information INCI from the control system 64, or both. FIGS. 13A, 13B, 13C, 13D, and 13E may represent snapshots in time of the first wave propagation medium 10 at two time units elapsed time, nine time units elapsed time, twelve time units elapsed time, eighteen time units elapsed time, and twenty-four time units elapsed time, respectively.

Figure 13A:
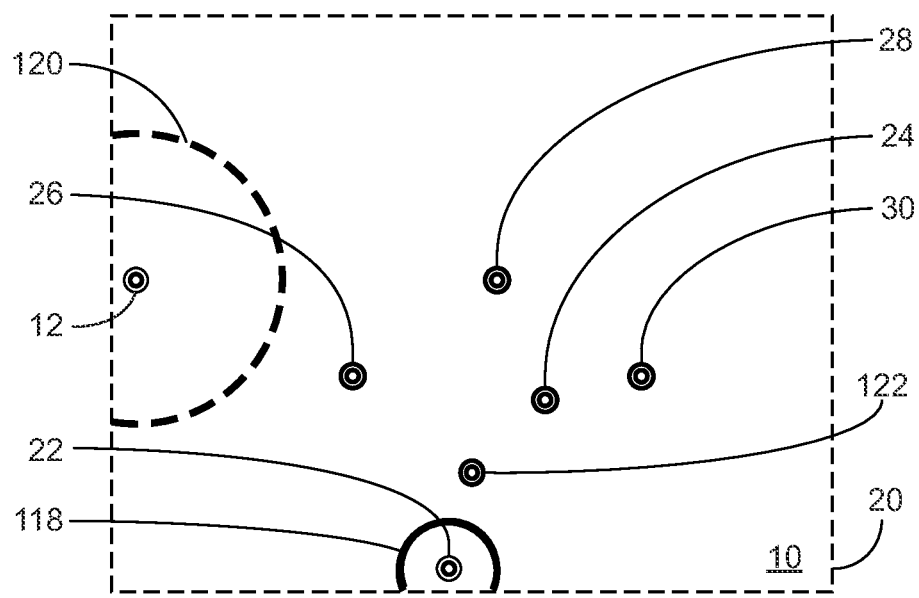
FIGS. 13A through 13E illustrate behavior of a Boolean NOR gate using the polychronous wave propagation system with both A and B inputs of the NOR gate being in a TRUE state.
Figure 13B:
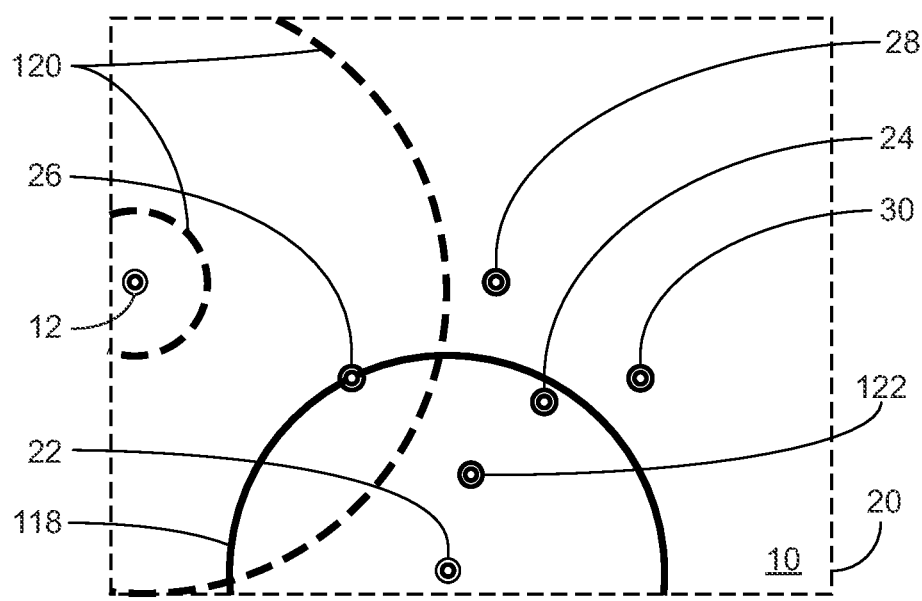

FIG. 13A, which represents a snapshot at two time units elapsed time, shows a TRUE timing reference pulse 118, which was transmitted from the second initiator 22 about two time units previously and a FALSE timing reference pulse 120, which was transmitted from the first initiator 12 about six time units previously; therefore, the TRUE timing reference pulses 118 lag respective FALSE timing reference pulses 120 by about four time units. FIG. 13B, which represents a snapshot at nine time units elapsed time, shows the TRUE timing reference pulse 118 reaching the second transponder 26 and an additional FALSE timing pulse 120, which was transmitted from the first initiator 12 about three time units previously. Since the A input is in a TRUE state and the TRUE timing reference pulse 118 reached the second transponder 26, which represents the A input, the second transponder 26 will transmit a first TRUE output pulse 124 (not shown) in about one time unit.

Figure 13C:
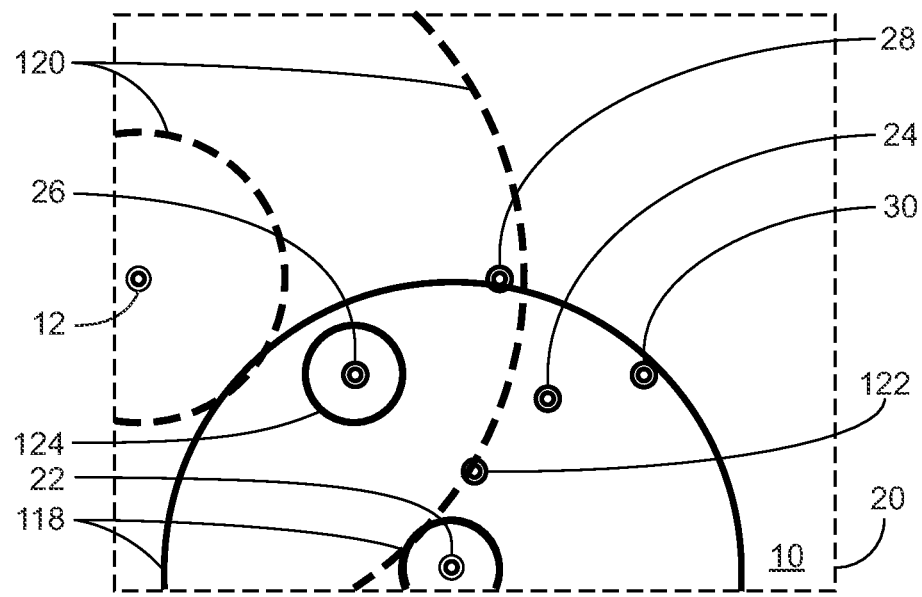

FIG. 13C, which represents a snapshot at twelve time units elapsed time, shows the TRUE timing reference pulse 118 reaching the third transponder 28, the first TRUE output pulse 124, which was transmitted from the second transponder 26 about two time units previously, and an additional TRUE timing reference pulse 118, which was transmitted from the second initiator 22 about two time units previously. Since the B input is in a TRUE state and the TRUE timing reference pulse 118 reached the third transponder 28, which represents the B input, the third transponder 28 will transmit a second TRUE output pulse 126 (not shown) in about one time unit.

Figure 13D:
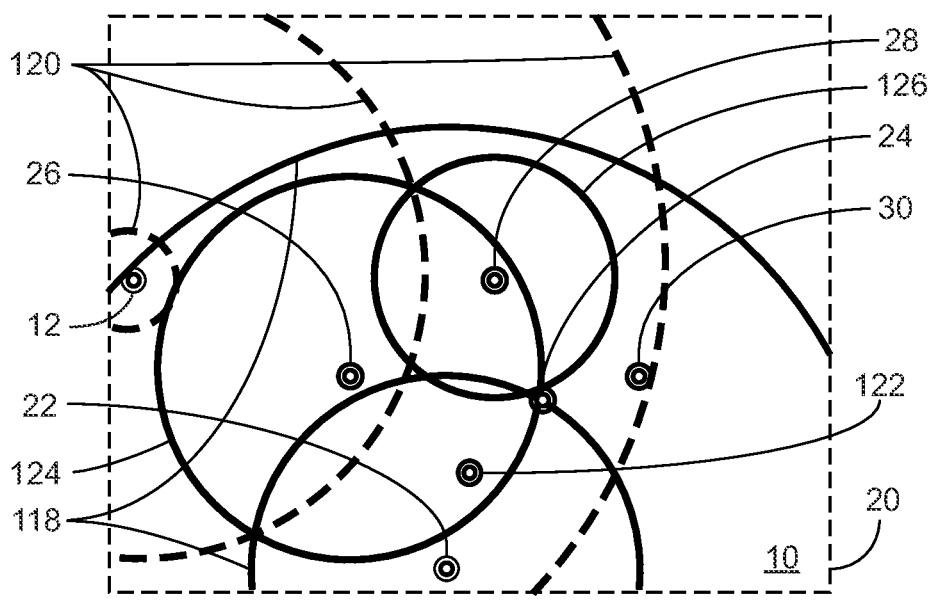

FIG. 13D, which represents a snapshot at eighteen time units elapsed time, shows the first and the second TRUE output pulses 124, 126 and the TRUE timing reference pulse 118 reaching the first transponder 24 simultaneously, and an additional FALSE timing reference pulse 120, which was transmitted from the first initiator 12 about two time units previously. Since the first transponder 24 received two or more TRUE pulses simultaneously, the first transponder 24 will respond by transmitting a third TRUE output pulse 128 (not shown) in about one time unit.

Figure 13E:
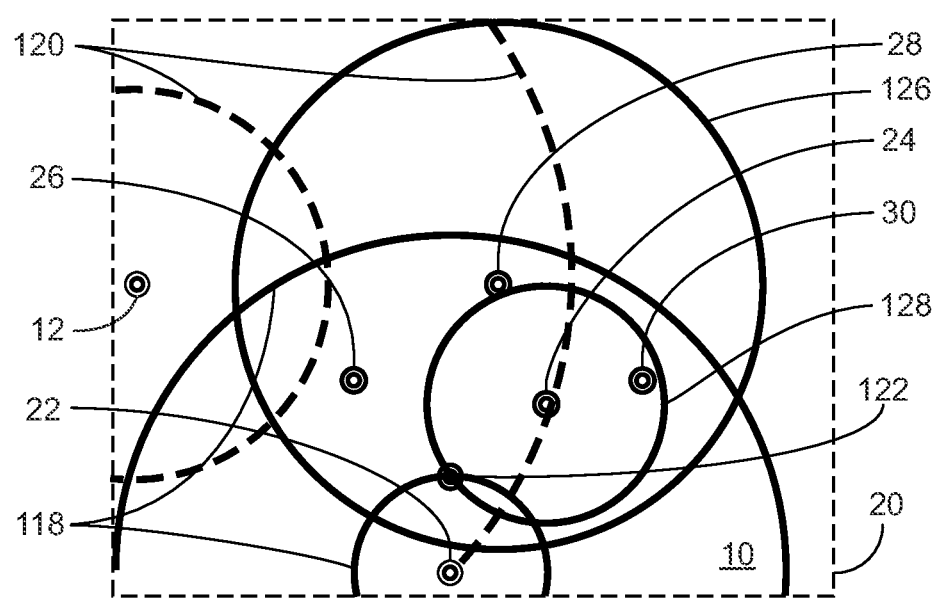

FIG. 13E, which represents a snapshot at twenty-four time units elapsed time, shows the third TRUE output pulse 128 an additional TRUE timing reference pulse 118 reaching the fifth transponder 122 simultaneously. Since the fifth transponder 122 received two TRUE pulses simultaneously, the fifth transponder 122 will respond by transmitting a FALSE output pulse (not shown) in about one time unit. Since the inverting output of the NOR gate should be FALSE and since the fifth transponder 122 provides the inverting output, the response from the fifth transponder 122 is correct.

FIGS. 14A through 14F illustrate behavior of the Boolean NOR gate using the polychronous wave propagation system 20 with both A and B inputs of the NOR gate being in a FALSE state; therefore, the inverting output of the NOR gate should be TRUE. The states of the A and the B inputs may have been driven into these states by other initiators (not shown), by circuitry driven by the aggregated initiator control information INCI from the control system 64, or both. FIGS. 14A, 14B, 14C, 14D, 14E, and 14F may represent snapshots in time of the first wave propagation medium 10 at two time units elapsed time, six time units elapsed time, eleven time units elapsed time, nineteen time units elapsed time, twenty-four time units elapsed time, and thirty-one nanoseconds elapsed time, respectively.

Figure 14A:
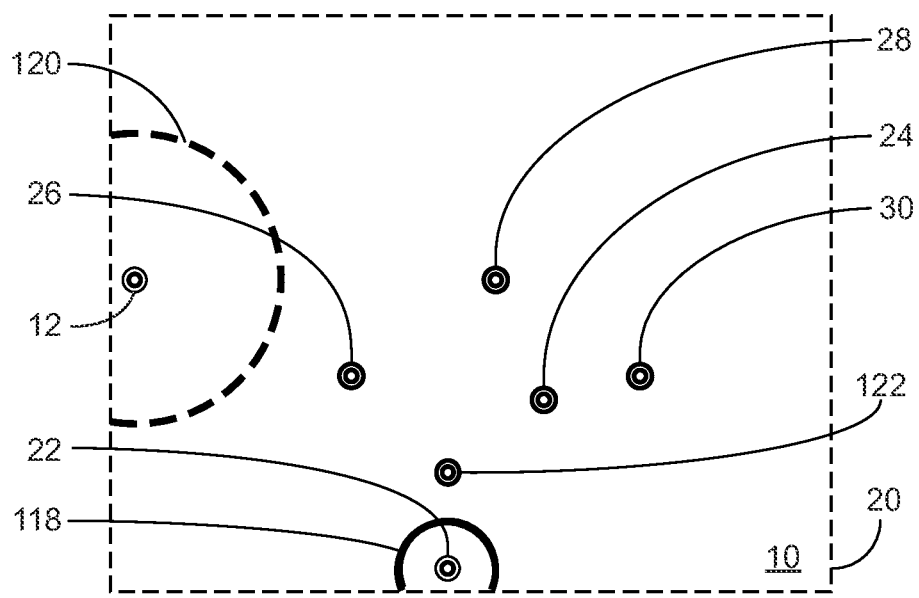
FIGS. 14A through 14F illustrate behavior of the Boolean NOR gate using the polychronous wave propagation system with both A and B inputs of the NOR gate being in a FALSE state.
Figure 14B:
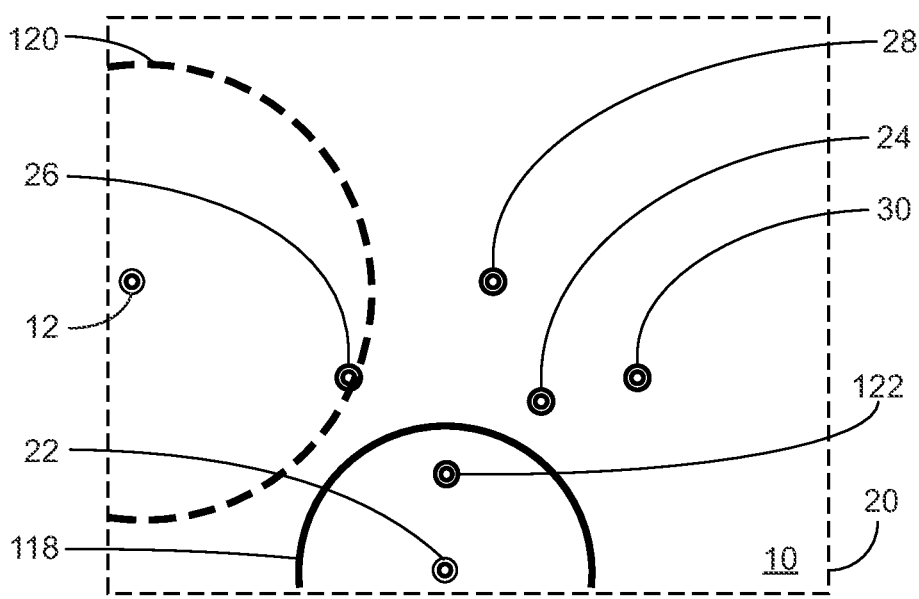

FIG. 14A, which represents a snapshot at two time units elapsed time, shows a TRUE timing reference pulse 118, which was transmitted from the second initiator 22 about two time units previously and a FALSE timing reference pulse 120, which was transmitted from the first initiator 12 about six time units previously; therefore, the TRUE timing reference pulses 118 lag respective FALSE timing reference pulses 120 by about four time units. FIG. 14B, which represents a snapshot at six time units elapsed time, shows the FALSE timing reference pulse 120 reaching the second transponder 26. Since the A input is in a FALSE state and the FALSE timing reference pulse 120 reached the second transponder 26, which represents the A input, the second transponder 26 will transmit a first FALSE output pulse 130 (not shown) in about one time unit.

Figure 14C:
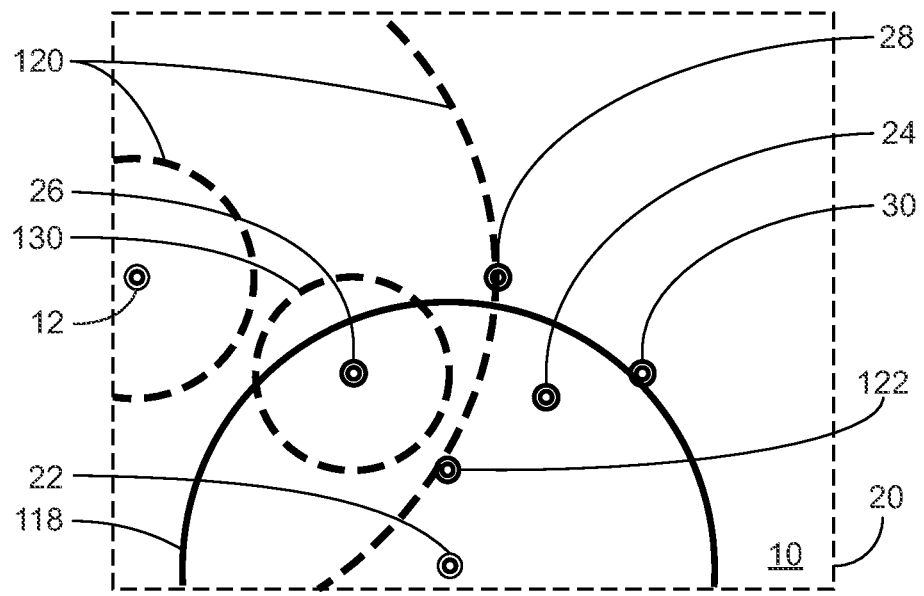

FIG. 14C, which represents a snapshot at eleven time units elapsed time, shows the FALSE timing reference pulse 120 reaching the third transponder 28, the first FALSE output pulse 130, which was transmitted from the second transponder 26 about four time units previously, and an additional FALSE timing reference pulse 120, which was transmitted from the first initiator 12 about five time units previously. Since the B input is in a FALSE state and the FALSE timing reference pulse 120 reached the third transponder 28, which represents the B input, the third transponder 28 will transmit a second FALSE output pulse 132 (not shown) in about one time unit.

Figure 14D:
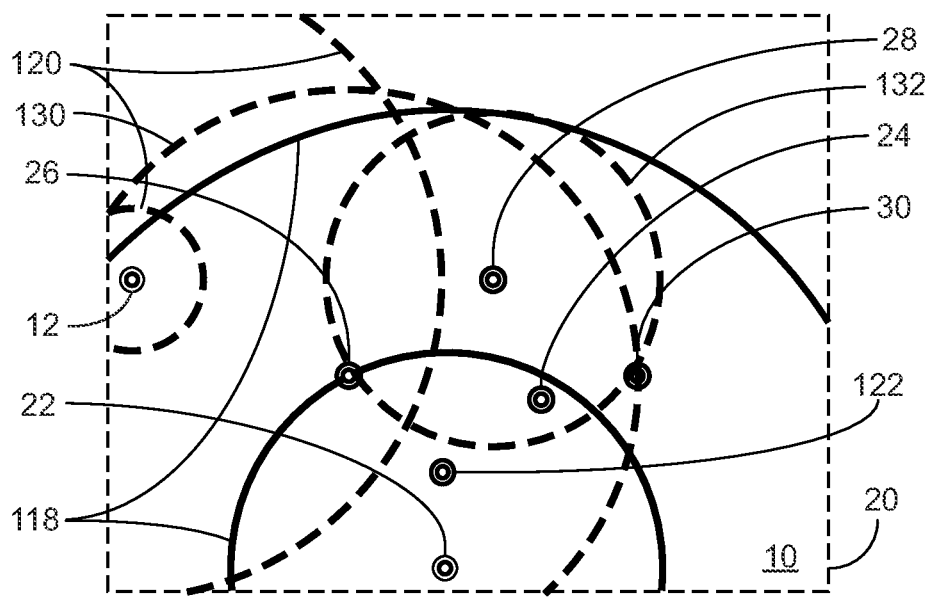

FIG. 14D, which represents a snapshot at nineteen time units elapsed time, shows the first and the second FALSE output pulses 130, 132 reaching the fourth transponder 30 simultaneously, and an additional FALSE timing reference pulse 120, which was transmitted from the first initiator 12 about three time units previously. Since the fourth transponder 30 received two or more FALSE pulses simultaneously, the fourth transponder 30 will respond by transmitting a third FALSE output pulse 134 (not shown) in about one time unit.

Figure 14E:
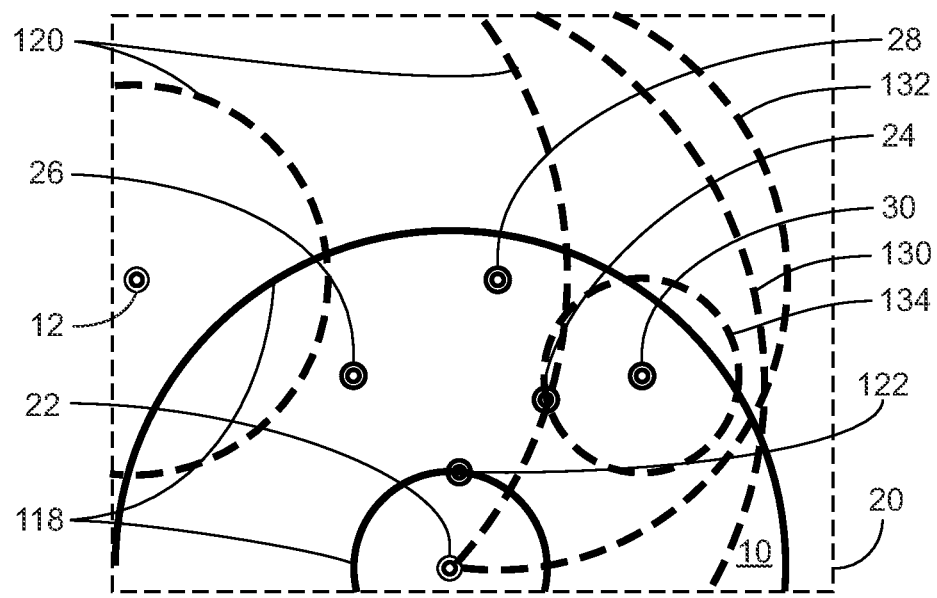

FIG. 14E, which represents a snapshot at twenty-four time units elapsed time, shows the third FALSE output pulse 134 and the FALSE timing reference pulse 120 reaching the first transponder 24 simultaneously. Since the first transponder 24 received two or more FALSE pulses simultaneously, the first transponder 24 will respond by transmitting a fourth FALSE output pulse 136 (not shown) in about one time unit.

Figure 14F:
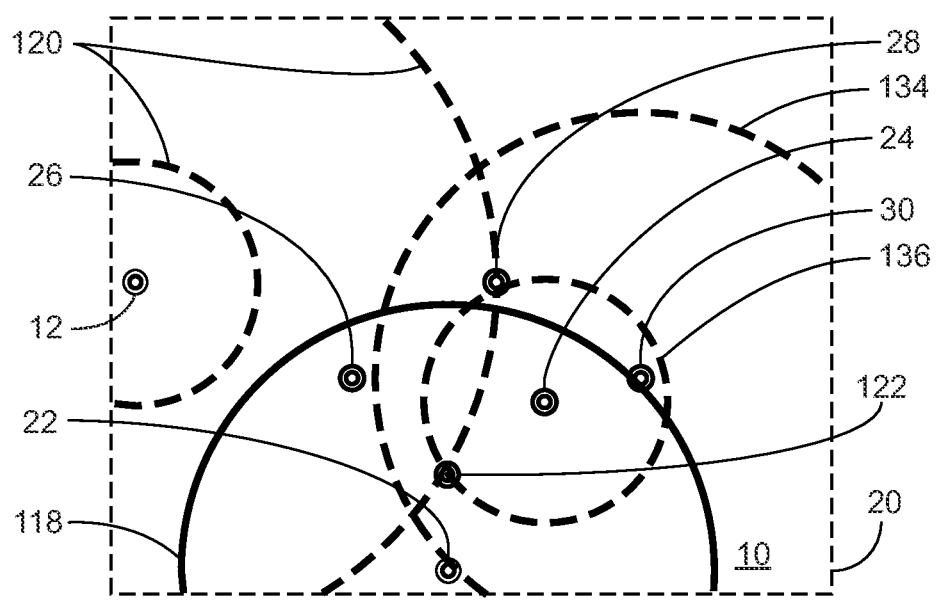

FIG. 14F, which represents a snapshot at thirty-one time units elapsed time, shows the fourth FALSE output pulse 136 and an additional FALSE timing reference pulse 120 reaching the fifth transponder 122 simultaneously. Since the fifth transponder 122 received two FALSE pulses simultaneously, the fifth transponder 122 will respond by transmitting a TRUE output pulse (not shown) in about one time unit. Since the inverting output of the NOR gate should be TRUE and since the fifth transponder 122 provides the inverting output, the response from the fifth transponder 122 is correct.

FIGS. 15A through 15E illustrate behavior of the Boolean NOR gate using the polychronous wave propagation system 20 with the A input of the NOR gate being in a TRUE state and the B input of the NOR gate being in a FALSE state; therefore, the inverting output of the NOR gate should be FALSE. The states of the A and the B inputs may have been driven into these states by other initiators (not shown), by circuitry driven by the aggregated initiator control information INCI from the control system 64, or both. FIGS. 15A, 15B, 15C, 15D, and 15E may represent snapshots in time of the first wave propagation medium 10 at two time units elapsed time, nine time units elapsed time, twelve time units elapsed time, eighteen time units elapsed time, and twenty-four time units elapsed time, respectively.

Figure 15A:
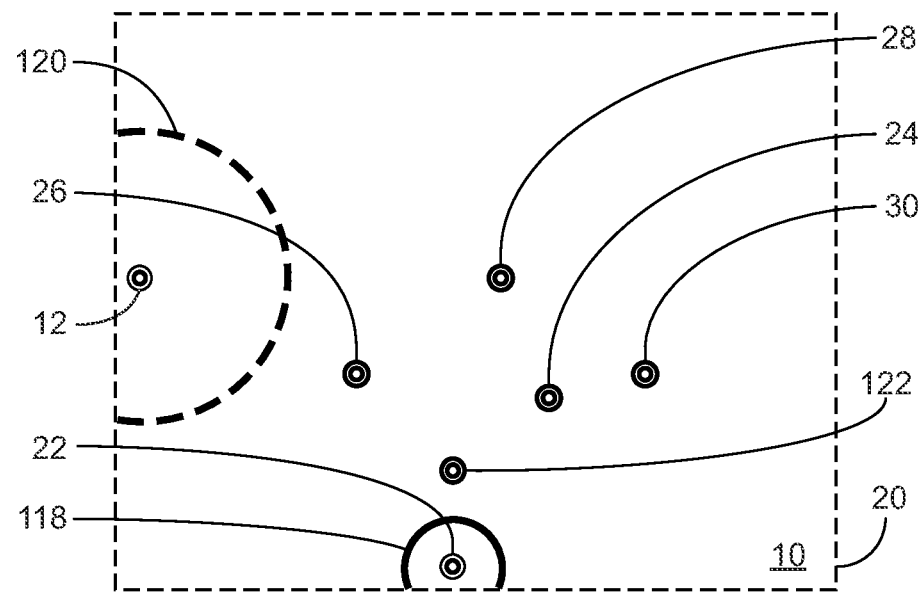
FIGS. 15A through 15E illustrate behavior of the Boolean NOR gate using the polychronous wave propagation system with the A input of the NOR gate being in a TRUE state and the B input of the NOR gate being in a FALSE state.
Figure 15B:
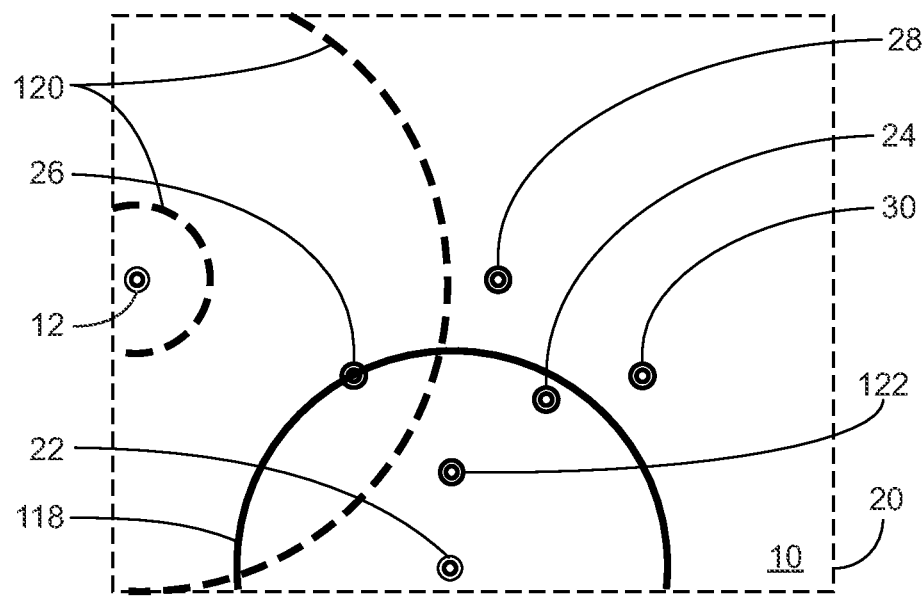

FIG. 15A, which represents a snapshot at two time units elapsed time, shows a TRUE timing reference pulse 118, which was transmitted from the second initiator 22 about two time units previously and a FALSE timing reference pulse 120, which was transmitted from the first initiator 12 about six time units previously; therefore, the TRUE timing reference pulses 118 lag respective FALSE timing reference pulses 120 by about four time units. FIG. 15B, which represents a snapshot at nine time units elapsed time, shows the TRUE timing reference pulse 118 reaching the second transponder 26 and an additional FALSE timing reference pulse 120, which was transmitted from the first initiator 12 about three time units previously. Since the A input is in a TRUE state and the TRUE timing reference pulse 118 reached the second transponder 26, which represents the A input, the second transponder 26 will transmit the first TRUE output pulse 124 (not shown) in about one time unit.

Figure 15C:
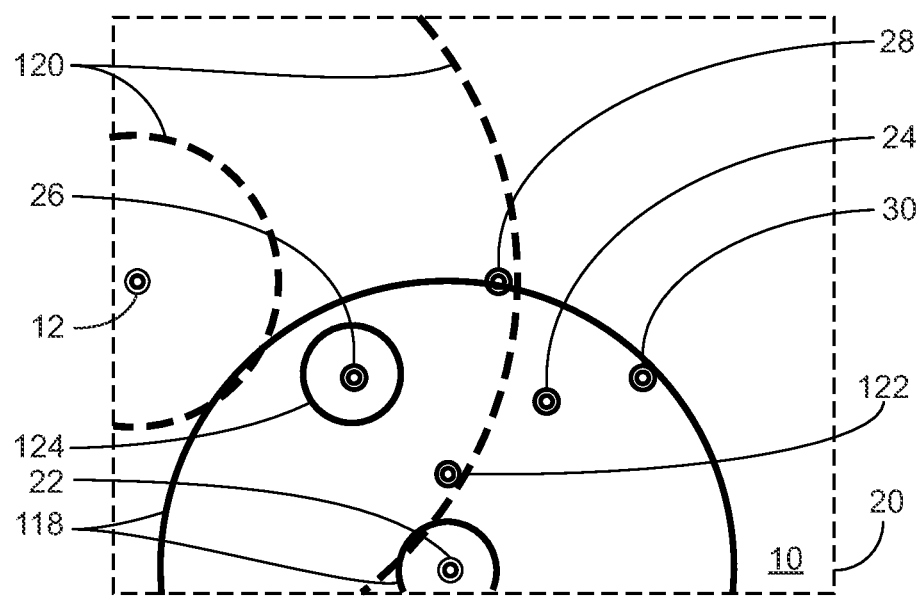

FIG. 15C, which represents a snapshot at twelve time units elapsed time, shows a FALSE timing reference pulse 120 about one time unit beyond the third transponder 28, the first TRUE output pulse 124, which was transmitted from the second transponder 26 about two time units previously, and an additional TRUE timing reference pulse 118, which was transmitted from the second initiator 22 about two time units previously. Since the B input is in a FALSE state and the FALSE timing reference pulse 120 reached the third transponder 28, which represents the B input, the third transponder 28 is about to transmit the second FALSE output pulse 132 (not shown).

Figure 15D:
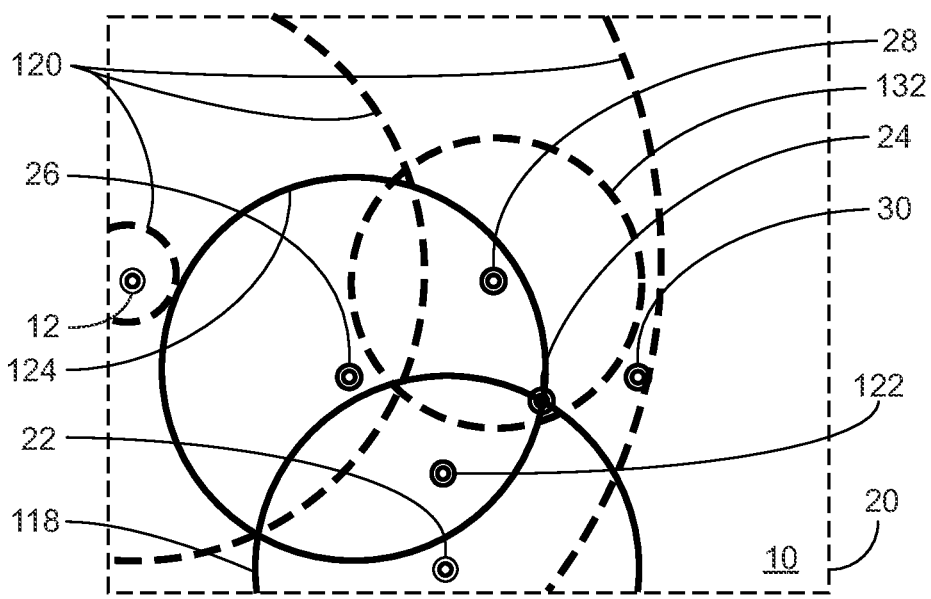

FIG. 15D, which represents a snapshot at eighteen time units elapsed time, shows the first TRUE output pulse 124 and the TRUE timing reference pulse 118 reaching the first transponder 24 simultaneously, and an additional FALSE timing reference pulse 120, which was transmitted from the first initiator 12 about two time units previously. Since the first transponder 24 received two or more TRUE pulses simultaneously, the first transponder 24 will respond by transmitting the third TRUE output pulse 128 (not shown) in about one time unit.

Figure 15E:
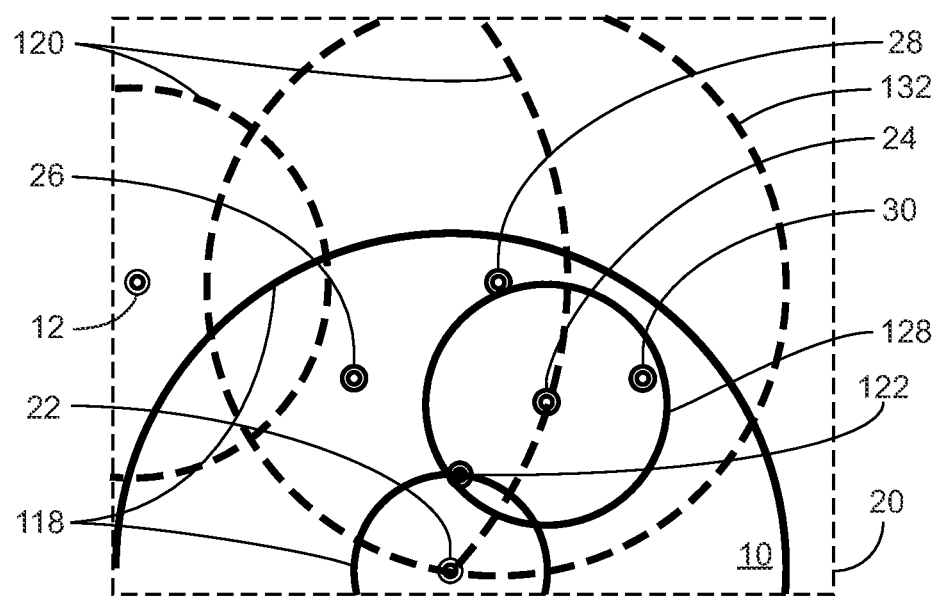

FIG. 15E, which represents a snapshot at twenty-four time units elapsed time, shows the third TRUE output pulse 128 and an additional TRUE timing reference pulse 118 reaching the fifth transponder 122 simultaneously. Since the fifth transponder 122 received two TRUE pulses simultaneously, the fifth transponder 122 will respond by transmitting a FALSE output pulse (not shown) in about one time unit. Since the inverting output of the NOR gate should be FALSE and since the fifth transponder 122 provides the inverting output, the response from the fifth transponder 122 is correct.

FIGS. 16A through 16E illustrate behavior of the Boolean NOR gate using the polychronous wave propagation system 20 with the A input of the NOR gate being in a FALSE state and the B input of the NOR gate being in a TRUE state; therefore, the inverting output of the NOR gate should be FALSE. The states of the A and the B inputs may have been driven into these states by other initiators (not shown), by circuitry driven by the aggregated initiator control information INCI from the control system 64, or both. FIGS. 16A, 16B, 16C, 16D, and 16E may represent snapshots in time of the first wave propagation medium 10 at two time units elapsed time, six time units elapsed time, twelve time units elapsed time, eighteen time units elapsed time, and twenty-four time units elapsed time, respectively.

Figure 16A:
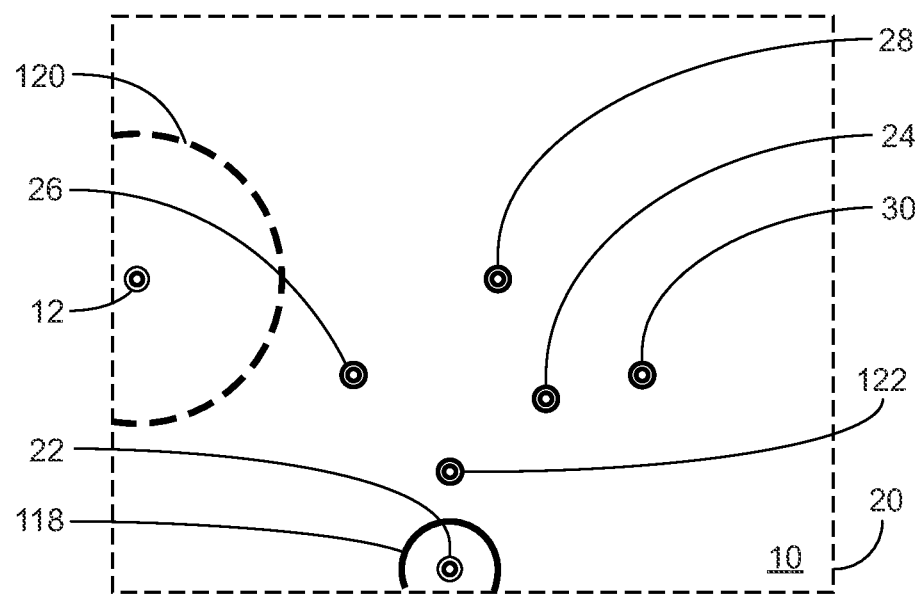
FIGS. 16A through 16E illustrate behavior of the Boolean NOR gate using the polychronous wave propagation system with the A input of the NOR gate being in a FALSE state and the B input of the NOR gate being in a TRUE state.
Figure 16B:
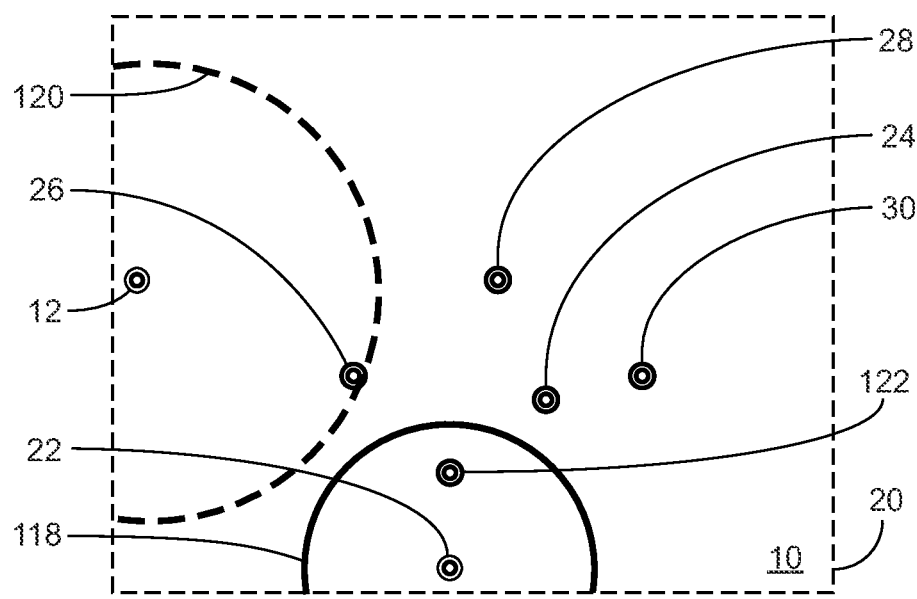

FIG. 16A, which represents a snapshot at two time units elapsed time, shows a TRUE timing reference pulse 118, which was transmitted from the second initiator 22 about two time units previously and a FALSE timing reference pulse 120, which was transmitted from the first initiator 12 about six time units previously; therefore, the TRUE timing reference pulses 118 lag respective FALSE timing reference pulses 120 by about four time units. FIG. 16B, which represents a snapshot at six time units elapsed time, shows the FALSE timing reference pulse 120 reaching the second transponder 26. Since the A input is in a FALSE state and the FALSE timing reference pulse 120 reached the second transponder 26, which represents the A input, the second transponder 26 will transmit the first FALSE output pulse 130 (not shown) in about one time unit.

Figure 16C:
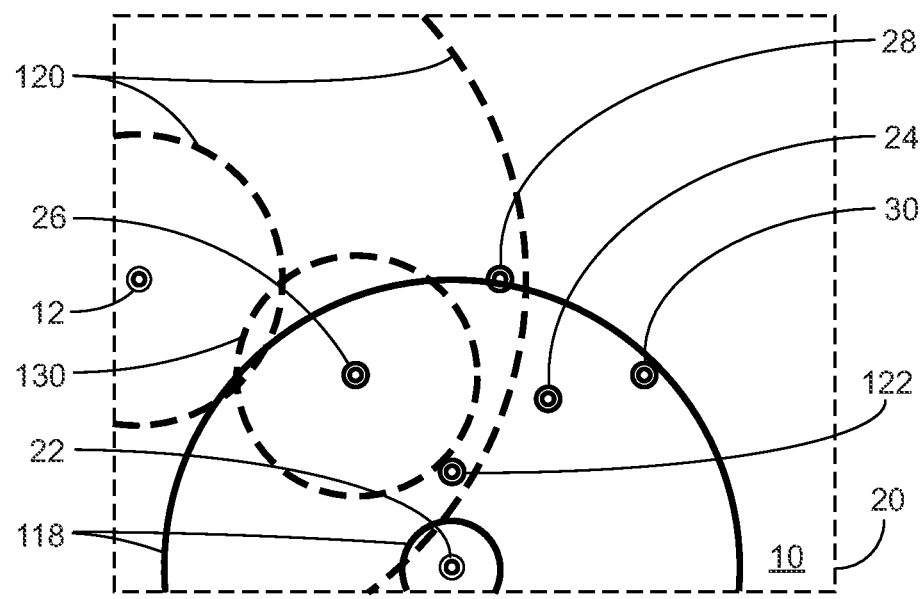

FIG. 16C, which represents a snapshot at twelve time units elapsed time, shows the TRUE timing reference pulse 118 reaching the third transponder 28, the first FALSE output pulse 130, which was transmitted from the second transponder 26 about five time units previously, and an additional TRUE timing reference pulse 118, which was transmitted from the second initiator 22 about two time units previously. Since the B input is in a TRUE state and the TRUE timing reference pulse 118 reached the third transponder 28, which represents the B input, the third transponder 28 will transmit the second TRUE output pulse 126 (not shown) in about onetime unit.

Figure 16D:
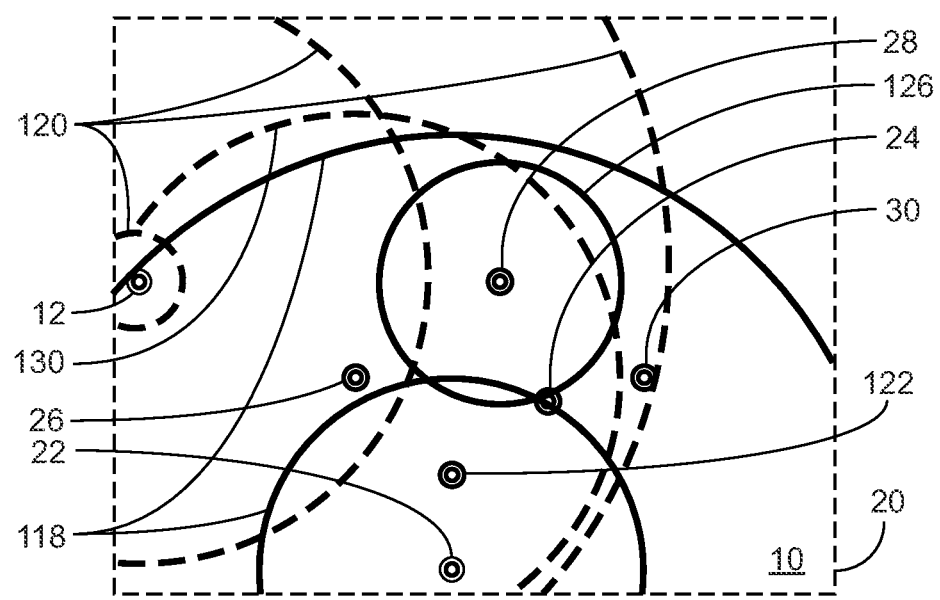

FIG. 16D, which represents a snapshot at eighteen time units elapsed time, shows the second TRUE output pulse 126 and a TRUE timing reference pulse 118 reaching the first transponder 24 simultaneously, and an additional FALSE timing reference pulse 120, which was transmitted from the first initiator 12 about six time units previously. Since the first transponder 24 received two or more TRUE pulses simultaneously, the first transponder 24 will respond by transmitting the third TRUE output pulse 128 (not shown) in about one time unit.

Figure 16E:
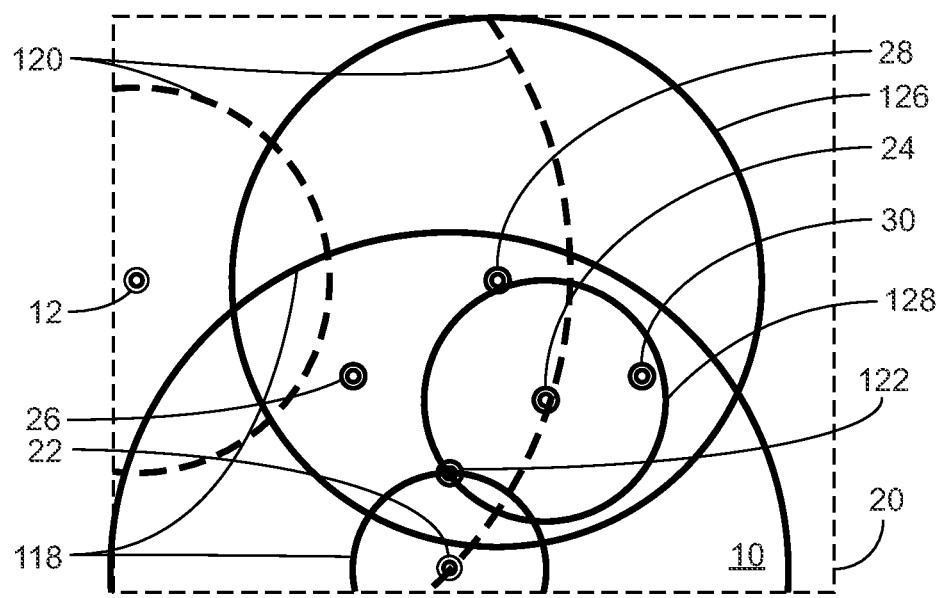

FIG. 16E, which represents a snapshot at twenty-four time units elapsed time, shows the third TRUE output pulse 128 and an additional TRUE timing reference pulse 118 reaching the fifth transponder 122 simultaneously. Since the fifth transponder 122 received two TRUE pulses simultaneously, the fifth transponder 122 will respond by transmitting a FALSE output pulse (not shown) in about one time unit. Since the inverting output of the NOR gate should be FALSE and since the fifth transponder 122 provides the inverting output, the response from the fifth transponder 122 is correct.

FIGS. 17A through 20B illustrate behaviors of the polychronous wave propagation system 20 in which asynchronous waves that have timing relationships to one another are transmitted and propagate through the first wave propagation medium 10. The polychronous wave propagation system 20 includes the first transponder 24, the second transponder 26, the third transponder 28, and in some embodiments the fourth transponder 30. The first, the second, the third, and the fourth transponders 24, 26, 28, 30 may be carefully located with respect to one another to produce desired behaviors in the polychronous wave propagation system 20. Each of the first, the second, the third, and the fourth transponders 24, 26, 28, 30 is not responsive to single pulses, but is responsive to simultaneous pulses having the same state by transmitting a pulse with the same state. For example if the first transponder 24 receives two TRUE pulses simultaneously, the first transponder 24 responds by transmitting a TRUE pulse. Similarly, if the first transponder 24 receives two FALSE pulses simultaneously, the first transponder 24 responds by transmitting a FALSE pulse.

FIGS. 17A through 17E illustrate behavior of a four transponder reverberating memory cell in a TRUE state using the polychronous wave propagation system 20 in one embodiment of the polychronous wave propagation system 20. Typically, the polychronous wave propagation system 20 would provide multiple reverberating memory cells. The four transponder reverberating memory cell operates by programming and preserving a state into the memory cell. The second and the fourth transponders 26, 30 may have been previously driven into the TRUE state by other initiators (not shown), by circuitry driven by the aggregated initiator control information INCI from the control system 64, or both. FIGS. 17A, 17B, 17C, 17D, and 17E may represent snapshots in time of the first wave propagation medium 10 at zero time units elapsed time, three time units elapsed time, nine time units elapsed time, thirteen time units elapsed time, and nineteen time units elapsed time, respectively.

Figure 17A:
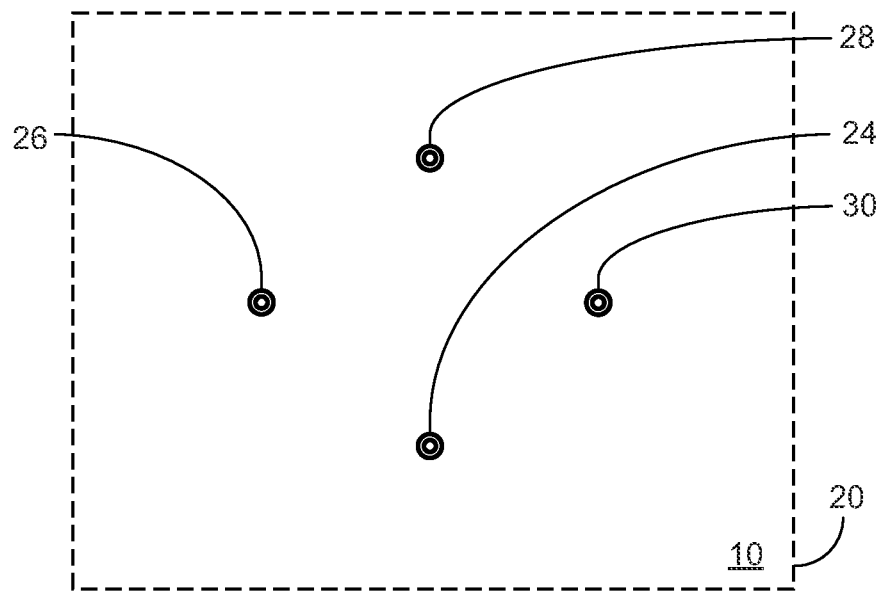
FIGS. 17A through 17E illustrate behavior of a four transponder reverberating memory cell in a TRUE state using the polychronous wave propagation system in one embodiment of the polychronous wave propagation system.
Figure 17B:
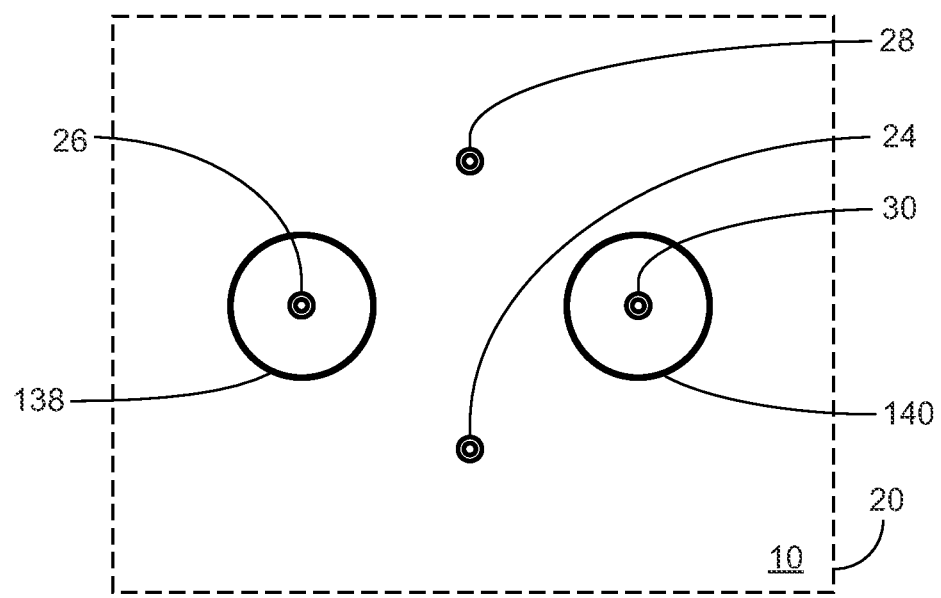
Figure 17C:
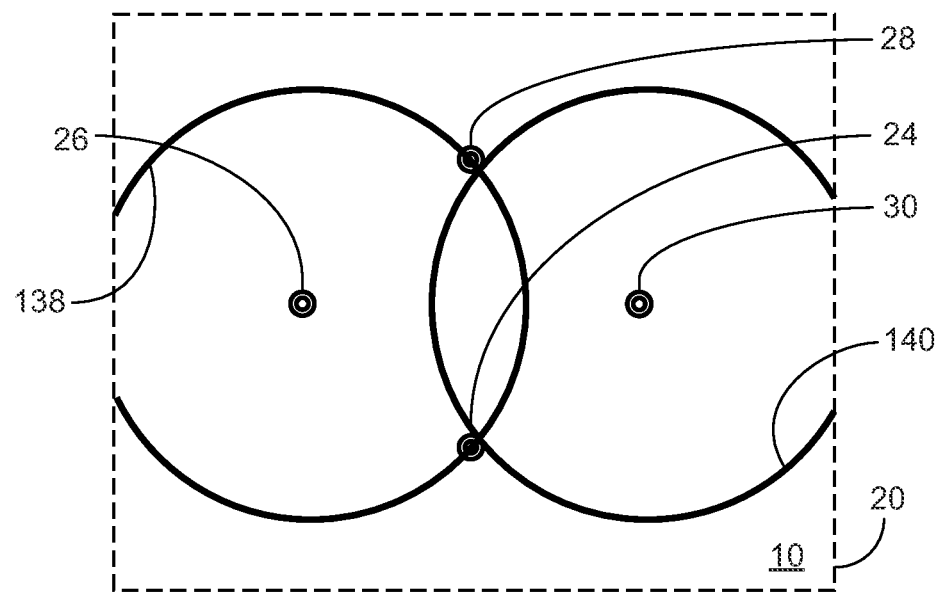

FIG. 17A, which represents a snapshot at zero time units elapsed time, shows the first, the second, the third, and the fourth transponders 24, 26, 28, 30. The second and the fourth transponders 26, 30 are about to transmit first and second TRUE memory pulses 138, 140 (not shown), respectively. FIG. 17B, which represents a snapshot at three time units elapsed time, shows the first and the second TRUE memory pulses 138, 140 provided by the second and the fourth transponders 26, 30, respectively. FIG. 17C, which represents a snapshot at nine time units elapsed time, shows the first and the second TRUE memory pulses 138, 140 simultaneously reaching the third and the first transponders 28, 24. Since the third and the first transponders 28, 24 each received two TRUE pulses simultaneously, the third and the first transponders 28, 24 will each respond by transmitting a third TRUE memory pulse 142 (not shown) and a fourth TRUE memory pulse 144 (not shown), respectively, in about one time unit.

Figure 17D:
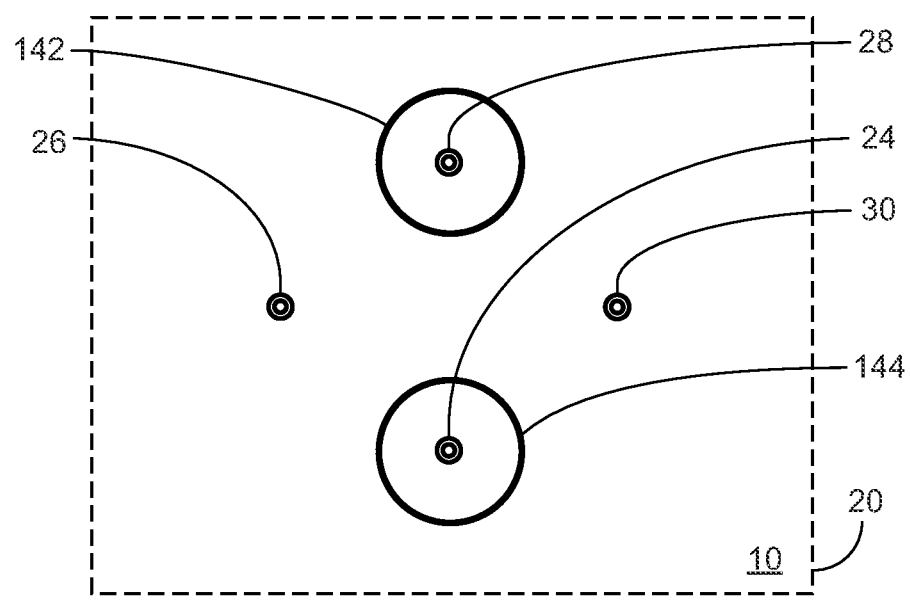
Figure 17E:
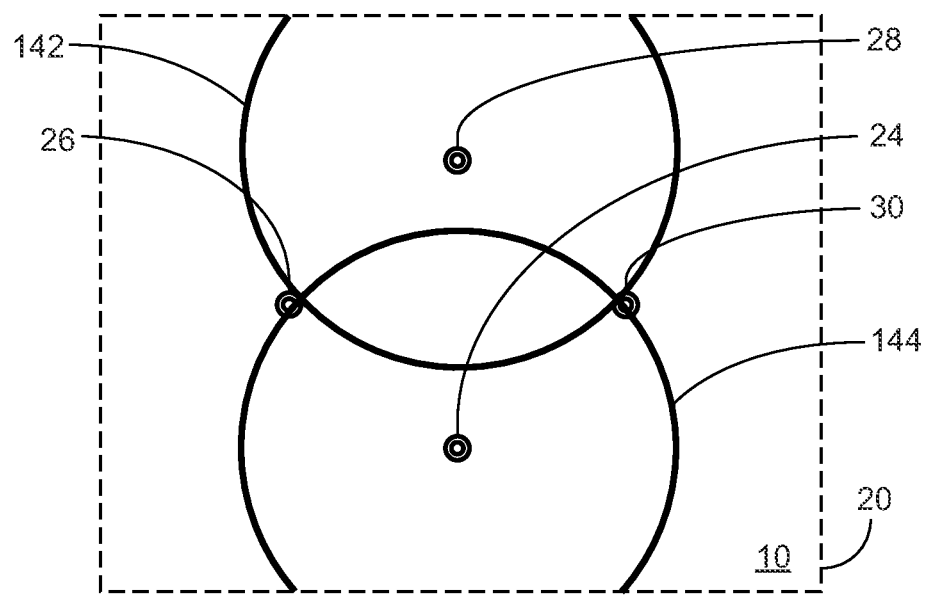
Figure 18A:
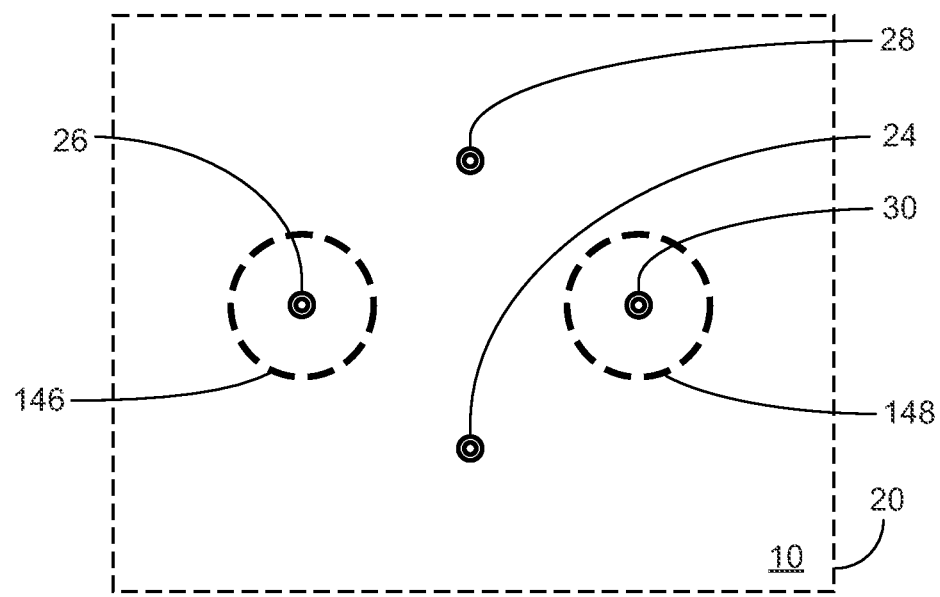
FIGS. 18A through 18D illustrate behavior of the four transponder reverberating memory cell in a FALSE state using the polychronous wave propagation system in one embodiment of the polychronous wave propagation system.
Figure 18B:
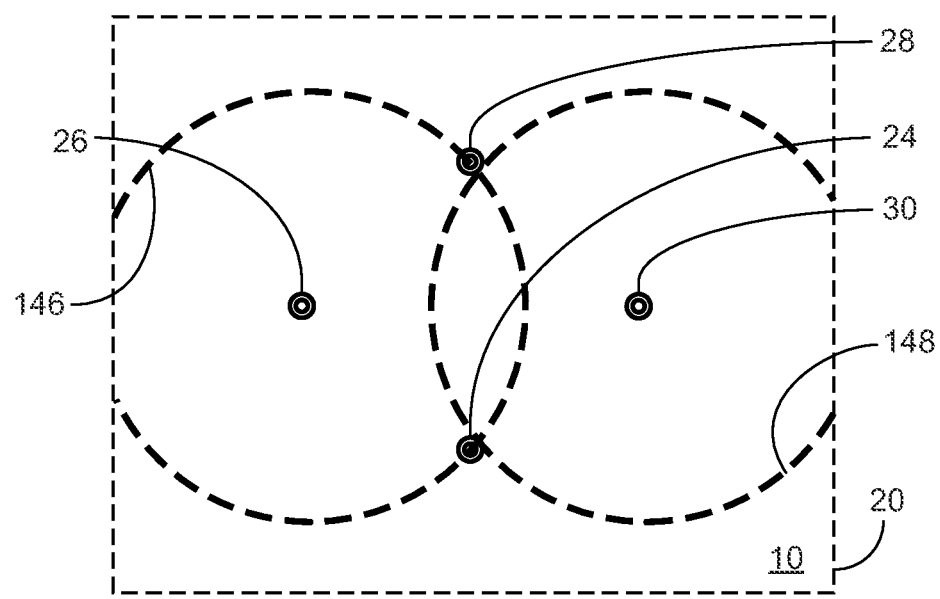
Figure 18C:
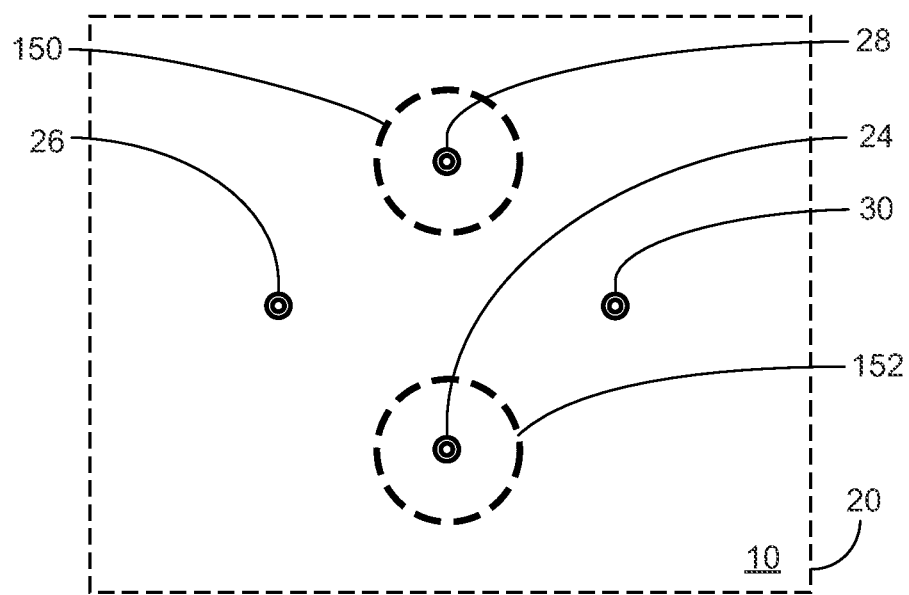
Figure 18D:
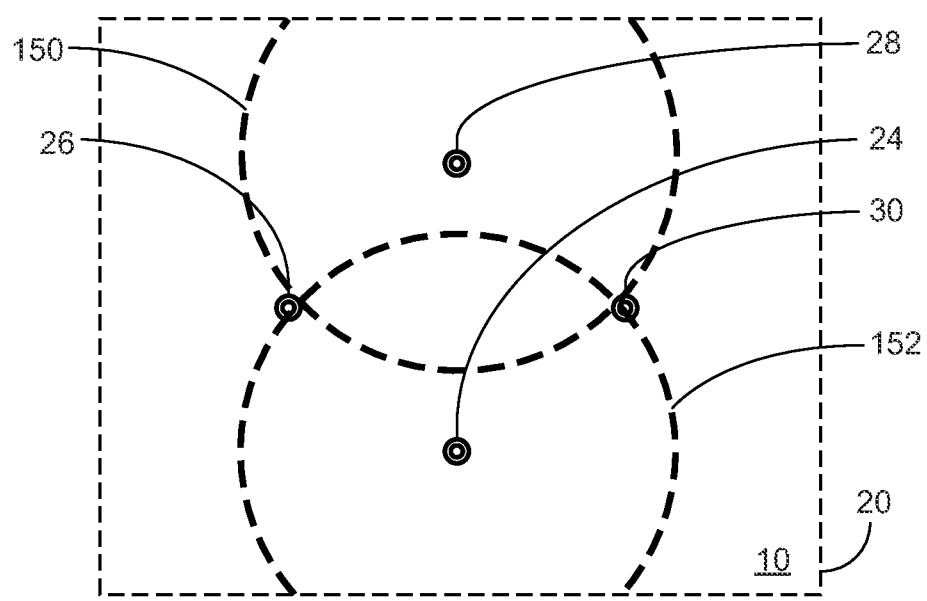

FIG. 17D, which represents a snapshot at thirteen time units elapsed time, shows the third and the fourth TRUE memory pulses 142, 144 provided by the third and the first transponders 28, 24, respectively. FIG. 17E, which represents a snapshot at nineteen time units elapsed time, shows the third and the fourth TRUE memory pulses 142, 144 simultaneously reaching the second and the fourth transponders 26, 30. Since the second and the fourth transponders 26, 30 each received two TRUE pulses simultaneously, the second and the fourth transponders 26, 30 will each respond by re-transmitting the first and the second TRUE memory pulses 138, 140, respectively, (not shown) in about onetime unit, thereby sustaining the TRUE state, which is reverberated between the first, the second, the third, and the fourth transponders 24, 26, 28, 30.

FIGS. 18A through 18D illustrate behavior of a four transponder reverberating memory cell in a FALSE state using the polychronous wave propagation system 20 in one embodiment of the polychronous wave propagation system 20. FIGS. 18A through 18D are similar to FIGS. 17B through 17E, respectively, except the four transponder reverberating memory cell is in a FALSE state instead of a TRUE state and the first, the second, the third, and the fourth TRUE memory pulses 138, 140, 142, 144 are replaced with first, second, third, and fourth FALSE memory pulses 146, 148, 150, 152, respectively.

Figure 19:
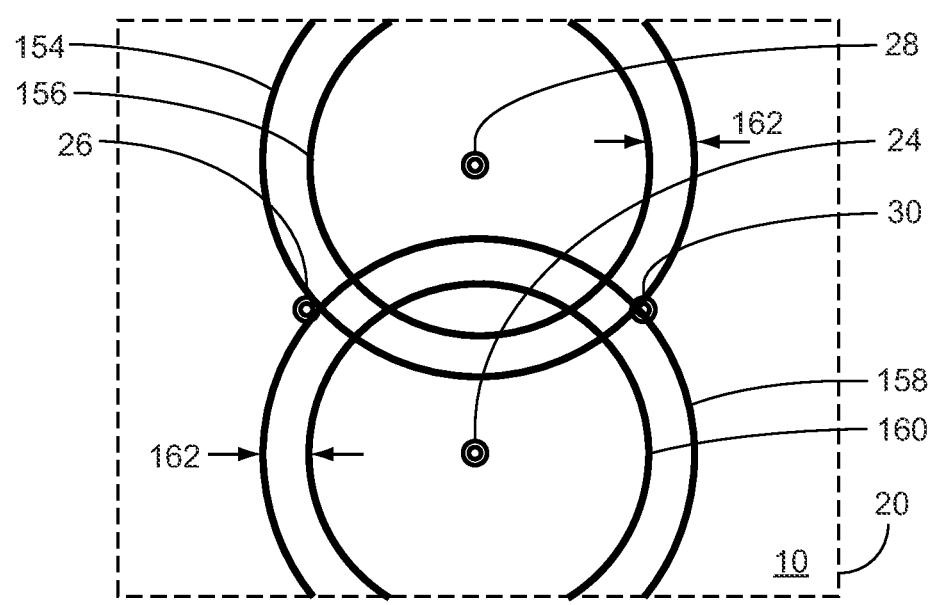
FIG. 19 illustrates behavior of a reverberating memory doublet cell using the polychronous wave propagation system in an alternate embodiment of the polychronous wave propagation system.

FIG. 19 illustrates behavior of a reverberating memory doublet cell using the polychronous wave propagation system 20 in an alternate embodiment of the polychronous wave propagation system 20. Typically, the polychronous wave propagation system 20 would provide multiple reverberating memory doublet cells. The reverberating memory doublet cell is similar to the four transponder reverberating memory cell illustrated in FIGS. 17A through 17E, except instead of reverberating a single pair of memory pulses, such as the first and the second TRUE memory pulses 138, 140 or the third and the fourth TRUE memory pulses 142, 144, the reverberating memory doublet cell reverberates a doublet pair of memory pulses. For example, FIG. 19 may be compared to FIG. 17E, except the third and the fourth TRUE memory pulses 144, 146 are replaced with a first doublet outer ring 154, a first doublet inner ring 156, a second doublet outer ring 158, and a second doublet inner ring 160. The first doublet outer ring 154 and the first doublet inner ring 156 are separated by an inter-pulse interval 162. Similarly, the second doublet outer ring 158 and the second doublet inner ring 160 are separated by the inter-pulse interval 162. The inter-pulse interval 162 is established when the reverberating memory doublet cell is initialized, and since the inter-pulse interval 162 is an analog variable, which is time, the inter-pulse interval 162 may represent any real number.

The reverberating memory doublet cell illustrates a powerful benefit of the present invention. The four transponder reverberating memory cell stores a single memory state, which is either TRUE or FALSE. However, by leveraging upon the asynchronous time delays inherent in the four transponder reverberating memory cell by adding the inter-pulse interval 162, much information may be added.

Figure 20A:
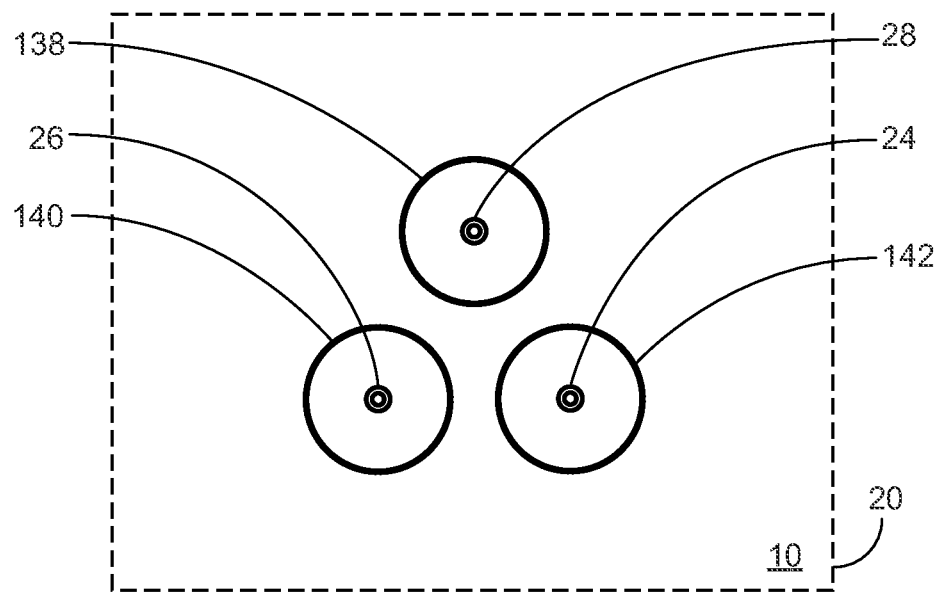
FIGS. 20A and 20B illustrate behavior of a three transponder reverberating memory cell using the polychronous wave propagation system in an additional embodiment of the polychronous wave propagation system.
Figure 20B:
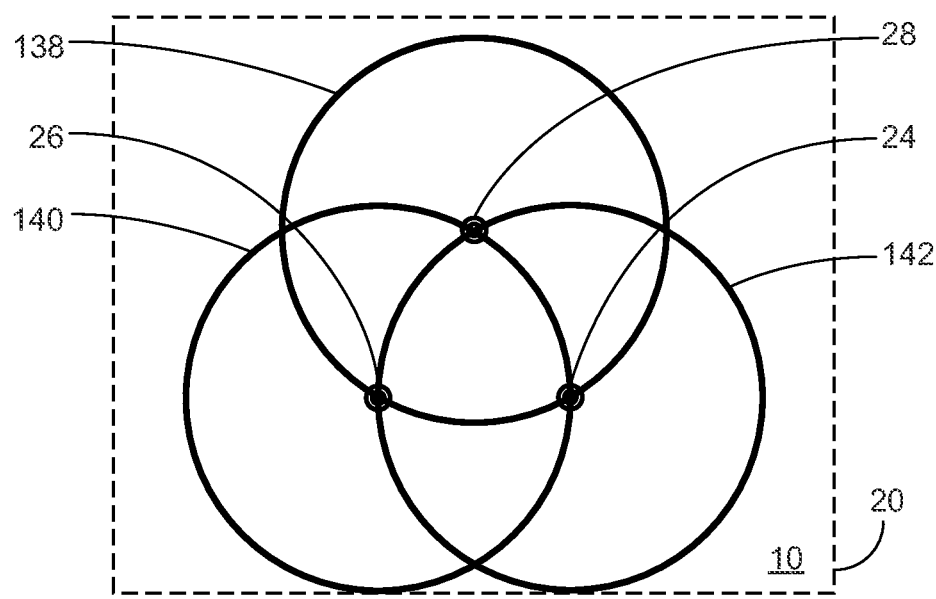

FIGS. 20A and 20B illustrate behavior of a three transponder reverberating memory cell using the polychronous wave propagation system 20 in an additional embodiment of the polychronous wave propagation system 20. The three transponder reverberating memory cell operates by programming and preserving a state into the memory cell using the first, the second and the third transponders 24, 26, 28, which may have been previously driven into the TRUE states by other initiators (not shown), by circuitry driven by the aggregated initiator control information INCI from the control system 64, or both. FIGS. 20A and 20B may represent snapshots in time of the first wave propagation medium 10 at three time units elapsed time and nine time units elapsed time, respectively.

FIG. 20A, which represents a snapshot at three time units elapsed time, shows the first, the second, and the third TRUE memory pulses 138, 140, 142, which were transmitted by the third, the second, and the first transponders 28, 26, 24, respectively. FIG. 20B, which represents a snapshot at nine time units elapsed time, shows the first and the second TRUE memory pulses 138, 140 simultaneously reaching the first transponder 24, the first and the third TRUE memory pulses 138, 142 simultaneously reaching the second transponder 26, and the second and the third TRUE memory pulses 140, 142 simultaneously reaching the third transponder 28. Since the third, the second, and the first transponders 28, 26, 24 each received two TRUE pulses simultaneously, the third, the second, and the first transponders 28, 26, 24 will each respond by re-transmitting the first, the second, and the third TRUE memory pulses 138, 140, 142, respectively, in about one time unit, thereby sustaining the TRUE state, which is reverberated between the first, the second, and the third transponders 24, 26, 28. The FALSE state may be initialized and sustained in the three transponder reverberating memory cell in a similar manner.

Figure 21:
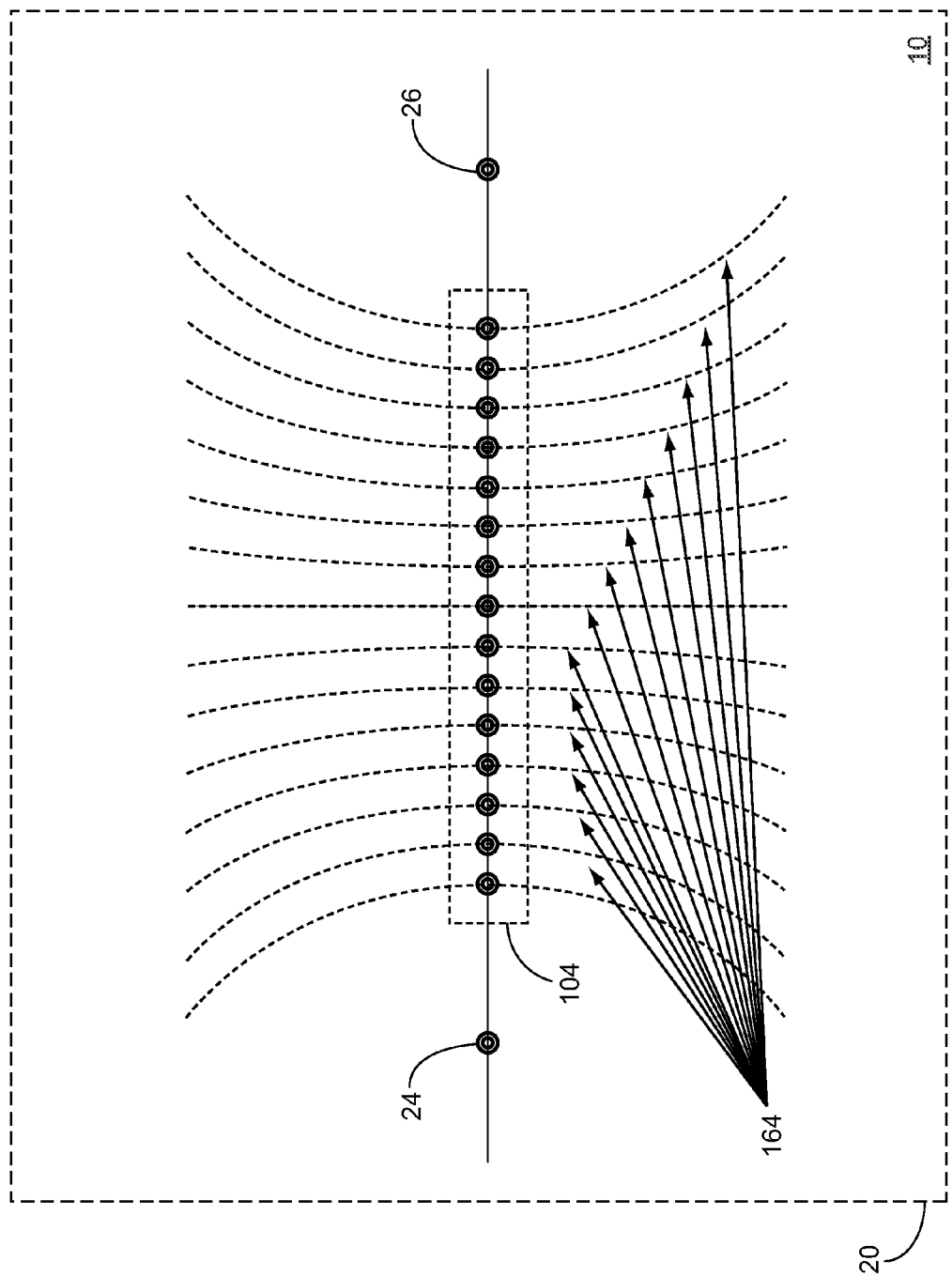
FIG. 21 illustrates frequency detection behavior of the polychronous wave propagation system in another embodiment of the polychronous wave propagation system.

FIG. 21 illustrates frequency detection behavior of the polychronous wave propagation system 20 in another embodiment of the polychronous wave propagation system 20, which includes the first and the second transponders 24, 26, and first transponder array 104, in which asynchronous waves that have timing relationships to one another are transmitted and propagate through the first wave propagation medium 10.

The first and the second transponders 24, 26 have multiple parabolas of intersection 164 that are each representative of timing between wave pulses (not shown) transmitted from each of the first and the second transponders 24, 26. In other words, when either of the first and the second transponders 24, 26 transmits a wave pulse and the other of the first and the second transponders 24, 26 transmits a wave pulse after a specific delay, a parabola of intersection 164 is representative of the specific delay. Different values of the specific delay have different corresponding parabolas of intersection 164. By arranging the first transponder array 104 such that each transponder in the first transponder array 104 is located on one of the parabolas of intersection 164, the first transponder array 104 may detect the value of the specific delay, which may provide useful information. In one embodiment of the present invention, the first transponder 24 transmits a timing reference signal; therefore, successive values of the specific delay are indicative of the frequency of wave pulses transmitted by the second transponder 26.

Figure 22:
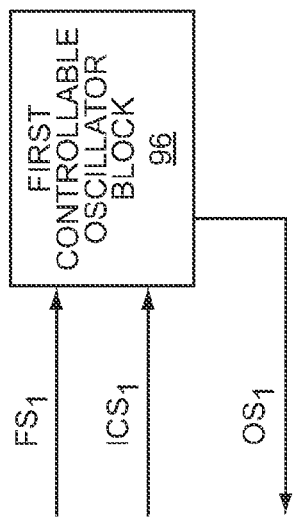
FIG. 22 shows a first controllable oscillator block, which forms part of the first transmit circuitry illustrated in FIG. 8.

FIG. 22 shows the first controllable oscillator block 96, which forms part of the first transmit circuitry 92 illustrated in FIG. 8. One embodiment of the first controllable oscillator block 96 is presented. The first controllable oscillator block 96 may have multiple operating frequency regions, such that some of the regions tend to lock onto a frequency, while other regions do not have any locking tendencies. A stimulation using at least one stimulation signal may alter the regions and determine a stable final frequency after a brief processing interval.

The first controllable oscillator block 96 may have at least one basin of attraction that corresponds with a stable region of the stimulation signal. Additionally, the first controllable oscillator block 96 may function outside of a basin of attraction that corresponds with a non-stable region of the stimulation signal. A stimulation having a stimulation signal within a stable region will produce an output signal within a frequency locking range, whereas, a stimulation having a stimulation signal within a non-stable region will produce an output signal within a non-frequency locking range.

Each stimulation may be initiated using a stimulation signal, which may include the first initialization control signal $ICS_1$, the first forcing signal $FS_1$, or both. Initialization control signals are normally applied only at the beginning of a stimulation, whereas forcing signals are normally applied throughout a stimulation. A forcing signal may establish the basins of attraction, whereas the initiation control signals may determine if the stimulation falls within any of the basins of attraction. Output frequencies are provided by one or more output signals after stabilization in response to a stimulation. Each output signal has at least one output frequency, which is processed by other circuitry to establish relationships between different values of the stimulation signal, and their corresponding frequencies provided by the output signal. These relationships may be used to mimic human brain behaviors, such as associative memory or pattern recognition.

The first initialization control signal $ICS_1$ may set initial conditions of certain parameters associated with an oscillator block, such as a capacitor voltage. The first forcing signal $FS_1$ may include one or more parametric forcing signals that modify behavior of circuitry within the oscillator block. The oscillator block may have multiple basins of attraction that may be manifested as a phase-locked loop having center frequencies and frequency locking ranges that may be modified by specific aspects of the initialization control signal. After stabilization, an output signal may lock to a particular frequency or may have a frequency outside of a lock range, or basin of attraction. In one embodiment of the present invention, the first controllable oscillator block 96 includes a voltage controlled oscillator neuron (VCON) oscillator coupled to a feedback filter. The VCON oscillator is an oscillator that may mimic neuron-like behaviors. The first controllable oscillator block 96 may include phase-locked loop circuitry.

FIG. 22 shows the first controllable oscillator block 96, which receives the first initialization control signal $ICS_1$ and the first forcing signal $FS_1$. The first initialization control signal $ICS_1$ may set initial conditions of certain parameters associated with the first controllable oscillator block 96, such as one or more initial capacitor voltages. The first forcing signal $FS_1$ may include one or more parametric forcing signals that modify behavior of circuitry within the first controllable oscillator block 96. The first controllable oscillator block 96 provides the first output signal $OS_1$, which has at least one output frequency. After stabilization, the output frequency may be locked to a specific frequency in a basin of attraction, and may be based on the first initialization control signal $ICS_1$, the first forcing signal $FS_1$, or both.

Figure 23:
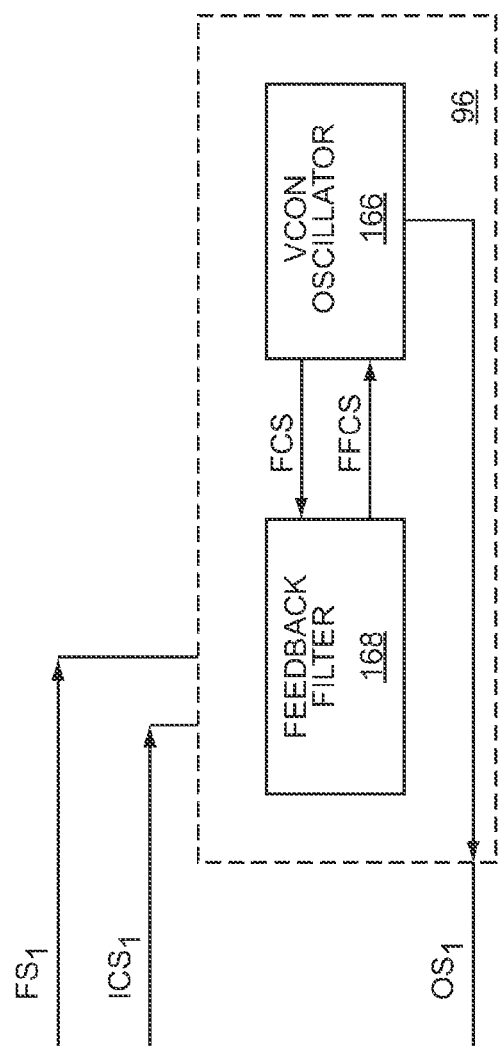
FIG. 23 shows details of the first controllable oscillator block illustrated in FIG. 22, according to one embodiment of the first controllable oscillator block.

FIG. 23 shows details of the first controllable oscillator block 96 illustrated in FIG. 22, according to one embodiment of the first controllable oscillator block 96. A VCON oscillator 166 provides the first output signal $OS_1$ and a frequency control signal FCS to a feedback filter 168. The first output signal $OS_1$ has a frequency based on a frequency of the VCON oscillator 166, which is based on the first initialization control signal $ICS_1$, the first forcing signal $FS_1$, or both. The frequency control signal FCS is based on the frequency of the VCON oscillator 166. The feedback filter 168 filters the frequency control signal FCS to provide a filtered frequency control signal FFCS to the VCON oscillator 166. The feedback filter 168 may include a low pass filter, a band pass filter, or other type of filter. The feedback filter 168 may have a feedback filter transfer function H(s), which is a function of frequency and may be equal to a magnitude and phase of the filtered frequency control signal FFCS divided by a magnitude and phase of the frequency control signal FCS.

Figure 24:
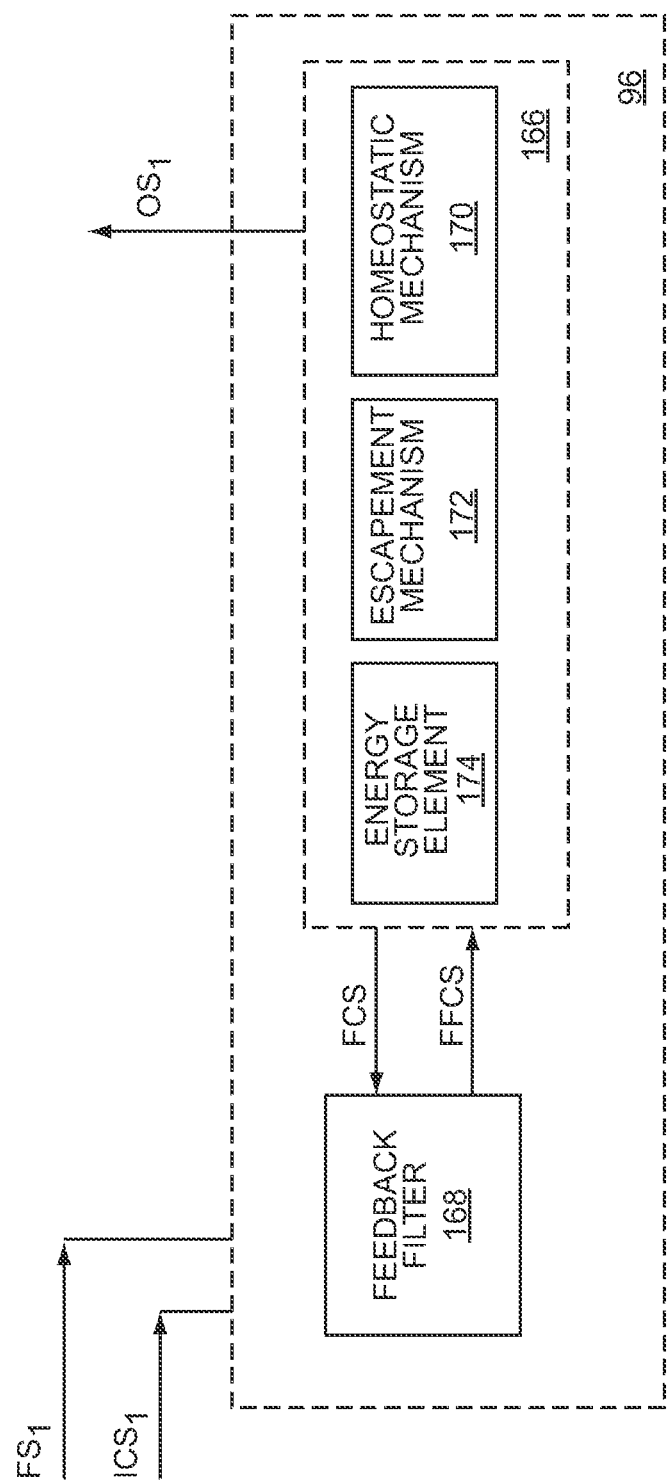
FIG. 24 shows details of a voltage controlled oscillator neuron (VCON) oscillator illustrated in FIG. 23.

FIG. 24 shows details of the VCON oscillator 166 illustrated in FIG. 23. The VCON oscillator 166 mimics certain behaviors in a brain by combining a homeostatic mechanism 170, an escapement mechanism 172, and an energy storage element 174. The homeostatic mechanism 170 is a mechanism that can achieve or maintain equilibrium, or stability, by means of adjustments. A voltage controlled oscillator (VCO) is an example of a homeostatic mechanism 170. A VCO can maintain a stable output frequency by adjusting its input voltage. The escapement mechanism 172 is a mechanism that can be used to provide feedback to regulate a system. A classic mechanical example is an escapement gear in a pendulum clock. The escapement gear controls extraction of energy from a mainspring, weights, etc. to the pendulum at the proper point in the swing of the pendulum, thereby maintaining oscillation at the proper frequency. An electrical circuit having a positive resistance region and a negative resistance region can serve as an escapement mechanism by providing basins of attraction formed by coupling the escapement mechanism 172 with other circuitry, such as the homeostatic mechanism 170 and the energy storage element 174. The escapement mechanism 172 may have at least one positive resistance region, at least one negative resistance region, or both. A tunnel diode is an example of an escapement mechanism having a positive resistance region and a negative resistance region. A resistor is an example of an escapement mechanism having only a positive resistance region.

Fundamentals of using a polychronous wave propagation system 20 to perform arithmetic computations will be described using the two-node polychronous wave propagation system 20 illustrated in FIG. 21. As previously mentioned, FIG. 21 illustrates the polychronous wave propagation system 20 having the first and the second transponders 24, 26 and the first transponder array 104, in which asynchronous waves that have timing relationships to one another are transmitted and propagate through the first wave propagation medium 10 with a propagation velocity (PV). The first and the second transponders 24, 26 have multiple parabolas of intersection 164 that are each representative of timing between wave pulses (not shown) transmitted from each of the first and the second transponders 24, 26. In the example shown, the first transponder array 104 includes a corresponding transponder for each of the possible parabolas of intersection 164 that fall between the first and the second transponders 24, 26. Therefore, asynchronous waves having timing relationships to one another and are transmitted and propagated through the first wave propagation medium 10 associated with the first transponder array 104 are detectable. Each of the transponders in the first transponder array 104 may be representative of a result of an arithmetical computation.

In general, the polychronous wave propagation system 20 may provide polychronous activity that may be analogous to polychronous activity in a brain. The polychronous wave propagation system 20 may include multiple initiators, such as those provided by the first and the second transponders 24, 26, disposed in the first wave propagation medium 10, and may include multiple responders, such as those provided by the first and the second transponders 24, 26, disposed in the first wave propagation medium 10. Each of the initiators may transmit waves having encoded information through the first wave propagation medium 10. At least a first parabola of intersection 164 may be defined in the first wave propagation medium 10 based on timing of transmission of the encoded information from each of a first pair of the initiators. The parabolas of intersection 164 may be representative of an arithmetical relationship between the transmission of the encoded information from the pair of the initiators. A corresponding one of the responders may be located on each of the parabolas of intersection 164. As such, each corresponding one of the responders may be capable of detecting information based on timing between reception of encoded information from each of the first pair of initiators. Operational behavior of the polychronous wave propagation system 20 may be based on the detected information. The operational behavior may include arithmetical computations, such as additions, subtractions, multiplications, divisions, modular arithmetic, the like, or any combination thereof.

The detected information associated with the corresponding one of the responders may be based on simultaneous reception of the encoded information from the first pair of initiators. As previously mentioned, the first wave propagation medium 10 may include a solid material, a longest dimension of the first wave propagation medium 10 may be less than about one meter, the first wave propagation medium 10 may form a nano-structure, the multiple initiators may be disposed in fixed positions in the first wave propagation medium 10, the multiple responders may be disposed in fixed positions in the first wave propagation medium 10, or any combination thereof.

Figure 25:
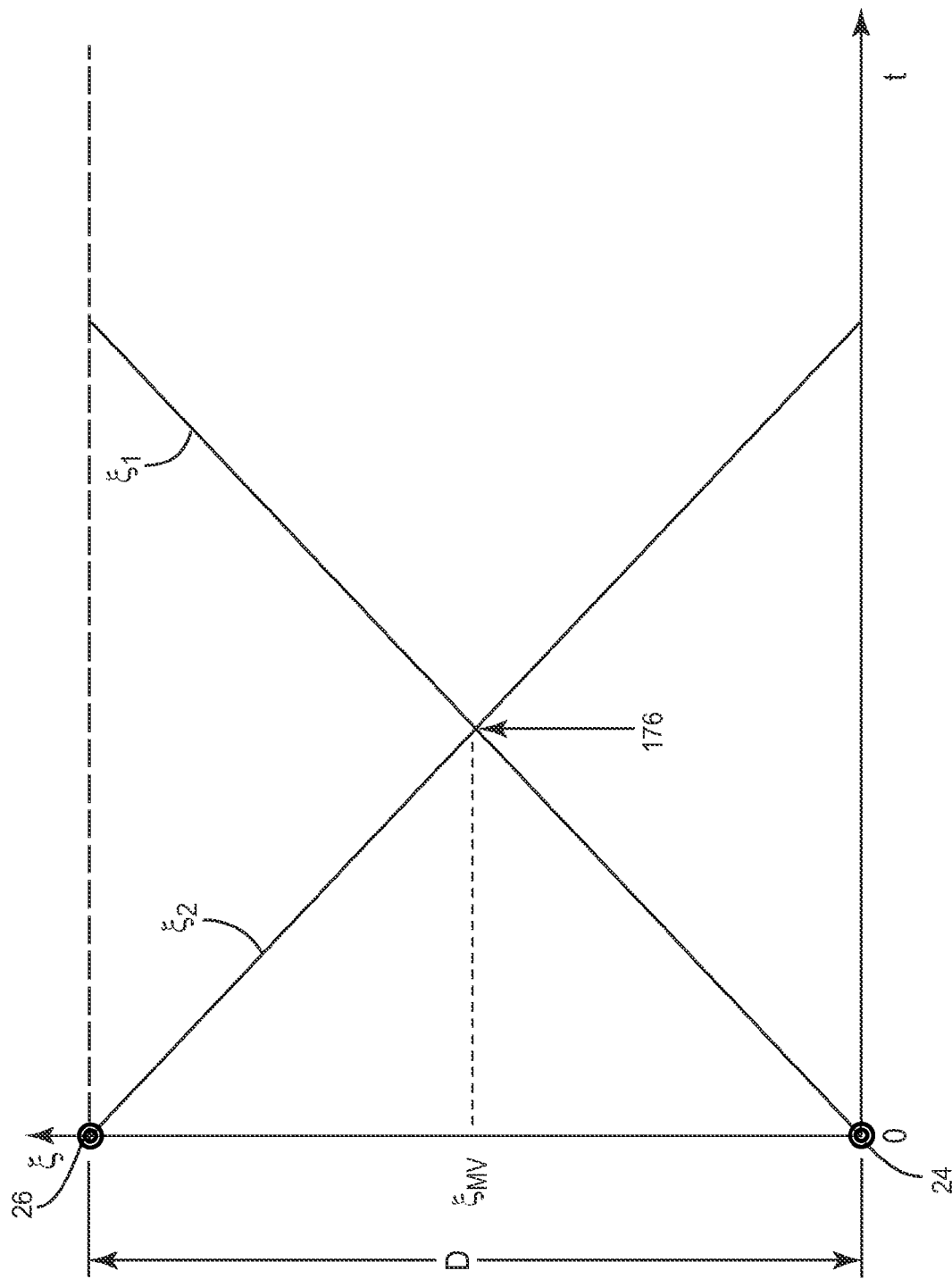
FIG. 25 shows a graph illustrating first and second spatial variables of a line segment between first and second transponders illustrated in FIG. 21 versus time according to one embodiment of the polychronous wave propagation system illustrated in FIG. 21.

FIG. 25 shows a two-dimensional Cartesian coordinate system overlaid over the polychronous wave propagation system 20 illustrated in FIG. 21, such that the first transponder 24 is located at the origin and the second transponder 26 is located on the dependent (vertical) axis. The independent (horizontal) axis is representative of elapsed time t of wavefronts of propagated waves from the first and the second transponders 24, 26. The vertical axis is representative of a spatial variable $\xi$, which is representative of the locations of the wavefronts of the propagated waves on the line segment between the first and the second transponders 24, 26. The first and the second transponders 24, 26 are separated by a distance D from one another. Therefore, the coordinates of the first transponder 24 are (0, 0) and the coordinates of the second transponder 26 are 0, D). As such, the locations of the wavefronts of the propagated waves relative to time may be represented by linear equations, as illustrated in FIG. 25 and subsequent figures. An intersection of the wavefronts of the propagated waves on the line segment between the first and the second transponders 24, 26 may be detected by one of the transponders in the first transponder array 104 (FIG. 21). This intersection occurs at an intersection spatial value $\xi_{INT}$.

FIG. 25 shows first and second spatial variables $\xi_1$, $\xi_2$ of waves initiated from the first and the second transponders 24, 26 (FIG. 21), respectively, at t=0 according to one embodiment of the polychronous wave propagation system 20 illustrated in FIG. 21. EQ. 1 and EQ. 2 are equations representing the first and the second spatial variables $\xi_1$, $\xi_2$, respectively, as shown below.

$$\xi_1 = t(PV). \qquad \text{EQ. 1:}$$

$$\xi_2 = D - t(PV). \qquad \text{EQ. 2:}$$

For the purposes of illustration, the PV is assumed to be one unit of distance per one unit of time for the following illustrations. As such, EQ. 1 and EQ. 2 reduce to EQ. 1A and EQ. 2A, respectively.

$$\xi_1 = t. \qquad \text{EQ. 1A:}$$

$$\xi_2 = D - t. \qquad \text{EQ. 2A:}$$

The first and the second spatial variables $\xi_1$, $\xi_2$ intersect at a first intersection point 176, such that $\xi_{INT} = \xi_1 = \xi_2$. Setting EQ. 1A equal to EQ. 2A gives D−t=t, therefore, t=D/2. Substituting back into EQ. 1A gives $\xi_1 = t = D/2 = \xi_{INT}$. Since D/2 is midway between the first and the second transponders 24, 26, the intersection spatial value $\xi_{INT}$ is equal to a middle spatial value $\xi_{MV}$.

Figure 26:
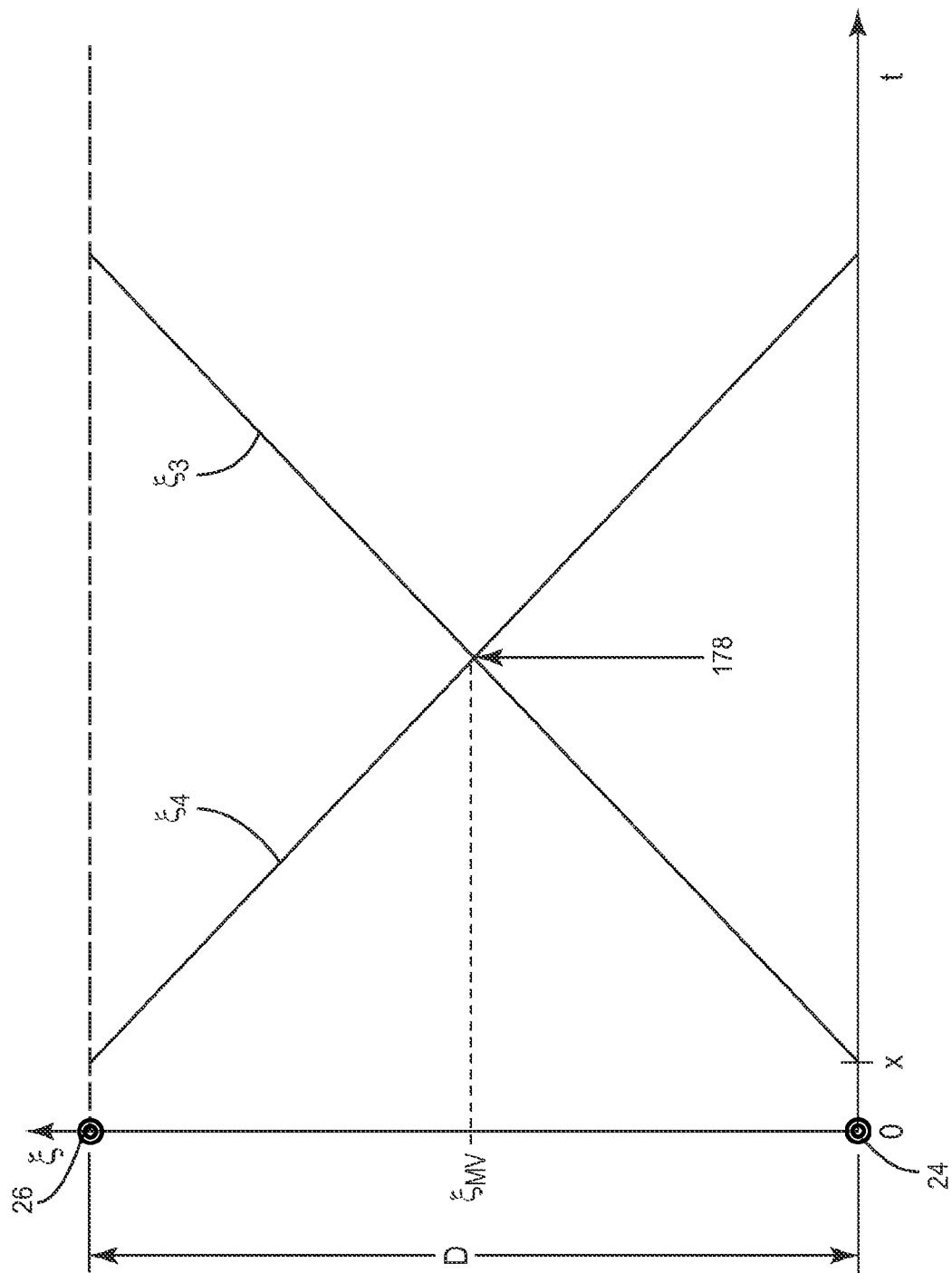
FIG. 26 shows a graph illustrating third and fourth spatial variables of the line segment between the first and the second transponders illustrated in FIG. 21 versus time according to an alternate embodiment of the polychronous wave propagation system illustrated in FIG. 21.

FIG. 26 shows third and fourth spatial variables $\xi_3$, $\xi_4$ of waves initiated from the first and the second transponders 24, 26 (FIG. 21), respectively, at t=x according to an alternate embodiment of the polychronous wave propagation system 20 illustrated in FIG. 21. EQ. 3 and EQ. 4 are equations representing the first and the second spatial variables $\xi_3$, $\xi_4$, respectively, as shown below.

$$\xi_3 = t - x \text{ (for } t > x). \qquad \text{EQ. 3:}$$

$$\xi_4 = D + x - t \text{ (for } t > x). \qquad \text{EQ. 4:}$$

The third and the fourth spatial variables $\xi_3$, $\xi_4$ intersect at a second intersection point 178, such that $\xi_{INT} = \xi_3 = \xi_4$. Setting EQ. 3 equal to EQ. 4 gives D+x−t=t−x, therefore, t=x+D/2. Substituting back into EQ. 3 gives $\xi_3 = t - x = x + D/2 - x = D/2 = \xi_{INT}$. Since D/2 is midway between the first and the second transponders 24, 26, the intersection spatial value $\xi_{INT}$ is equal to the middle spatial value $\xi_{MV}$.

Figure 27:
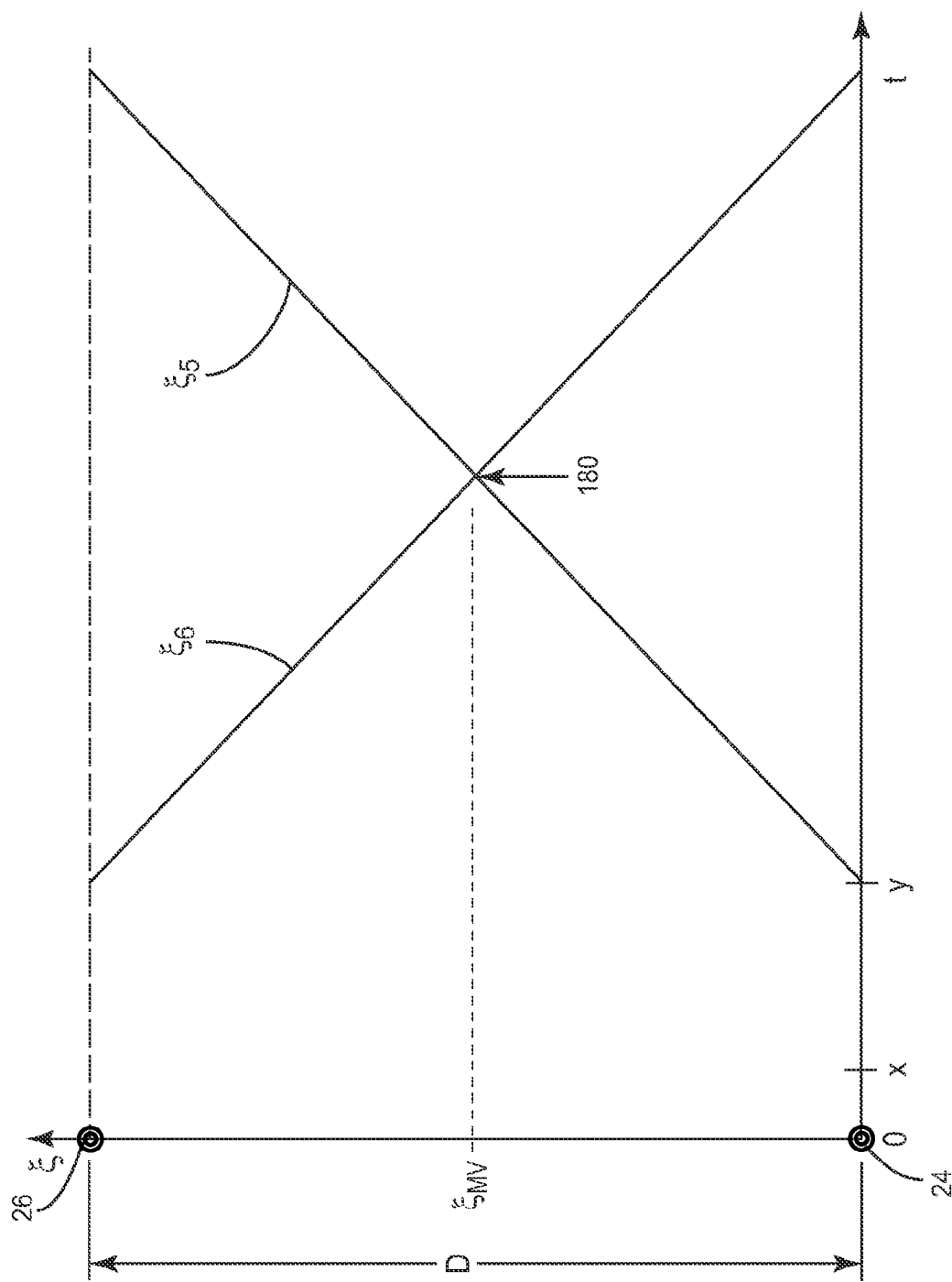
FIG. 27 shows a graph illustrating fifth and sixth spatial variables of the line segment between the first and the second transponders illustrated in FIG. 21 versus time according to an additional embodiment of the polychronous wave propagation system illustrated in FIG. 21.

FIG. 27 shows fifth and sixth spatial variables $\xi_5$, $\xi_6$ of waves initiated from the first and the second transponders 24, 26 (FIG. 21), respectively, at t=y according to an alternate embodiment of the polychronous wave propagation system 20 illustrated in FIG. 21. EQ. 5 and EQ. 6 are equations representing the fifth and the sixth spatial variables $\xi_5$, $\xi_6$, respectively, as shown below.

$$\xi_5 = t - y \text{ (for } t > y). \qquad \text{EQ. 5:}$$

$$\xi_6 = D + y - t \text{ (for } t > y). \qquad \text{EQ. 6:}$$

The fifth and the sixth spatial variables $\xi_5$, $\xi_6$ intersect at a third intersection point 178, such that $\xi_{INT}=\xi_5=\xi_6$. Setting EQ. 5 equal to EQ. 6 gives D+y−t=t−y, therefore, t=y+D/2. Substituting back into EQ. 5 gives=$\xi_5$=t−y=y+D/2−y=D/2=$\xi_{INT}$. Since D/2 is midway between the first and the second transponders 24, 26, the intersection spatial value $\xi_{INT}$ is equal to the middle spatial value $\xi_{MV}$.

Figure 28:
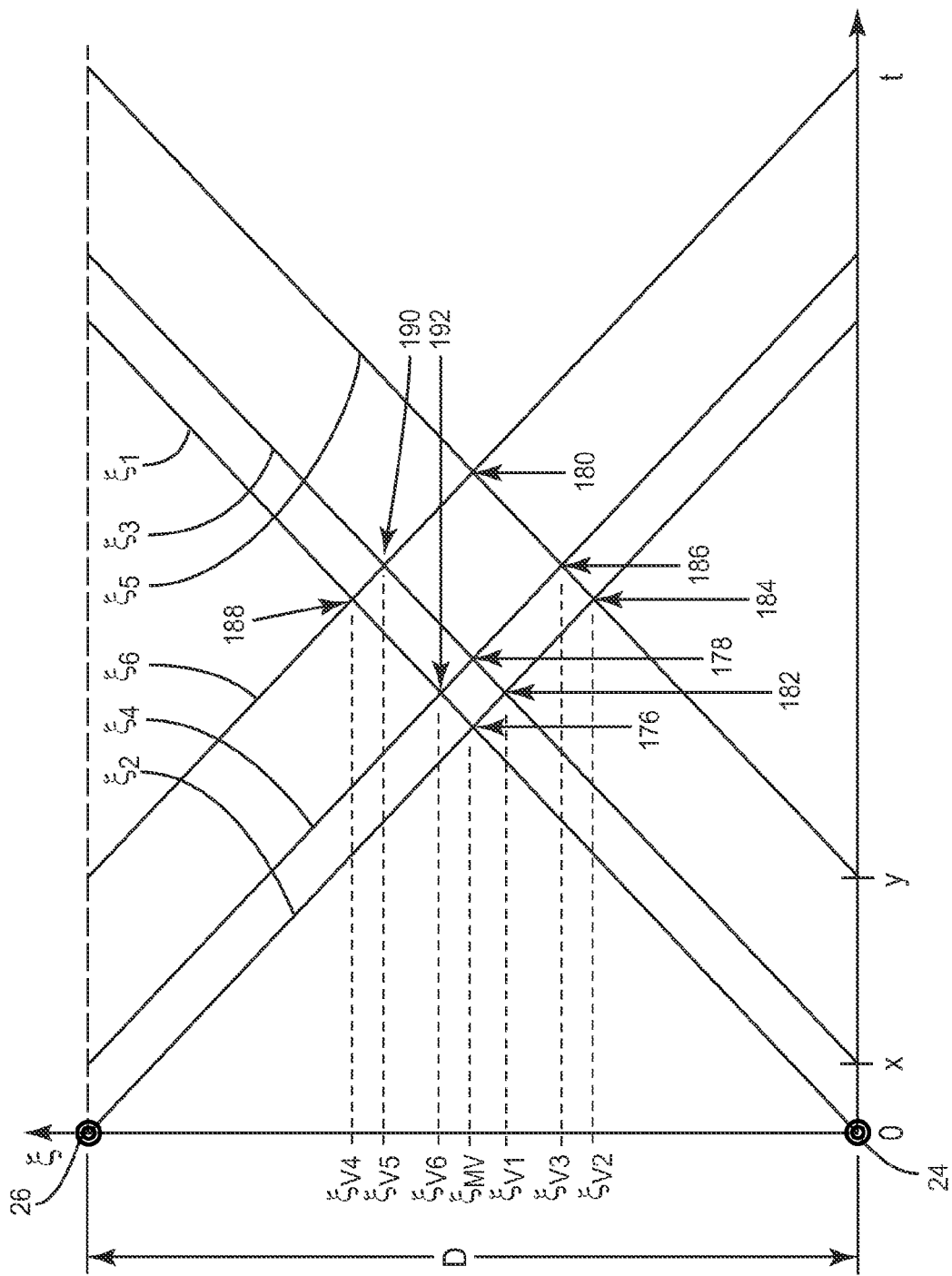
FIG. 28 shows a graph illustrating a combination of the first, the second, the third, the fourth, the fifth and the sixth spatial variables illustrated in FIGS. 25-27 according to another embodiment of the polychronous wave propagation system illustrated in FIG. 21.

FIG. 28 shows a combination of the first, the second, the third, the fourth, the fifth and the sixth spatial variables $\xi_1$, $\xi_2$, $\xi_3$, $\xi_4$, $\xi_5$, $\xi_6$ illustrated in FIGS. 25-27 according to one embodiment of the polychronous wave propagation system 20 illustrated in FIG. 21. As such, waves are initiated from the first and the second transponders 24, 26 (FIG. 21), respectively, at t=0, at t=x, and at t=y. Intersections of these waves occur at nine intersection points, as illustrated. Specifically, the first and the second spatial variables $\xi_1$, $\xi_2$ intersect at the first intersection point 176, such that $\xi_{INT}=\xi_1=\xi_2=\xi_{MV}$. The third and the fourth spatial variables $\xi_3$, $\xi_4$ intersect at the second intersection point 178, such that $\xi_{INT}=\xi_3=\xi_4=\xi_{MV}$. The fifth and the sixth spatial variables $\xi_5$, $\xi_6$ intersect at the third intersection point 180, such that $\xi_{INT}=\xi_5=\xi_6=\xi_{MV}$.

The second and the third spatial variables $\xi_2$, $\xi_3$ intersect at a fourth intersection point 182, such that $\xi_{INT}=\xi_2=\xi_3$. The intersection spatial value $\xi_{INT}$ is equal to a first spatial value $\xi_{V1}$. Setting EQ. 2A equal to EQ. 3 gives D−t=t−x, therefore, t=x/2+D/2. Substituting back into EQ. 2A gives=$\xi_2$=D−t=D−x/2−D/2=D/2−x/2=$\xi_{V1}$. Therefore, $$\xi_{V1}=D/2-x/2. \quad \text{EQ. 7:}$$

The second and the fifth spatial variables $\xi_2$, $\xi_5$ intersect at a fifth intersection point 184, such that $\xi_{INT}=\xi_2=\xi_5$. The intersection spatial value $\xi_{INT}$ is equal to a second spatial value $\xi_{V2}$. Setting EQ. 2A equal to EQ. 5 gives D−t=t−y, therefore, t=y/2+D/2. Substituting back into EQ. 2A gives=$\xi_2$=D−t=D−y/2−D/2=D/2−y/2=$\xi_{V2}$.

The fourth and the fifth spatial variables $\xi_4$, $\xi_5$ intersect at a sixth intersection point 186, such that $\xi_{INT}=\xi_4=\xi_5$. The intersection spatial value $\xi_{INT}$ is equal to a third spatial value $\xi_{V3}$. Setting EQ. 4 equal to EQ. 5 gives D+x−t=t−y, therefore, t=x/2+y/2+D/2. Substituting back into EQ. 5 gives=$\xi_5$=t−y=D/2+x/2+y/2−y=D/2+(x−y)/2=$\xi_{V3}$. Therefore, $$\xi_{V3}=D/2+(x-y)/2. \quad \text{EQ. 8:}$$

The first and the sixth spatial variables $\xi_1$, $\xi_6$ intersect at a seventh intersection point 188, such that $\xi_{INT}=\xi_1=\xi_6$. The intersection spatial value $\xi_{INT}$ is equal to a fourth spatial value $\xi_{V4}$. Setting EQ. 1A equal to EQ. 6 gives t=D+y−t, therefore, t=y/2+D/2. Substituting back into EQ. 1A gives=$\xi_1$=t=D/2+y/2=$\xi_{V4}$.

The third and the sixth spatial variables $\xi_3$, $\xi_6$ intersect at an eighth intersection point 190, such that $\xi_{INT}=\xi_3=\xi_6$. The intersection spatial value $\xi_{INT}$ is equal to a fifth spatial value $\xi_{V5}$. Setting EQ. 3 equal to EQ. 6 gives t−x=D+y−t, therefore, t=x/2+y/2+D/2. Substituting back into EQ. 3 gives=$\xi_3$=t−x=D/2+x/2+y/2−x=D/2+(y−x)/2=$\xi_{V5}$. Therefore, $$\xi_{V5}=D/2+(y-x)/2. \quad \text{EQ. 9:}$$

The first and the fourth spatial variables $\xi_1$, $\xi_4$ intersect at a ninth intersection point 192, such that $\xi_{INT}=\xi_1=\xi_4$. The intersection spatial value $\xi_{INT}$ is equal to a sixth spatial value $\xi_{V6}$. Setting EQ. 1A equal to EQ. 4 gives t=D+x−t, therefore, t=x/2+D/2. Substituting back into EQ. 1A gives=$\xi_1$=t=D/2+x/2=$\xi_{V6}$. Therefore, $$\xi_{V6}=D/2+x/2. \quad \text{EQ. 10:}$$

Figure 29:
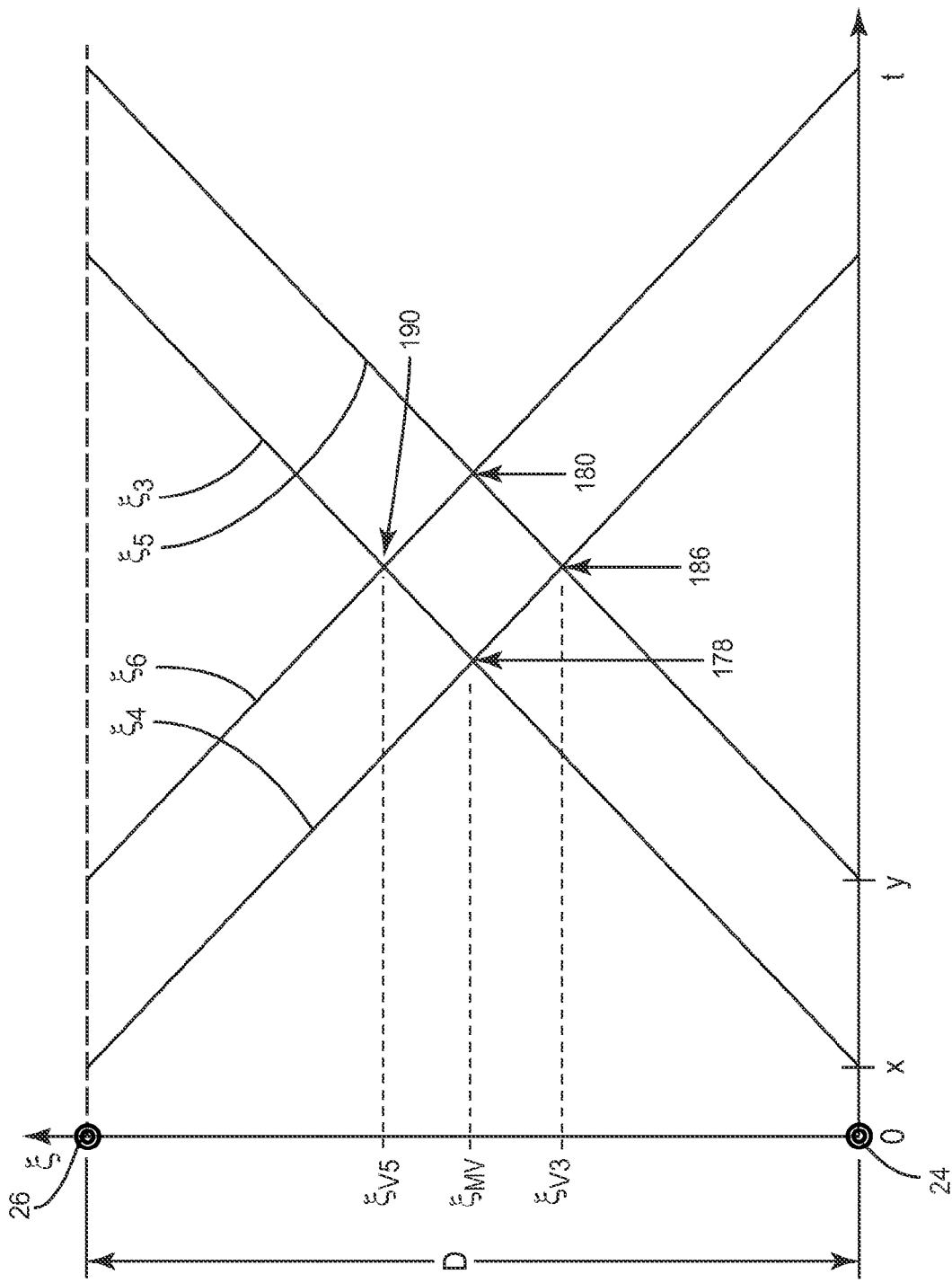
FIG. 29 shows a graph illustrating a combination of the third, the fourth, the fifth and the sixth spatial variables illustrated in FIG. 28 according to one embodiment of the polychronous wave propagation system illustrated in FIG. 21.

FIG. 29 is used to illustrate the arithmetical computation of subtraction. In this regard, FIG. 29 shows a combination of the third, the fourth, the fifth and the sixth spatial variables $\xi_3$, $\xi_4$, $\xi_5$, $\xi_6$ illustrated in FIG. 28 according to one embodiment of the polychronous wave propagation system 20 illustrated in FIG. 21. As such, waves are initiated from the first and the second transponders 24, 26 (FIG. 21) at t=x and at t=y. Intersections of these waves occur at four intersection points, as illustrated. As previously mentioned, the third and the fourth spatial variables $\xi_3$, $\xi_4$ intersect at the second intersection point 178, such that $\xi_{INT}=\xi_3=\xi_4=\xi_{MV}$. The fifth and the sixth spatial variables $\xi_5$, $\xi_6$ intersect at the third intersection point 180, such that $\xi_{INT}=\xi_5=\xi_6=\xi_{MV}$.

The fourth and the fifth spatial variables $\xi_4$, $\xi_5$ intersect at the sixth intersection point 186, such that $\xi_{INT}=\xi_4=\xi_5$. The intersection spatial value $\xi_{INT}$ is equal to the third spatial value $\xi_{V3}$, which is equal to D/2+(x−y)/2 as shown in EQ. 8. Therefore, a transponder in the first transponder array 104 (FIG. 21) located at the third spatial value $\xi_{V3}$ may detect the waves that are initiated from the first and the second transponders 24, 26 (FIG. 21) at t=x and at t=y. As such, the transponder in the first transponder array 104 (FIG. 21) located at the third spatial value $\xi_{V3}$ may be representative of subtraction as a difference between x and y. Specifically, the transponder in the first transponder array 104 (FIG. 21) located at the third spatial value $\xi_{V3}$ may be representative of D/2+(x−y)/2.

The third and the sixth spatial variables $\xi_3$, $\xi_6$ intersect at the eighth intersection point 190, such that $\xi_{INT}=\xi_3=\xi_6$. The intersection spatial value $\xi_{INT}$ is equal to the fifth spatial value $\xi_{V5}$, which is equal to D/2+(y−x)/2 as shown in EQ. 9. Therefore, a transponder in the first transponder array 104 (FIG. 21) located at the fifth spatial value $\xi_{V5}$ may detect the waves that are initiated from the first and the second transponders 24, 26 (FIG. 21) at t=x and at t=y. As such, the transponder in the first transponder array 104 (FIG. 21) located at the fifth spatial value $\xi_{V5}$ may be representative of subtraction as a difference between x and y. Specifically, the transponder in the first transponder array 104 (FIG. 21) located at the fifth spatial value $\xi_{V5}$ may be representative of D/2+(y−x)/2. In general, waves that initiated from the first and the second transponders 24, 26 (FIG. 21) at a first time, which is representative of a first magnitude of a first variable, and initiated at a second time, which is representative of a second magnitude of a second variable, may be received by at least one transponder in the first transponder array 104 (FIG. 21) that is representative of a difference between the first magnitude and the second magnitude. In this regard, timing of a first transmission of encoded information from a first pair of initiators, which are provided by the first and the second transponders 24, 26, may be based on the first magnitude of the first variable. Timing of a second transmission of encoded information from the first pair of initiators may be based on the second magnitude of the second variable. At least one of the parabolas of intersection 164 may be based on the difference between the first magnitude and the second magnitude.

Figure 30:
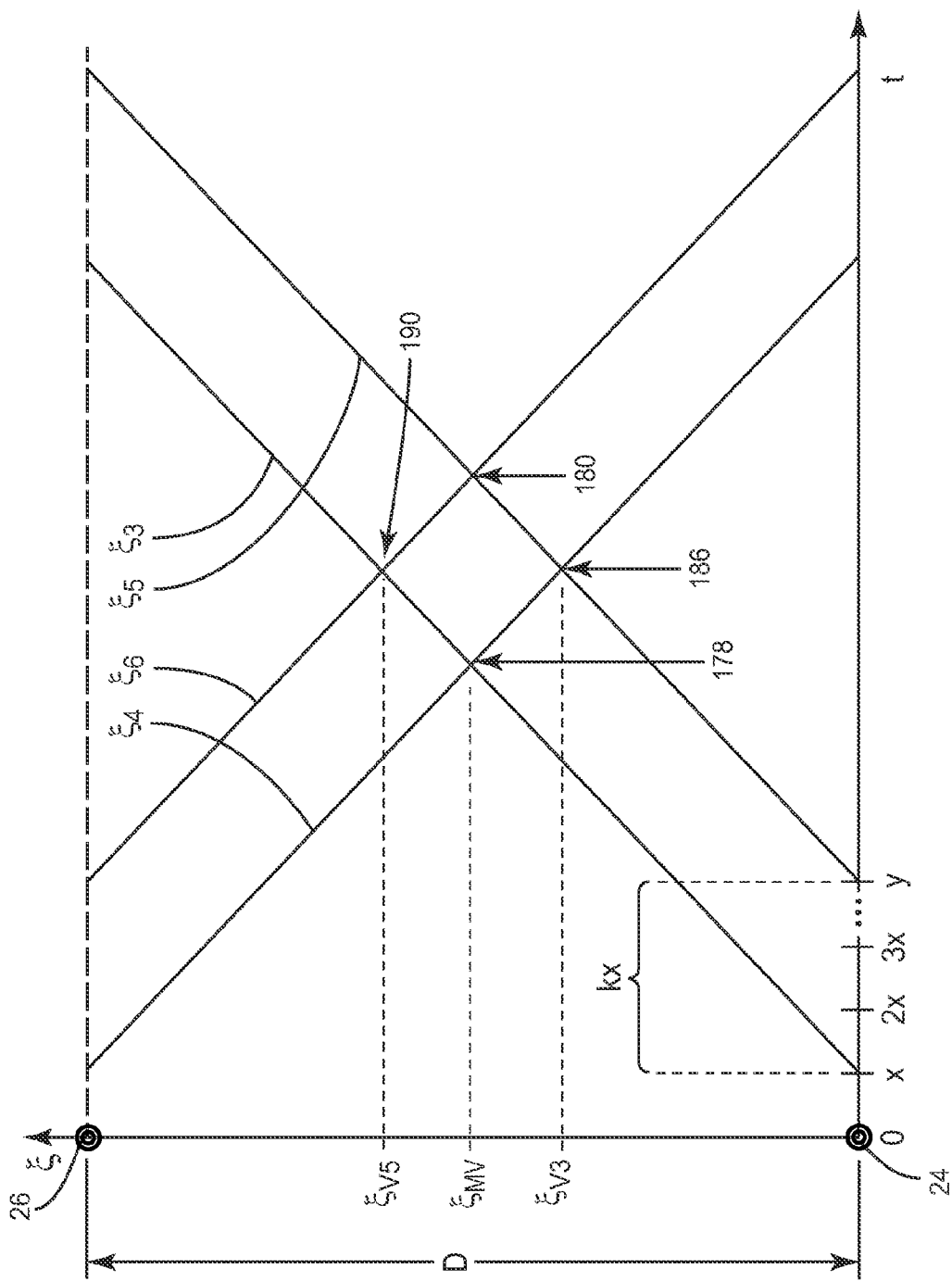
FIG. 30 shows a graph illustrating a combination of the third, the fourth, the fifth and the sixth spatial variables illustrated in FIG. 28 according to an alternate embodiment of the polychronous wave propagation system illustrated in FIG. 21.

FIG. 30 is used to illustrate the arithmetical computation of multiplication. In this regard, FIG. 30 shows a combination of the third, the fourth, the fifth and the sixth spatial variables $\xi_3$, $\xi_4$, $\xi_5$, $\xi_6$ illustrated in FIG. 28 according to one embodiment of the polychronous wave propagation system 20 illustrated in FIG. 21. As such, waves are initiated from the first and the second transponders 24, 26 (FIG. 21) at t=x and at t=y. Intersections of these waves occur at four intersection points, as illustrated. As previously mentioned, the third and the fourth spatial variables $\xi_3$, $\xi_4$ intersect at the second intersection point 178, such that $\xi_{INT}=\xi_3=\xi_4=\xi_{MV}$. The fifth and the sixth spatial variables $\xi_5$, $\xi_6$ intersect at the third intersection point 180, such that $\xi_{INT}=\xi_5=\xi_6=\xi_{MV}$.

Multiplication may be performed by adding multiple times. Specifically, the waves that are initiated from the first and the second transponders 24, 26 (FIG. 21) at t=y are based on delaying initiation of the waves "k" times x after the waves that are initiated from the first and the second transponders 24, 26 (FIG. 21) at t=x. For example, at t=x, a separate timer could be utilized to track when t=x+x, when t=x+x+x, when t=x+x+x+x, and so on until t=x+kx. When t=x+kx, t=y. Therefore, $$y=(k+1)x. \qquad \text{EQ. 11:}$$

Substituting EQ. 11 into EQ. 8 produces EQ. 12, as shown below.

$$\xi_{V3}=D/2+(x-(k+1)x)/2=D/2-(kx)/2. \qquad \text{EQ. 12:}$$

Similarly, substituting EQ. 11 into EQ. 9 produces EQ. 13, as shown below.

$$\xi_{V5}=D/2+((k+1)x-x)/2=D/2+(kx)/2. \qquad \text{EQ. 13:}$$

The fourth and the fifth spatial variables $\xi_4$, $\xi_5$ intersect at the sixth intersection point 186, such that $\xi_{INT}=\xi_4=\xi_5$. The intersection spatial value $\xi_{INT}$ is equal to the third spatial value $\xi_{V3}$, which is equal to D/2-(kx)/2 as shown in EQ. 12. Therefore, a transponder in the first transponder array 104 (FIG. 21) located at the third spatial value $\xi_{V3}$ may detect the waves that are initiated from the first and the second transponders 24, 26 (FIG. 21) at t=x and at t=y. As such, the transponder in the first transponder array 104 (FIG. 21) located at the third spatial value $\xi_{V3}$ may be representative of multiplication as a product between x and k. Specifically, the transponder in the first transponder array 104 (FIG. 21) located at the third spatial value $\xi_{V3}$ may be representative of D/2-(kx)/2.

The third and the sixth spatial variables $\xi_3$, $\xi_6$ intersect at the eighth intersection point 190, such that $\xi_{INT}=\xi_3=\xi_6$. The intersection spatial value $\xi_{INT}$ is equal to the fifth spatial value $\xi_{V5}$, which is equal to D/2+(kx)/2 as shown in EQ. 13. Therefore, a transponder in the first transponder array 104 (FIG. 21) located at the fifth spatial value $\xi_{V5}$ may detect the waves that are initiated from the first and the second transponders 24, 26 (FIG. 21) at t=x and at t=y. As such, the transponder in the first transponder array 104 (FIG. 21) located at the fifth spatial value $\xi_{V5}$ may be representative of multiplication as a product between x and k. Specifically, the transponder in the first transponder array 104 (FIG. 21) located at the fifth spatial value $\xi_{V5}$ may be representative of D/2+(kx)/2. In general, waves that initiated from the first and the second transponders 24, 26 (FIG. 21) at a first time, which is representative of a first magnitude of a first variable, and initiated at a second time, which is representative of a second magnitude of a second variable, may be received by at least one transponder in the first transponder array 104 (FIG. 21) that is representative of a product between the first magnitude and the second magnitude. In this regard, timing of a first transmission of encoded information from a first pair of initiators, which are provided by the first and the second transponders 24, 26, may be based on the first magnitude of the first variable. Timing of a second transmission of encoded information from the first pair of initiators may be based on the second magnitude of the second variable. At least one of the parabolas of intersection 164 may be based on the product between the first magnitude and the second magnitude.

Figure 31:
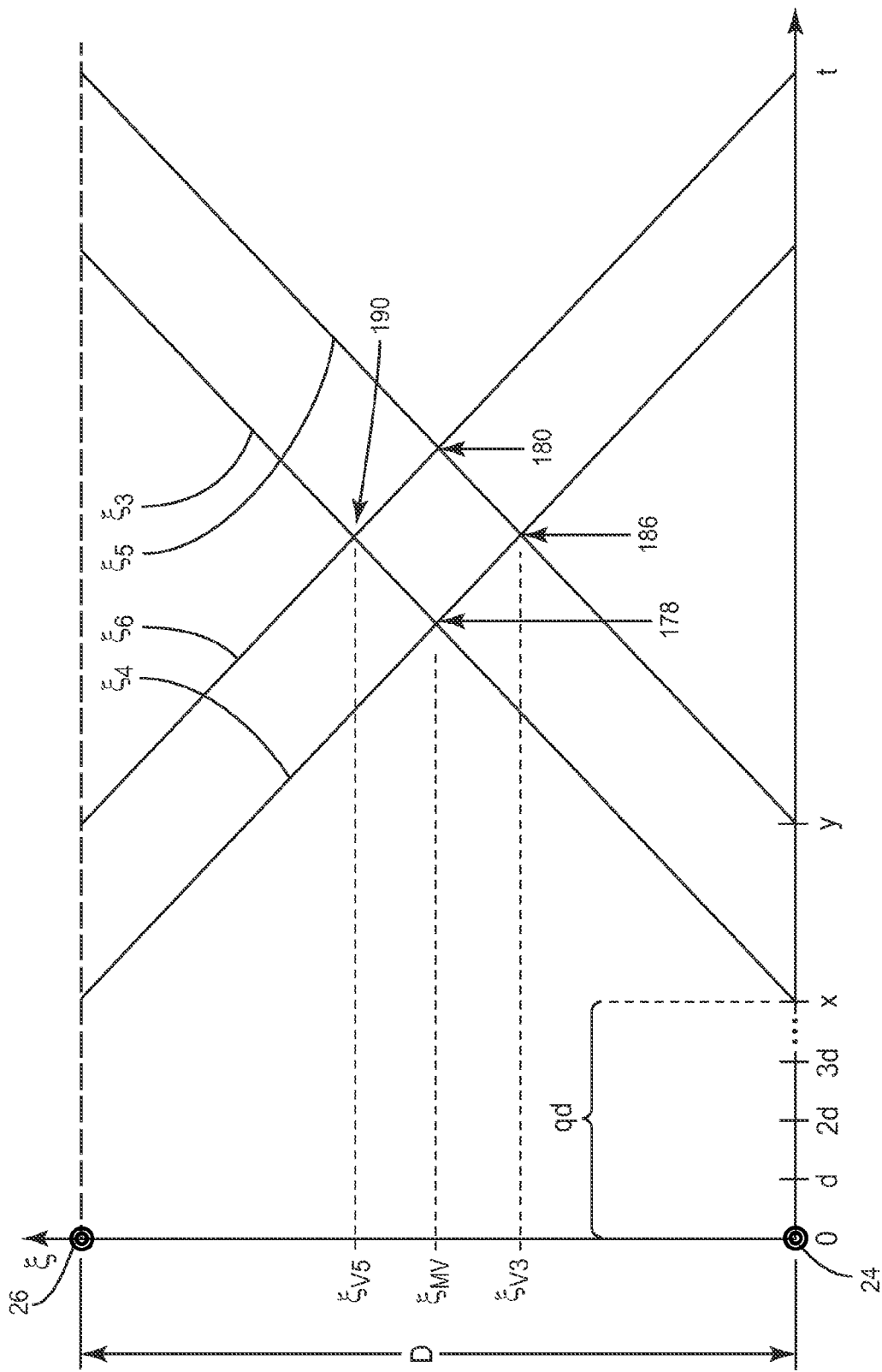
FIG. 31 shows a graph illustrating a combination of the third, the fourth, the fifth and the sixth spatial variables illustrated in FIG. 28 according to an additional embodiment of the polychronous wave propagation system illustrated in FIG. 21.

FIG. 31 may be used to illustrate the arithmetical computation of division. In this regard, FIG. 31 shows a combination of the third, the fourth, the fifth and the sixth spatial variables $\xi_3$, $\xi_4$, $\xi_5$, $\xi_6$ illustrated in FIG. 28 according to one embodiment of the polychronous wave propagation system 20 illustrated in FIG. 21. As such, waves are initiated from the first and the second transponders 24, 26 (FIG. 21) at t=x and at t=y. Intersections of these waves occur at four intersection points, as illustrated. As previously mentioned, the third and the fourth spatial variables $\xi_3$, $\xi_4$ intersect at the second intersection point 178, such that $\xi_{INT}=\xi_3=\xi_4=\xi_{MV}$. The fifth and the sixth spatial variables $\xi_5$, $\xi_6$ intersect at the third intersection point 180, such that $\xi_{INT}=\xi_5=\xi_6=\xi_{MV}$.

Division may be performed by subtracting multiple times. Specifically, the waves that are initiated from the first and the second transponders 24, 26 (FIG. 21) at t=y may be based on delaying initiation of such waves after the waves that are initiated from the first and the second transponders 24, 26 (FIG. 21) at t=x by an amount based on x divided by a divisor "d". For example, at t=0, a separate timer could be utilized to track when t=d, when t=d+d, when t=d+d+d, and so on until t=x. Each time t reaches a multiple of d, a count "q" is incremented. As a result, "q" effectively keeps track of the number of times d is subtracted from x. In this regard, x=qd. When t=x+q, then t=y and waves are initiated from the first and the second transponders 24, 26 (FIG. 21). Therefore, $$y=x+q=x+x/d. \qquad \text{EQ. 14:}$$

Substituting EQ. 14 into EQ. 8 produces EQ. 15, as shown below.

$$\xi_{V3}=D/2+(x-(x+x/d))/2=D/2-x/2d. \qquad \text{EQ. 15:}$$

Similarly, substituting EQ. 14 into EQ. 9 produces EQ. 16, as shown below.

$$\xi_{V5}=D/2+((x+x/d)-x)/2=D/2+x/2d. \qquad \text{EQ. 16:}$$

The fourth and the fifth spatial variables $\xi_4$, $\xi_5$ intersect at the sixth intersection point 186, such that $\xi_{INT}=\xi_4=\xi_5$. The intersection spatial value $\xi_{INT}$ is equal to the third spatial value $\xi_{V3}$, which is equal to D/2-x/2d as shown in EQ. 15. Therefore, a transponder in the first transponder array 104 (FIG. 21) located at the third spatial value $\xi_{V3}$ may detect the waves that are initiated from the first and the second transponders 24, 26 (FIG. 21) at t=x and at t=y. As such, the transponder in the first transponder array 104 (FIG. 21) located at the third spatial value $\xi_{V3}$ may be representative of division as a quotient between x and d. Specifically, the transponder in the first transponder array 104 (FIG. 21) located at the third spatial value $\xi_{V3}$ may be representative of x divided by d, or D/2-x/2d.

The third and the sixth spatial variables $\xi_3$, $\xi_6$ intersect at the eighth intersection point 190, such that $\xi_{INT}=\xi_3=\xi_6$. The intersection spatial value $\xi_{INT}$ is equal to the fifth spatial value $\xi_{V5}$, which is equal to D/2+x/2d as shown in EQ. 16. Therefore, a transponder in the first transponder array 104 (FIG. 21) located at the fifth spatial value $\xi_{V5}$ may detect the waves that are initiated from the first and the second transponders 24, 26 (FIG. 21) at t=x and at t=y. As such, the transponder in the first transponder array 104 (FIG. 21) located at the fifth spatial value $\xi_{V5}$ may be representative of division as a quotient between x and d. Specifically, the transponder in the first transponder array 104 (FIG. 21) located at the fifth spatial value $\xi_{V5}$ may be representative of x divided by d, or D/2+x/2d. In general, waves that initiated from the first and the second transponders 24, 26 (FIG. 21) at a first time, which is representative of a first magnitude of a first variable, and initiated at a second time, which is representative of a second magnitude of a second variable, may be received by at least one transponder in the first transponder array 104 (FIG. 21) that is representative of a quotient between the first variable and the second variable. In this regard, timing of a first transmission of encoded information from a first pair of initiators, which are provided by the first and the second transponders 24, 26, may be based on the first magnitude of the first variable. Timing of a second transmission of encoded information from the first pair of initiators may be based on the second magnitude of the second variable. At least one of the parabolas of intersection 164 may be based on the quotient between the first magnitude and the second magnitude. The quotient may be based on the first magnitude divided by the second magnitude.

Figure 32:
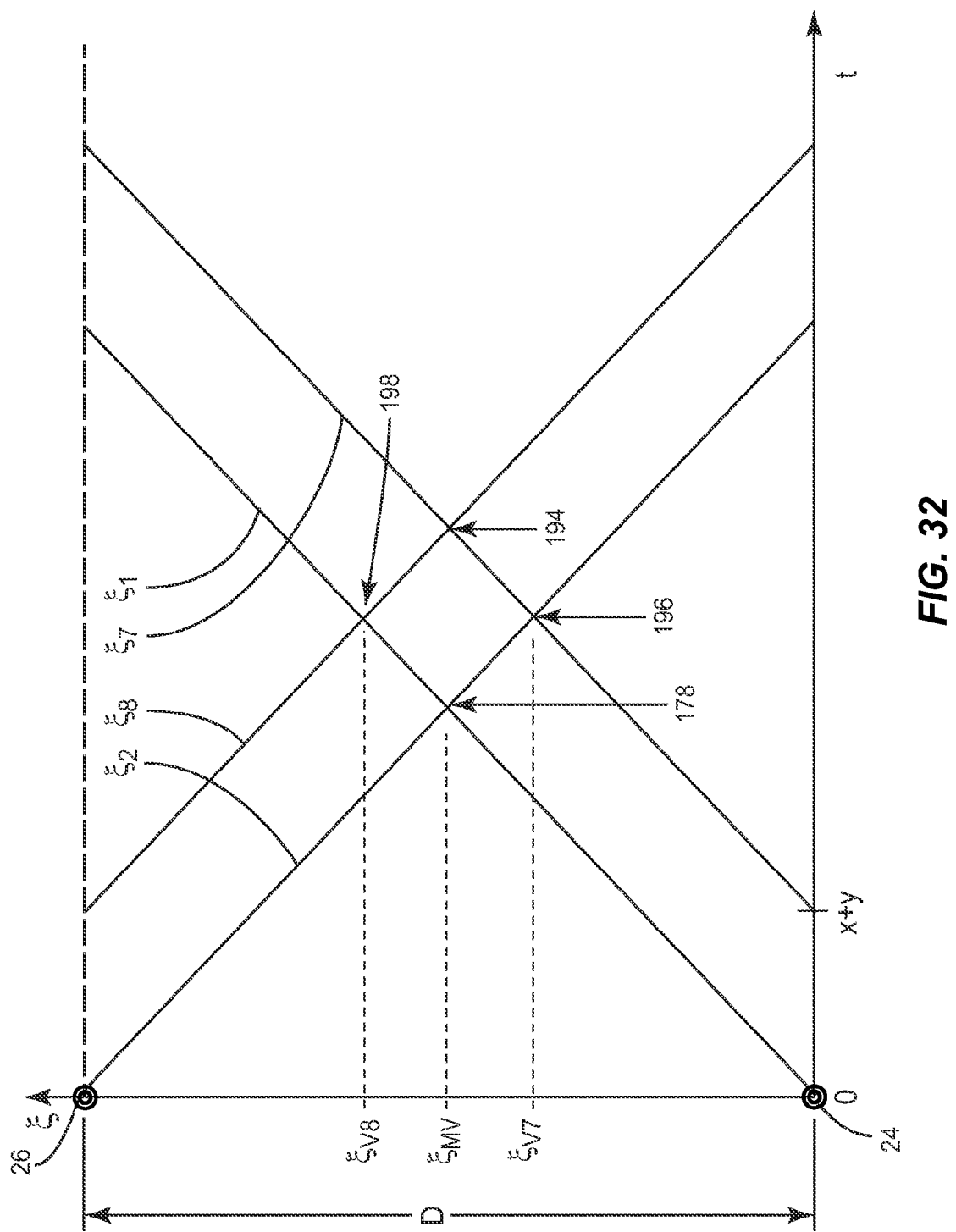
FIG. 32 shows a graph illustrating a combination of the first and the second spatial variables illustrated in FIGS. 25 and 26, and illustrating seventh and eighth spatial variables of the line segment between the first and the second transponders illustrated in FIG. 21 versus time according to an alternate embodiment of the polychronous wave propagation system illustrated in FIG. 21.

FIG. 32 may be used to illustrate the arithmetical computation of addition. In this regard, FIG. 32 shows a graph illustrating a combination of the first and the second spatial variables $\xi_1$, $\xi_2$ illustrated in FIG. 25, and illustrating seventh and eighth spatial variables $\xi_7$, $\xi_8$ of the line segment between the first and the second transponders 24, 26 illustrated in FIG. 21 versus time t according to an alternate embodiment of the polychronous wave propagation system 20 illustrated in FIG. 21. As such, waves are initiated from the first and the second transponders 24, 26 (FIG. 21) at t=0 and at t=(x+y). Intersections of these waves occur at four intersection points, as illustrated.

EQ. 17 and EQ. 18 are equations representing the seventh and the eighth spatial variables $\xi_7$, $\xi_8$, respectively, as shown below.

$$\xi_7 = t-(x+y) \text{ (for } t>(x+y)). \qquad \text{EQ. 17:}$$

$$\xi_8 = D+(x+y)-t \text{ (for } t>(x+y)). \qquad \text{EQ. 18:}$$

The seventh and the eighth spatial variables $\xi_7$, $\xi_8$ intersect at a tenth intersection point 194, such that $\xi_{INT}=\xi_7=\xi_8$. Setting EQ. 17 equal to EQ. 18 gives D+(x+y)−t=t−(x+y), therefore, t=(x+y)+D/2. Substituting back into EQ. 17 gives=$\xi_7$=t−(x+y)=(x+y)+D/2−(x+y)=D/2=$\xi_{INT}$. Since D/2 is midway between the first and the second transponders 24, 26, the intersection spatial value $\xi_{INT}$ is equal to the middle spatial value $\xi_{MV}$.

The second and the seventh spatial variables $\xi_2$, $\xi_7$ intersect at an eleventh intersection point 196, such that $\xi_{INT}=\xi_2=\xi_7$. The intersection spatial value $\xi_{INT}$ is equal to a seventh spatial value $\xi_{V7}$. Setting EQ. 2A equal to EQ. 17 gives D−t=t−(x+y), therefore, t=x/2+y/2+D/2. Substituting back into EQ. 17 gives=$\xi_7$=t−(x+y)=D/2+x/2+y/2−(x+y)=D/2−x/2−y/2=$\xi_{V7}$. Therefore, $$\xi_{V7}=D/2-(x+y)/2. \qquad \text{EQ. 19:}$$

The first and the eighth spatial variables $\xi_1$, $\xi_8$ intersect at a twelfth intersection point 198, such that $\xi_{INT}=\xi_1=\xi_8$. The intersection spatial value $\xi_{INT}$ is equal to an eighth spatial value $\xi_{V8}$. Setting EQ. 1A equal to EQ. 18 gives t=D+(x+y)−t, therefore, t=x/2+y/2+D/2. Substituting back into EQ. 1A gives $\xi_1$=t=x/2+y/2+D/2=$\xi_{V8}$. Therefore, $$\xi_{V8}=D/2+(x+y)/2. \qquad \text{EQ. 20:}$$

The second and the seventh spatial variables $\xi_2$, $\xi_7$ intersect at the eleventh intersection point 196, such that $\xi_{INT}=\xi_2=\xi_7$. The intersection spatial value $\xi_{INT}$ is equal to the seventh spatial value $\xi_{V7}$, which is equal to D/2−(x+y)/2 as shown in EQ. 19. Therefore, a transponder in the first transponder array 104 (FIG. 21) located at the seventh spatial value $\xi_{V7}$ may detect the waves that are initiated from the first and the second transponders 24, 26 (FIG. 21) at t=0 and at t=(x+y). As such, the transponder in the first transponder array 104 (FIG. 21) located at the seventh spatial value $\xi_{V7}$ may be representative of addition as a sum between x and y. Specifically, the transponder in the first transponder array 104 (FIG. 21) located at the seventh spatial value $\xi_{V7}$ may be representative of D/2−(x+y)/2.

The first and the eighth spatial variables $\xi_1$, $\xi_8$ intersect at the twelfth intersection point 198, such that $\xi_{INT}=\xi_1=\xi_8$. The intersection spatial value $\xi_{INT}$ is equal to the eighth spatial value $\xi_{V8}$, which is equal to D/2+(x+y)/2 as shown in EQ. 20. Therefore, a transponder in the first transponder array 104 (FIG. 21) located at the eighth spatial value $\xi_{V8}$ may detect the waves that are initiated from the first and the second transponders 24, 26 (FIG. 21) at t=0 and at t=(x+y). As such, the transponder in the first transponder array 104 (FIG. 21) located at the eighth spatial value $\xi_{V8}$ may be representative of addition as a sum between x and y. Specifically, the transponder in the first transponder array 104 (FIG. 21) located at the eighth spatial value $\xi_{V8}$ may be representative of D/2+(x+y)/2. In general, a first transmission of encoded information may be sent from a first pair of initiators, which are provided by the first and the second transponders 24, 26. Timing of a second transmission of encoded information from the first pair of initiators may be based on a first magnitude of a first variable and a second magnitude of a second variable. At least one of the parabolas of intersection 164 may be based on the sum between the first magnitude and the second magnitude.

Figure 33:
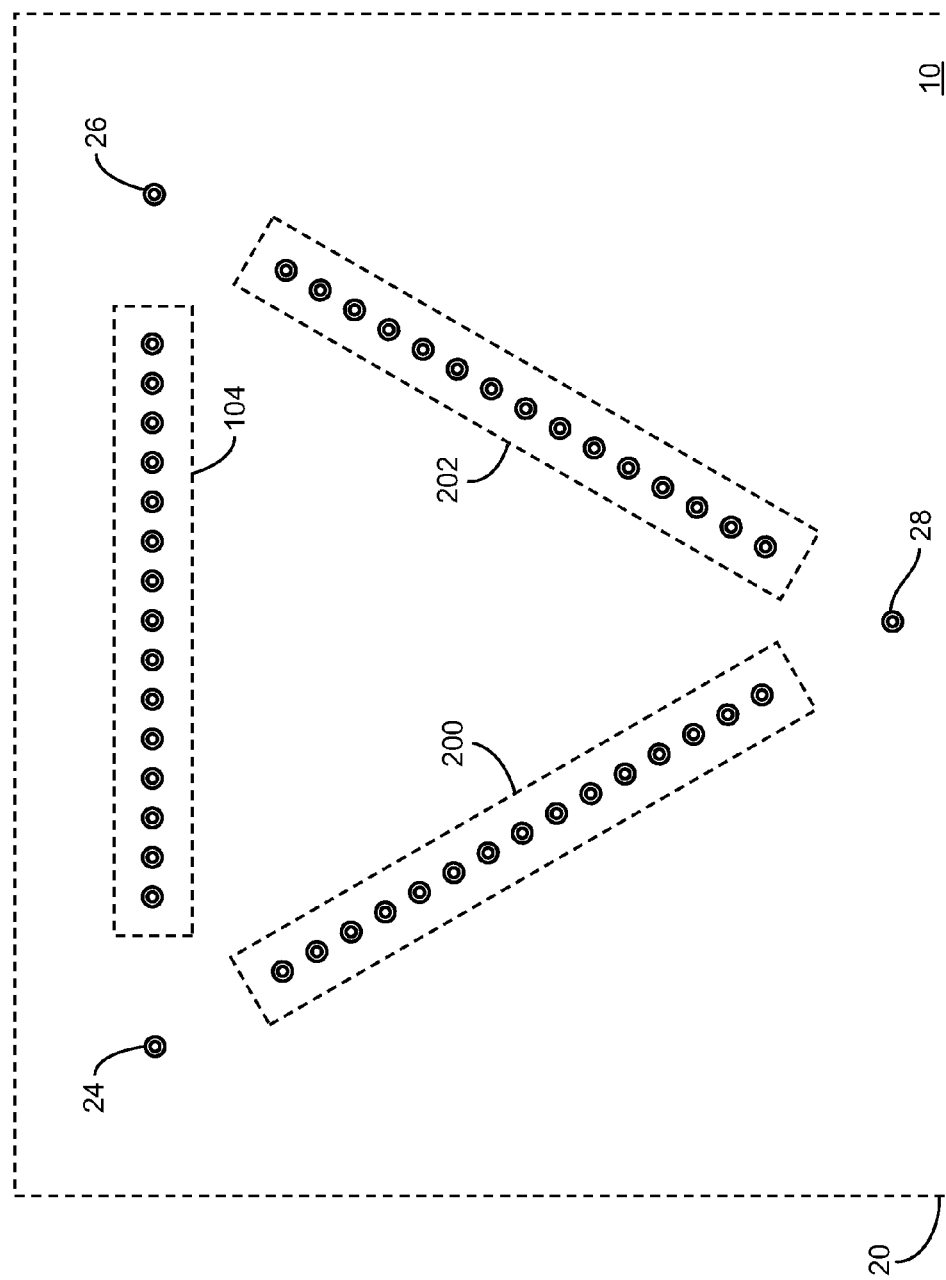
FIG. 33 shows a polychronous wave propagation system that is capable of performing and storing the results of arithmetic computations according to one embodiment of the polychronous wave propagation system.

Results of the arithmetic computations using the polychronous wave propagation system 20 illustrated in FIGS. 25 through 32 may be stored by combining the two-node polychronous wave propagation system 20 illustrated in FIG. 21 with the three transponder reverberating memory cell illustrated in FIGS. 20A and 20B. FIG. 33 shows a polychronous wave propagation system 20 that is capable of performing and storing the results of arithmetic computations according to one embodiment of the polychronous wave propagation system 20. As previously described, the three transponder reverberating memory cell illustrated in FIGS. 20A and 20B includes the first transponder 24, the second transponder 26, and the third transponder 28 disposed in the first wave propagation medium 10. The three transponder reverberating memory cell may store information by simultaneously transmitting waves from the transponders 24, 26, 28, which are located at the vertices of an equilateral triangle. As such, the waves transmitted from any two of the transponders 24, 26, 28 reaches the third of the transponders 24, 26, 28 simultaneously. Therefore, all three of the transponders 24, 26, 28 receive two waves simultaneously. If each of the transponders 24, 26, 28 then responds to the simultaneous reception of the two waves by transmitting another wave, then the transponders 24, 26, 28 continue to reverberate with a period equal to the distance D between any two of the transponders 24, 26, 28 divided by the propagation velocity PV. If a first set of waves, called an alpha set, is initially transmitted at t=0 and another set of waves, called a beta set, is initially transmitted at t=x to create a doublet, then the transponders 24, 26, 28 will reverberate with two sets of waves per period, namely the alpha set and the beta set. The time between two adjacent alpha sets is equal to D/PV, the time between an alpha set and the next beta set is equal to x, the time between a beta set and the next alpha set is equal to (D/PV)−x, and the time between two adjacent beta sets is equal to D/PV. Therefore, if PV=1, wave sets will be transmitted at t=(0, x, D, D+x, 2D, 2D+x, 3D, 3D+x, etc).

The polychronous wave propagation system 20 illustrated in FIG. 33 further includes the first transponder array 104 disposed in the first wave propagation medium 10 between the first transponder 24 and the second transponder 26, a second transponder array 200 disposed in the first wave propagation medium 10 between the first transponder 24 and the third transponder 28, and a third transponder array 202 disposed in the first wave propagation medium 10 between the second transponder 26 and the third transponder 28. As previously mentioned, each transponder in the first transponder array 104 is located on one of the parabolas of intersection 164 (FIG. 21) associated with the first transponder 24 and the second transponder 26. Similarly, each transponder in the second transponder array 200 is located on one of the parabolas of intersection 164 (not shown) associated with the first transponder 24 and the third transponder 28, and each transponder in the third transponder array 202 is located on one of the parabolas of intersection 164 (not shown) associated with the second transponder 26 and the third transponder 28.

Figure 34:
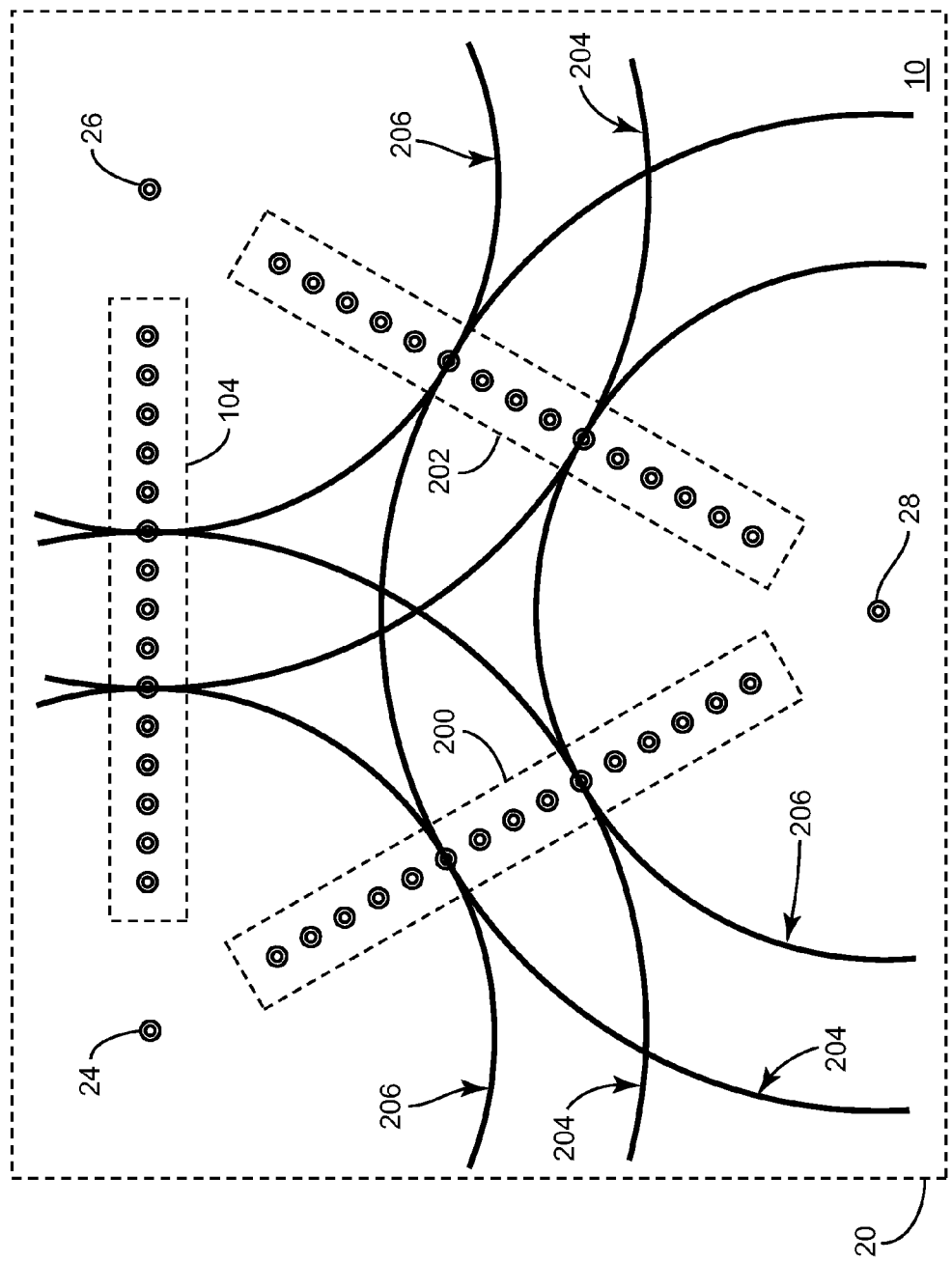
FIG. 34 shows two sets of waves transmitted from transponders illustrated in FIG. 33 according to an exemplary embodiment of the polychronous wave propagation system.
Figure 35:
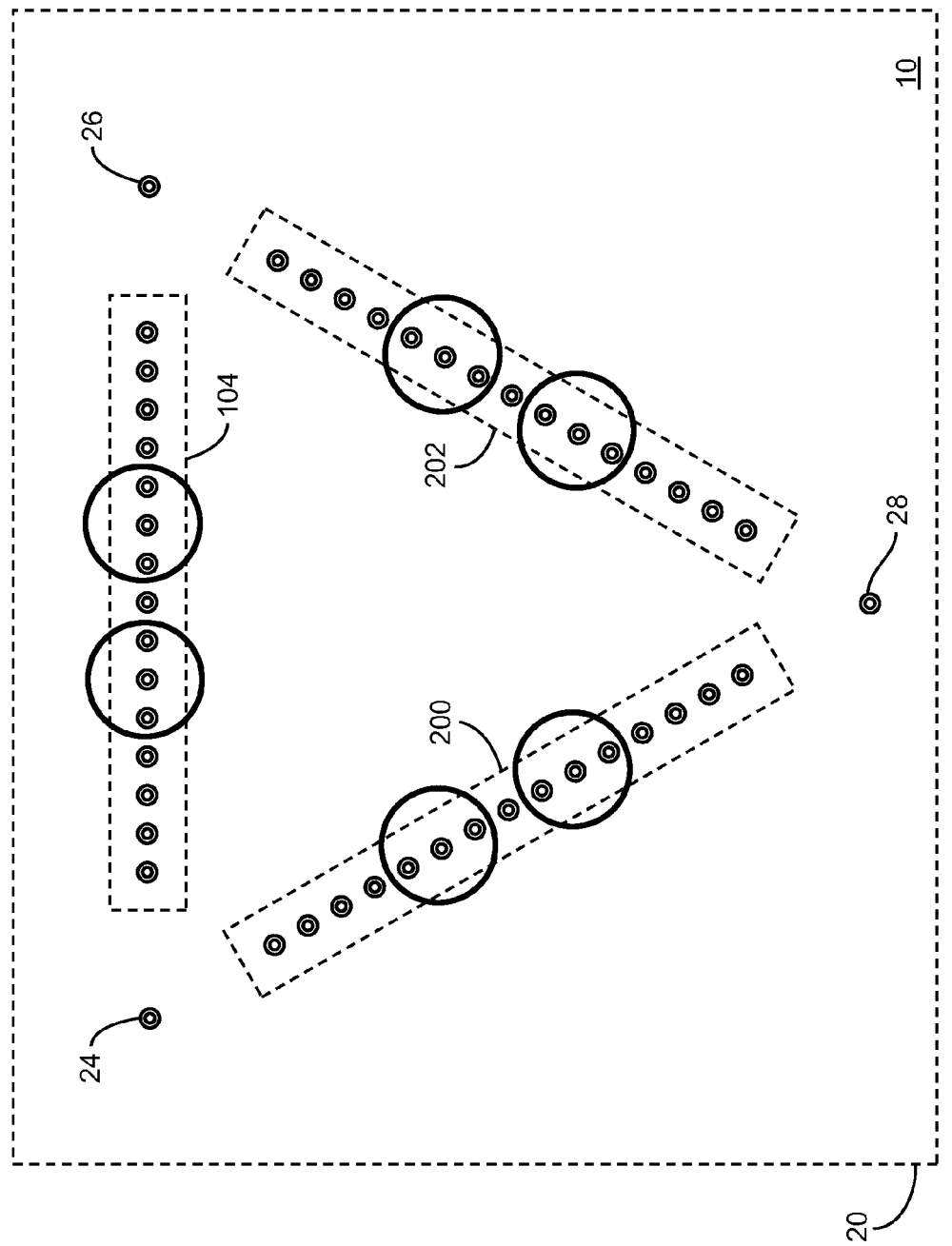
FIG. 35 shows a set of waves transmitted from transponders in transponder arrays illustrated in FIG. 33 that identify results of a subtraction illustrated in FIG. 34.

FIG. 34 shows two sets of waves transmitted from the transponders 24, 26, 28 illustrated in FIG. 33 according to an exemplary embodiment of the polychronous wave propagation system. The two sets of waves are representative of the subtraction computation illustrated in FIG. 29. A first set 204 of waves is transmitted at t=x simultaneously from the transponders 24, 26, 28, and a second set 206 of waves is transmitted at t=y simultaneously from the transponders 24, 26, 28. FIG. 34 shows the sets 204, 206 of waves arriving at selected transponders in the transponder arrays 104, 200, 202 that represent the parabolas of intersection 164 (not shown) associated with differences between x and y. As such, each of the selected transponders is selected by simultaneously receiving two waves from the sets 204, 206 of waves. Due to symmetry in the arrangement of the transponder arrays 104, 200, 202, the selected transponders form two reverberating memory cells. In this regard, the results of the subtraction computation may be stored. Any of the computations illustrated in FIGS. 29-32 may be stored in a similar manner. FIG. 35 shows a set of waves transmitted from the selected transponders illustrated in FIG. 33 that identify results of the subtraction illustrated in FIG. 34. The waves will re-trigger the selected transponders to provide the reverberating memory cells.

In general, in an exemplary embodiment of the polychronous wave propagation system 20, the polychronous wave propagation system 20 may include a first group of initiators, which may be provided by the transponders 24, 26, 28, disposed in the first wave propagation medium 10. In addition, the polychronous wave propagation system 20 may further include a first group of responders, which may be provided by transponders in the transponder arrays 104, 200, 202, disposed in the first wave propagation medium 10. The first group of initiators may transmit at least two propagated waves and the first group of responders may receive the propagated waves. Relative timing may be associated with interference patterns of energy between the propagated waves. Operational behavior of the polychronous wave propagation system 20 may be based on the relative timing and distances between the first group of initiators and the first group of responders. Operation behavior of the polychronous wave propagation system 20 may include one or more arithmetical computation.

Further, the polychronous wave propagation system 20 may store the results of the arithmetical computation by providing a reverberating memory cell. In general, by expanding upon the exemplary embodiment of the polychronous wave propagation system 20 presented above, a reverberating memory cell may be provided. The polychronous wave propagation system 20 may further include a second group of initiators, which may be provided by transponders in the transponder arrays 104, 200, 202, disposed in the first wave propagation medium 10. In addition, the polychronous wave propagation system 20 may further include a second group of responders, which may be provided by transponders in the transponder arrays 104, 200, 202, disposed in the first wave propagation medium 10. The second group of initiators may simultaneously transmit a set of at least three propagated waves and the second group of responders may receive the set of at least three propagated waves. Upon receipt of the set of at least three propagated waves by the second group of responders, the second group of initiators may re-transmit the set of at least three propagated waves to provide the reverberating memory cell. The second group of initiators may continue to re-transmit the set of at least three propagated waves as long as the reverberating memory cell needs to store the results of the arithmetical computation. The first group of responders may be identical to the second group of responders, as shown in FIG. 34 and FIG. 35.

Figure 36:
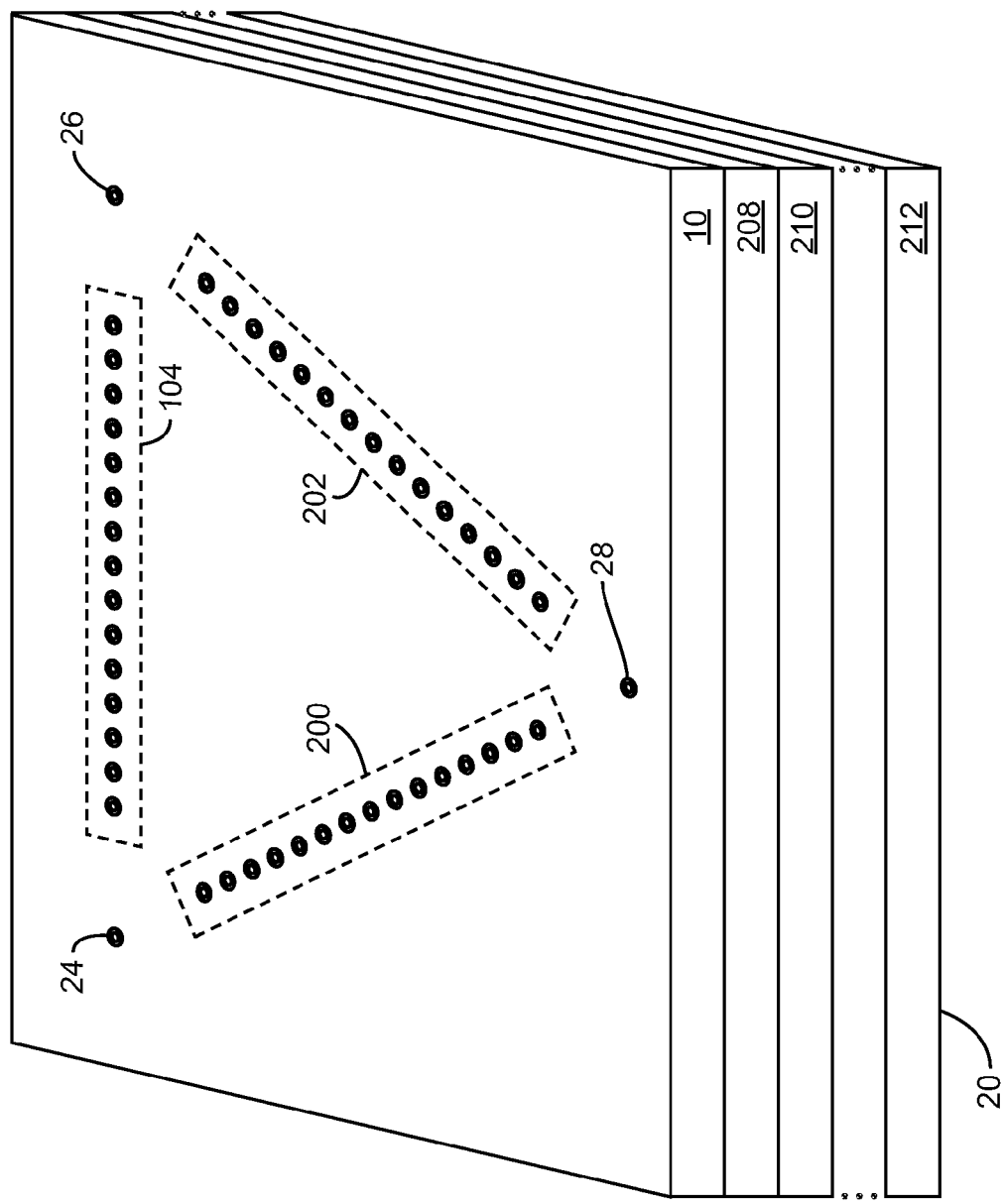
FIG. 36 shows a three-dimensional view of the polychronous wave propagation system having a group of wave propagation media according to one embodiment of the polychronous wave propagation system.

FIG. 36 shows a three-dimensional view of the polychronous wave propagation system 20 having a group of wave propagation media according to one embodiment of the polychronous wave propagation system 20. The group of wave propagation media include the first wave propagation medium 10, a second wave propagation medium 208, a third wave propagation medium 210, and up to and including an $N^{TH}$ wave propagation medium 212. The wave propagation media 10, 208, 210, 212 may be stacked on top of one another as shown or may be arranged in any manner. The transponders 24, 26, 28 and the transponder arrays 104, 200, 202 may be disposed in the first wave propagation medium 10 similarly to the transponders 24, 26, 28 and the transponder arrays 104, 200, 202 illustrated in FIG. 33.

Figure 37:
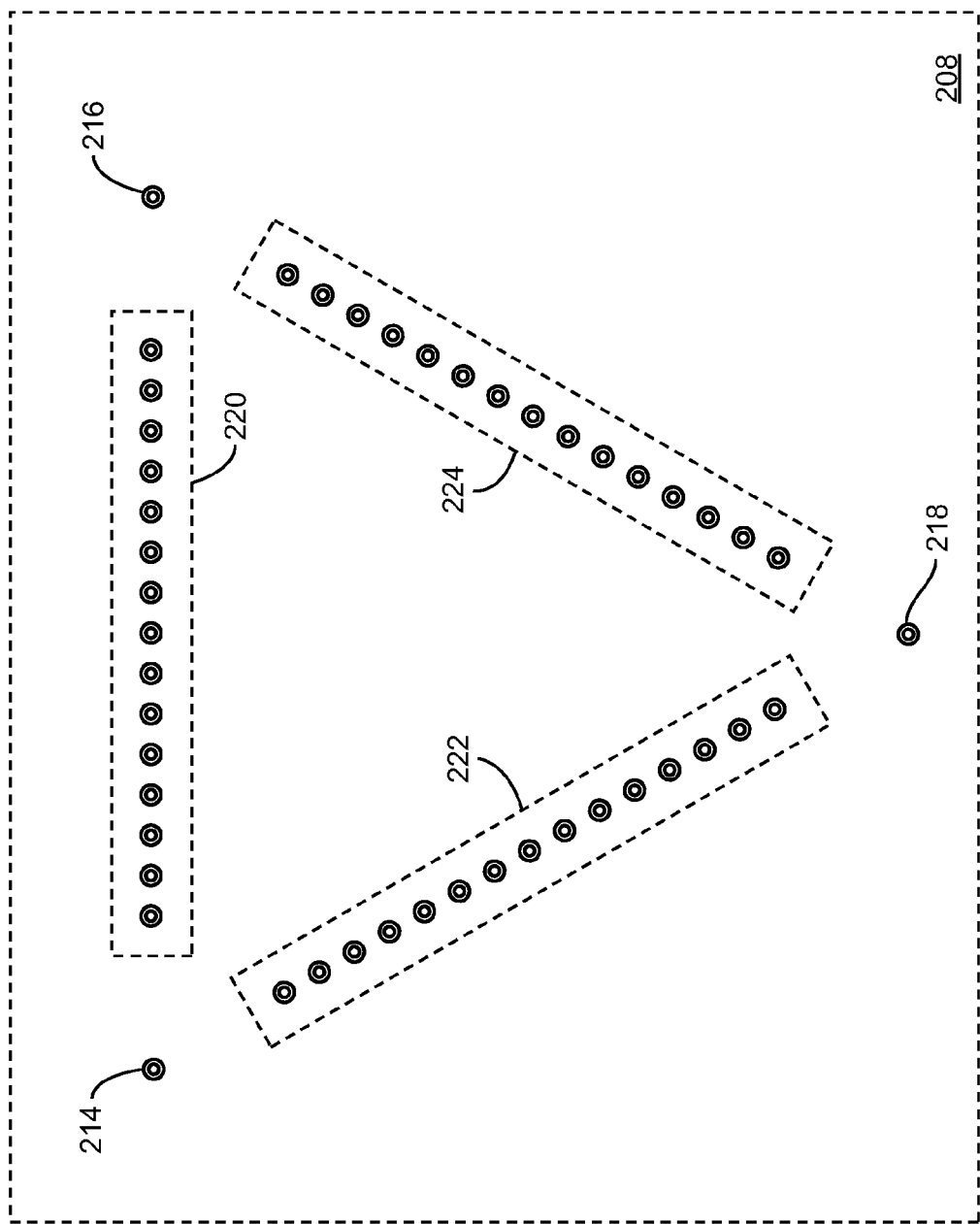
FIG. 37 shows details of a second wave propagation medium illustrated in FIG. 36 according to one embodiment of the second wave propagation medium.

FIG. 37 shows details of the second wave propagation medium 208 illustrated in FIG. 36 according to one embodiment of the second wave propagation medium 208. A second medium first transponder 214, a second medium second transponder 216, a second medium third transponder 218, a second medium first transponder array 220, a second medium second transponder array 222, and a second medium third transponder array 224 are disposed in the second wave propagation medium 208 as illustrated in FIG. 37 in a similar manner to the first medium transponders 24, 26, 28 and the first medium transponder arrays 104, 200, 202 illustrated in FIG. 36. As such, the second medium transponders 214, 216, 218 are located at the vertices of an equilateral triangle. The second medium first transponder array 220 is located between the second medium first transponder 214 and the second medium second transponder 216. The second medium second transponder array 222 is located between the second medium first transponder 214 and the second medium third transponder 218. The second medium third transponder array 224 is located between the second medium second transponder 216 and the second medium third transponder 218. In this regard, the second medium transponders 214, 216, 218 and the second medium transponder arrays 220, 222, 224 may behave in a similar manner to the first medium transponders 24, 26, 28 and the first medium transponder arrays 104, 200, 202 illustrated in FIG. 36.

Figure 38:
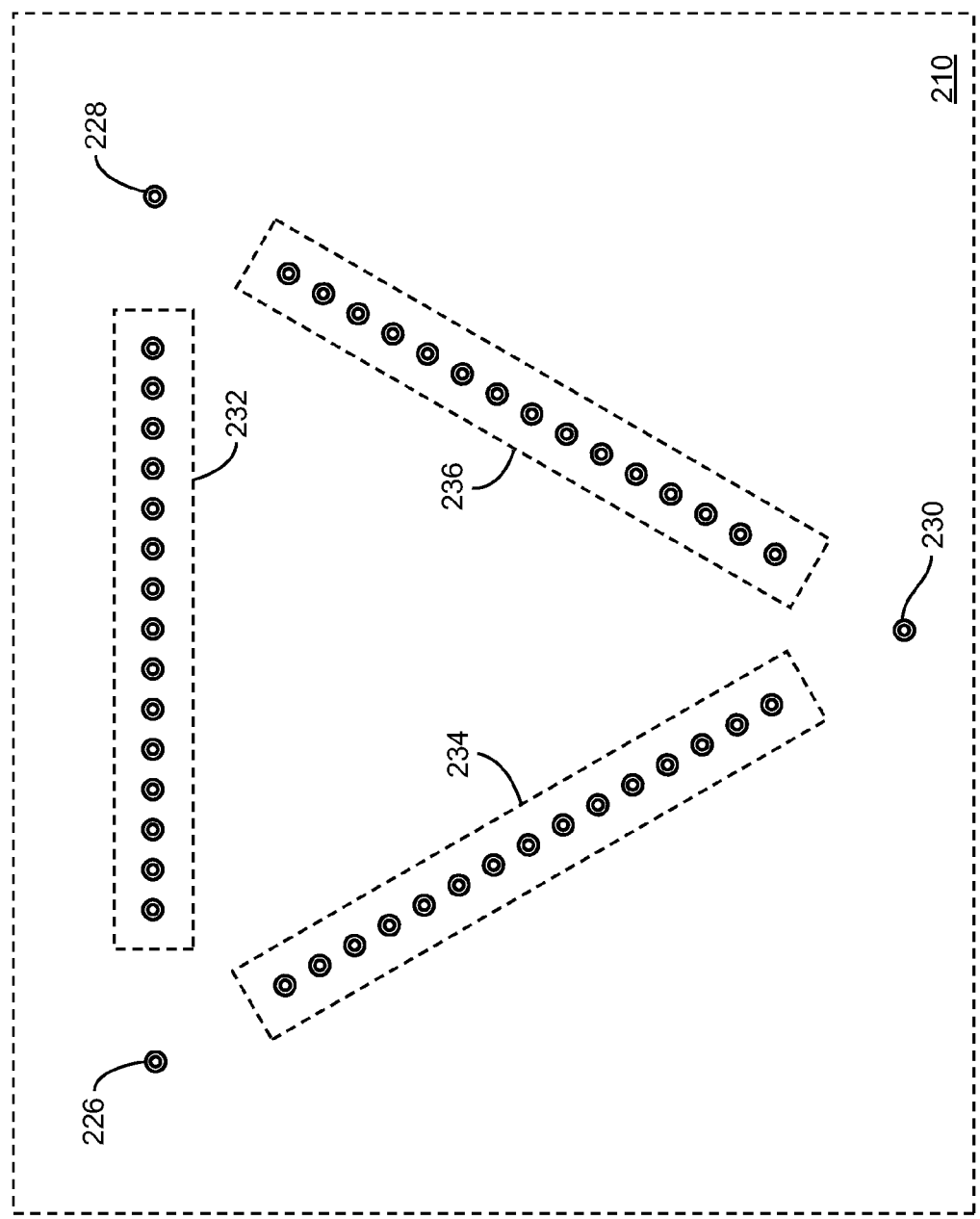
FIG. 38 shows details of a third wave propagation medium illustrated in FIG. 36 according to one embodiment of the third wave propagation medium.

FIG. 38 shows details of the third wave propagation medium 210 illustrated in FIG. 36 according to one embodiment of the third wave propagation medium 210. A third medium first transponder 226, a third medium second transponder 228, a third medium third transponder 230, a third medium first transponder array 232, a third medium second transponder array 234, and a third medium third transponder array 236 are disposed in the third wave propagation medium 210 as illustrated in FIG. 38 in a similar manner to the first medium transponders 24, 26, 28 and the first medium transponder arrays 104, 200, 202 illustrated in FIG. 36. As such, the third medium transponders 226, 228, 230 are located at the vertices of an equilateral triangle. The third medium first transponder array 232 is located between the third medium first transponder 226 and the third medium second transponder 228. The third medium second transponder array 234 is located between the third medium first transponder 226 and the third medium third transponder 230. The third medium third transponder array 236 is located between the third medium second transponder 228 and the third medium third transponder 230. In this regard, the third medium transponders 226, 228, 230 and the third medium transponder arrays 232, 234, 236 may behave in a similar manner to the first medium transponders 24, 26, 28 and the first medium transponder arrays 104, 200, 202 illustrated in FIG. 36.

Figure 39:
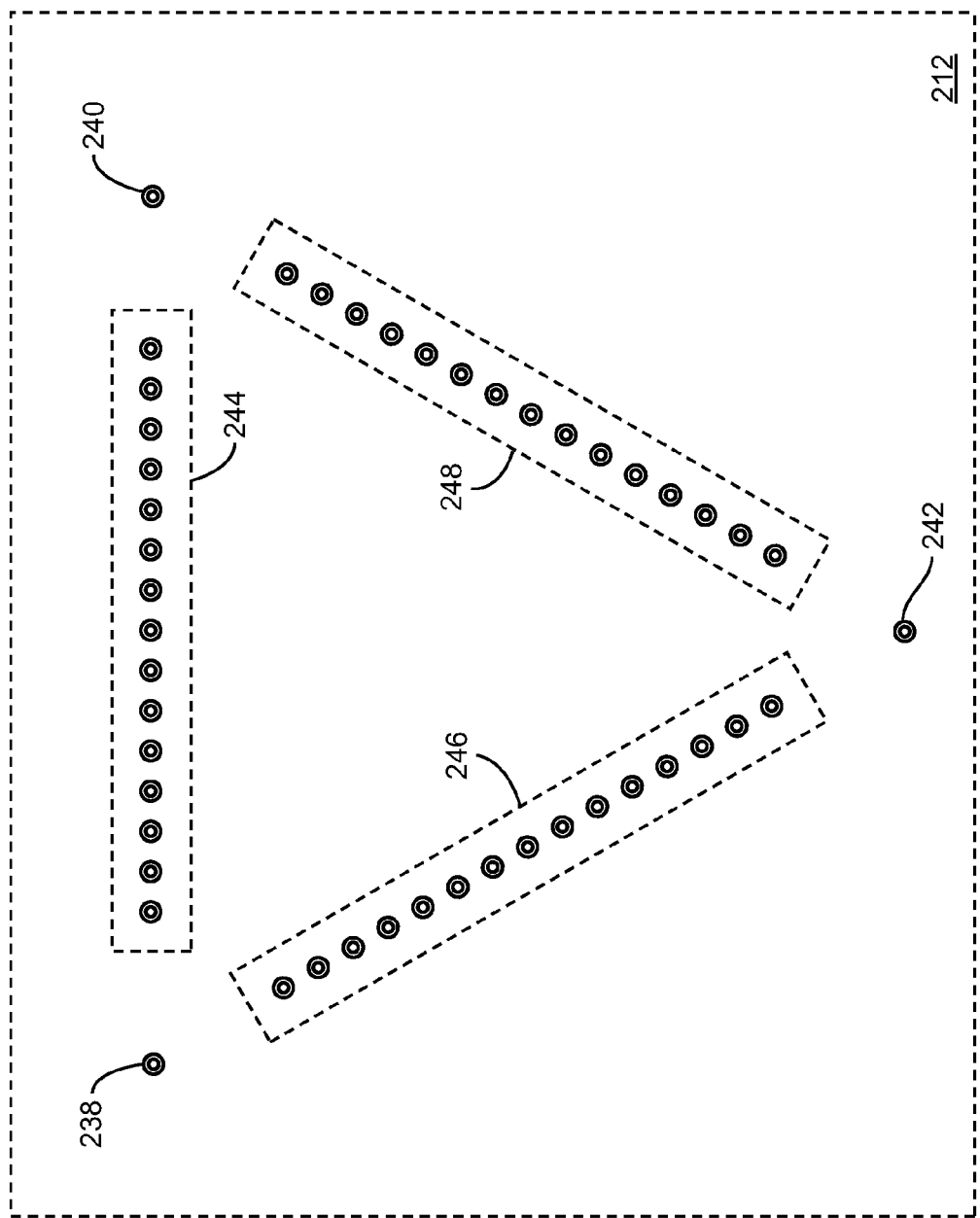
FIG. 39 shows details of an $N^{TH}$ wave propagation medium illustrated in FIG. 36 according to one embodiment of the $N^{TH}$ wave propagation medium.

FIG. 39 shows details of the $N^{TH}$ wave propagation medium 212 illustrated in FIG. 36 according to one embodiment of the $N^{TH}$ wave propagation medium 212. An $N^{TH}$ medium first transponder 238, an $N^{TH}$ medium second transponder 240, an $N^{TH}$ medium third transponder 242, an $N^{TH}$ medium first transponder array 244, an $N^{TH}$ medium second transponder array 246, and an $N^{TH}$ medium third transponder array 248 are disposed in the $N^{TH}$ wave propagation medium 212 as illustrated in FIG. 39 in a similar manner to the first medium transponders 24, 26, 28 and the first medium transponder arrays 104, 200, 202 illustrated in FIG. 36. As such, the $N^{TH}$ medium transponders 238, 240, 242 are located at the vertices of an equilateral triangle. The $N^{TH}$ medium first transponder array 244 is located between the $N^{TH}$ medium first transponder 238 and the $N^{TH}$ medium second transponder 240. The $N^{TH}$ medium second transponder array 246 is located between the $N^{TH}$ medium first transponder 238 and the $N^{TH}$ medium third transponder 242. The $N^{TH}$ medium third transponder array 248 is located between the $N^{TH}$ medium second transponder 240 and the $N^{TH}$ medium third transponder 242. In this regard, the $N^{TH}$ medium transponders 238, 240, 242 and the $N^{TH}$ medium transponder arrays 244, 246, 248 may behave in a similar manner to the first medium transponders 24, 26, 28 and the first medium transponder arrays 104, 200, 202 illustrated in FIG. 36.

In general, the polychronous wave propagation system 20 illustrated in FIG. 36 may include the group of wave propagation media 10, 208, 210, 212, a corresponding group of initiators for each wave propagation medium in the group of wave propagation media 10, 208, 210, 212, and a corresponding group of responders for each wave propagation medium in the group of wave propagation media 10, 208, 210, 212. Each corresponding group of initiators is disposed in the corresponding wave propagation medium in the group of wave propagation media 10, 208, 210, 212. Each corresponding group of responders is disposed in the corresponding wave propagation medium in the group of wave propagation media 10, 208, 210, 212. Specifically, the first medium transponders 24, 26, 28 and the first medium transponder arrays 104, 200, 202 provide one of the groups of initiators and one of the groups of responders, both of which are disposed in the first wave propagation medium 10. The second medium transponders 214, 216, 218 and the second medium transponder arrays 220, 222, 224 provide one of the groups of initiators and one of the groups of responders, both of which are disposed in the second wave propagation medium 208. The third medium transponders 226, 228, 230 and the third medium transponder arrays 232, 234, 236 provide one of the groups of initiators and one of the groups of responders, both of which are disposed in the third wave propagation medium 210. The $N^{TH}$ medium transponders 238, 240, 242 and the $N^{TH}$ medium transponder arrays 244, 246, 248 provide one of the groups of initiators and one of the groups of responders, both of which are disposed in the $N^{TH}$ wave propagation medium 212.

Any or all of the transponders 24, 26, 28, 214, 216, 218, 226, 228, 230, 238, 240, 242 and the transponders in the transponder arrays 104, 200, 202, 220, 222, 224, 232, 234, 236, 244, 246, 248 disposed in one of the wave propagation media 10, 208, 210, 212 may be functionally coupled to any or all of the transponders 24, 26, 28, 214, 216, 218, 226, 228, 230, 238, 240, 242 and the transponders in the transponder arrays 104, 200, 202, 220, 222, 224, 232, 234, 236, 244, 246, 248 disposed in any other of the wave propagation media 10, 208, 210, 212. As such, any transponder disposed in one of the wave propagation media 10, 208, 210, 212 that detects information from another pair of transponders in the same wave propagation medium may initiate waves from any transponder disposed in any other of the wave propagation media 10, 208, 210, 212. By coupling between the wave propagation media 10, 208, 210, 212, flexibility and capacity of the polychronous wave propagation system 20 may be increased significantly. Interference between waves may be avoided by dividing waves amongst the wave propagation media 10, 208, 210, 212. Storage capacity may be increased by using any or all of the wave propagation media 10, 208, 210, 212 to store information. Resolution of arithmetical computations may be increased by using multiple transponder arrays 104, 200, 202, 220, 222, 224, 232, 234, 236, 244, 246, 248 across the wave propagation media 10, 208, 210, 212.

In the polychronous wave propagation system 20 illustrated in FIG. 21, the parabolas of intersection 164 are located between the first transponder 24 and the second transponder 26. As such, initiation of waves from the first transponder 24 and the second transponder 26 occur at times that are less than D/PV. For example, in the polychronous wave propagation system 20 illustrated in FIG. 28, 0<D/PV, x<D/PV, and y<D/PV. In the polychronous wave propagation system 20 illustrated in FIG. 32, (x+y)<D/PV. However, alternate embodiments of the polychronous wave propagation system 20 may include parabolas of intersection 164 outside of the first transponder 24 and the second transponder 26. Such a polychronous wave propagation system 20 may require a larger first wave propagation medium 10. Alternatively, the polychronous wave propagation system 20 illustrated in FIG. 36 may provide a mechanism for creating parabolas of intersection 164 that are effectively outside the first medium transponders 24, 26, 28 by utilizing two or more of the wave propagation media 10, 208, 210, 212. Waves that need to travel longer than D/PV may be used to initiate waves in another medium of the wave propagation media 10, 208, 210, 212. As such, an example is presented.

Modular arithmetic is a system of arithmetic for integers, in which numbers "wrap around" after they reach a certain value, which is called a modulus. A common example is a 12-hour clock. Every 12 hours the clock wraps around back to zero. As such, if it is presently 7:00, then seven hours from now will not be 14:00, but will instead be 2:00 since the clock wrapped around to zero at 12:00. Thus, the modulus for a 12-hour clock is 12. In modular arithmetic, if the modulus known, then any number may be represented as an integer n and a remainder X. In this regard, the polychronous wave propagation system 20 illustrated in FIG. 36 may be used to perform modular arithmetic and store the result. The modulus for the polychronous wave propagation system 20 illustrated in FIG. 36 is equal to D/PV. The integer n must be greater than or equal to zero and the remainder X must be less than D/PV. As such, several equations define the modular arithmetic below.

$$nD/PV \leq x < (n+1)D/PV. \quad \text{EQ. 21:}$$

$$X = x - nD/PV. \quad \text{EQ. 22:}$$

$$X \equiv x \bmod D/PV. \quad \text{EQ. 23:}$$

EQ. 21 identifies the integer n as the largest integer contained in x. EQ. 22 defines the remainder X as the amount left over after subtracting out the integer n times the modulus D/PV. EQ. 23 defines the remainder X using modular arithmetic notation. The steps taken to calculate and store the integer n and the remainder X are as follows.

Before t=0, all of the transponders 24, 26, 28, 214, 216, 218, 226, 228, 230, 238, 240, 242 and all of the transponders in the transponder arrays 104, 200, 202, 220, 222, 224, 232, 234, 236, 244, 246, 248 are prevented from transmitting waves to allow the polychronous wave propagation system 20 to initialize to a stable state.

At t=0, waves are simultaneously initiated from the first medium transponders 24, 26, 28.

If t=x is before t=D/PV, then waves are simultaneously initiated from the first medium transponders 24, 26, 28. The first medium transponders 24, 26, 28 are disabled. When the transponders in the first medium transponder arrays 104, 200, 202 simultaneously detect the waves from the first medium transponders 24, 26, 28, the transponders that detected the waves are indicative of the remainder X and then simultaneously transmit waves, thereby storing the remainder X. Since none of the transponders 24, 26, 28, 214, 216, 218, 226, 228, 230, 238, 240, 242 are storing information, the integer n is equal to zero.

If t=D/PV=x, then the waves that were initiated at t=0 reach the first medium transponders 24, 26, 28, thereby causing waves to be simultaneously initiated from the first medium transponders 24, 26, 28. The first medium transponders 24, 26, 28 continue to initiate waves, thereby storing the integer n. Since the first medium transponders 24, 26, 28 are reverberating, the integer n is equal to one. Since none of the transponders in the first medium transponder arrays 104, 200, 202 are storing information, the remainder X is equal to zero.

If t=D/PV is before t=x, then the waves that were initiated at t=0 reach the first medium transponders 24, 26, 28, thereby causing waves to be simultaneously initiated from the first medium transponders 24, 26, 28.

If t=x is before t=2D/PV, then waves are simultaneously initiated from the first medium transponders 24, 26, 28. When the transponders in the first medium transponder arrays 104, 200, 202 simultaneously detect the waves from the first medium transponders 24, 26, 28, the transponders that detected the waves are indicative of the remainder X and then simultaneously transmit waves, thereby storing the remainder X. The first medium transponders 24, 26, 28 continue to initiate waves, thereby storing the integer n. Since the first medium transponders 24, 26, 28 are reverberating, the integer n is equal to one.

If t=2D/PV=x, then the first medium transponders 24, 26, 28 are disabled. Further, waves are simultaneously initiated from the second medium transponders 214, 216, 218. The second medium transponders 214, 216, 218 continue to initiate waves, thereby storing the integer n. Since the second medium transponders 214, 216, 218 are reverberating, the integer n is equal to two. Since none of the transponders in the first medium transponder arrays 104, 200, 202 are storing information, the remainder X is equal to zero.

If t=2D/PV is before t=x, then the waves that were initiated at t=D/PV reach the first medium transponders 24, 26, 28, thereby causing waves to be simultaneously initiated from the first medium transponders 24, 26, 28.

If t=x is before t=3D/PV, then waves are simultaneously initiated from the first medium transponders 24, 26, 28 and the first medium transponders 24, 26, 28 are then disabled. Further, waves are simultaneously initiated from the second medium transponders 214, 216, 218. The second medium transponders 214, 216, 218 continue to initiate waves, thereby storing the integer n. Since the second medium transponders 214, 216, 218 are reverberating, the integer n is equal to two. When the transponders in the first medium transponder arrays 104, 200, 202 simultaneously detect the waves from the first medium transponders 24, 26, 28, the transponders that detected the waves are indicative of the remainder X and then simultaneously transmit waves, thereby storing the remainder X.

If t=3D/PV=x, then the first medium transponders 24, 26, 28 are disabled. Further, waves are simultaneously initiated from the third medium transponders 226, 228, 230. The third medium transponders 226, 228, 230 continue to initiate waves, thereby storing the integer n. Since the third medium transponders 226, 228, 230 are reverberating, the integer n is equal to three. Since none of the transponders in the first medium transponder arrays 104, 200, 202 are storing information, the remainder X is equal to zero.

In general, the one of the wave propagation media 10, 208, 210, 212 that has transponders that are reverberating is indicative of the integer n. For example, if the first medium transponders 24, 26, 28 are reverberating, then the integer n is equal to one. If the second medium transponders 214, 216, 218 are reverberating, then the integer n is equal to two. If the third medium transponders 226, 228, 230 are reverberating, then the integer n is equal to three. If the $N^{TH}$ medium transponders 238, 240, 242 are reverberating, then the integer n is equal to N. If none of the transponders 24, 26, 28, 214, 216, 218, 226, 228, 230, 238, 240, 242 are reverberating, then the integer n is equal to zero. If some of the transponders in the first medium transponder arrays 104, 200, 202 are reverberating, then the transponders in the first medium transponder arrays 104, 200, 202 that are reverberating are indicative of the remainder X. If none of the transponders in the first medium transponder arrays 104, 200, 202 are reverberating, then the remainder X is equal to zero.

Alternatively, if the integer n is not needed to be determined and only the remainder X is needed to be determined, then the multiple wave propagation media 10, 208, 210, 212 polychronous wave propagation system 20 illustrated in FIG. 36 is not needed. Instead, only the polychronous wave propagation system 20 illustrated in FIG. 33 is needed. The steps taken to calculate and store the remainder X are as follows.

Before t=0, the first medium transponders 24, 26, 28 and all of the transponders in the first medium transponder arrays 104, 200, 202 are prevented from transmitting waves to allow the polychronous wave propagation system 20 to initialize to a stable state.

At t=0, waves are simultaneously initiated from the first medium transponders 24, 26, 28.

If t=x is before t=D/PV, then waves are simultaneously initiated from the first medium transponders 24, 26, 28. The first medium transponders 24, 26, 28 are then disabled. When the transponders in the first medium transponder arrays 104, 200, 202 simultaneously detect the waves from the first medium transponders 24, 26, 28, the transponders that detected the waves are indicative of the remainder X and then simultaneously transmit waves, thereby storing the remainder X.

If t=D/PV=x, then the waves that were initiated at t=0 reach the first medium transponders 24, 26, 28, thereby causing waves to be simultaneously initiated from the first medium transponders 24, 26, 28. The first medium transponders 24, 26, 28 continue to initiate waves, thereby storing the remainder X as zero.

If t=D/PV is before t=x, then the waves that were initiated at t=0 reach the first medium transponders 24, 26, 28, thereby causing waves to be simultaneously initiated from the first medium transponders 24, 26, 28.

This process repeats until t=x, such that either the remainder X is stored as zero, in which the first medium transponders 24, 26, 28 continue to reverberate waves, or the remainder X is stored as a non-zero value, in which the first medium transponders 24, 26, 28 that are indicative of the remainder X continue to reverberate and the first medium transponders 24, 26, 28 are disabled.

Figure 40:
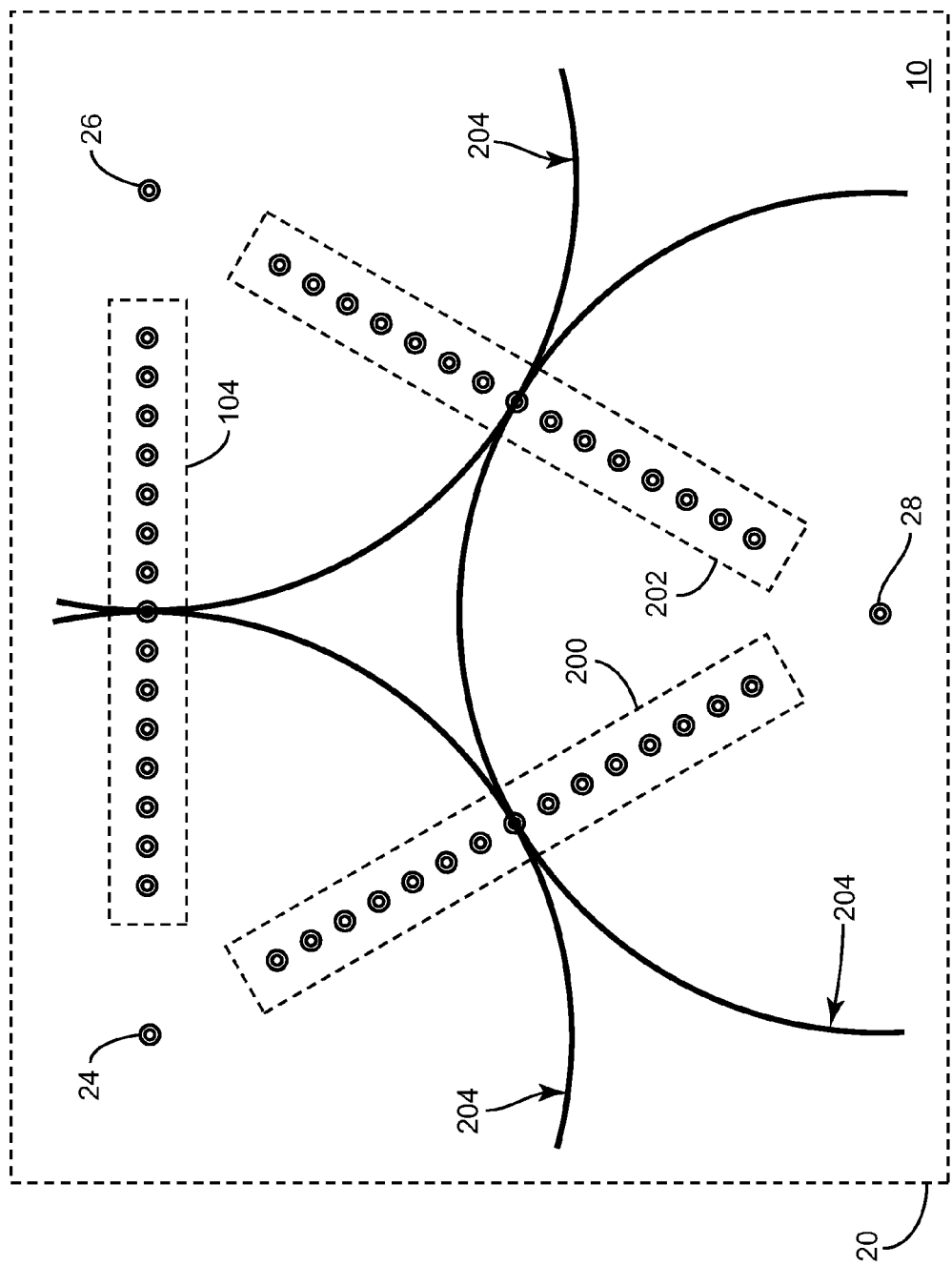
FIG. 40 shows a set of waves transmitted from transponders illustrated in FIG. 33 according to an exemplary embodiment of the polychronous wave propagation system.
Figure 41:
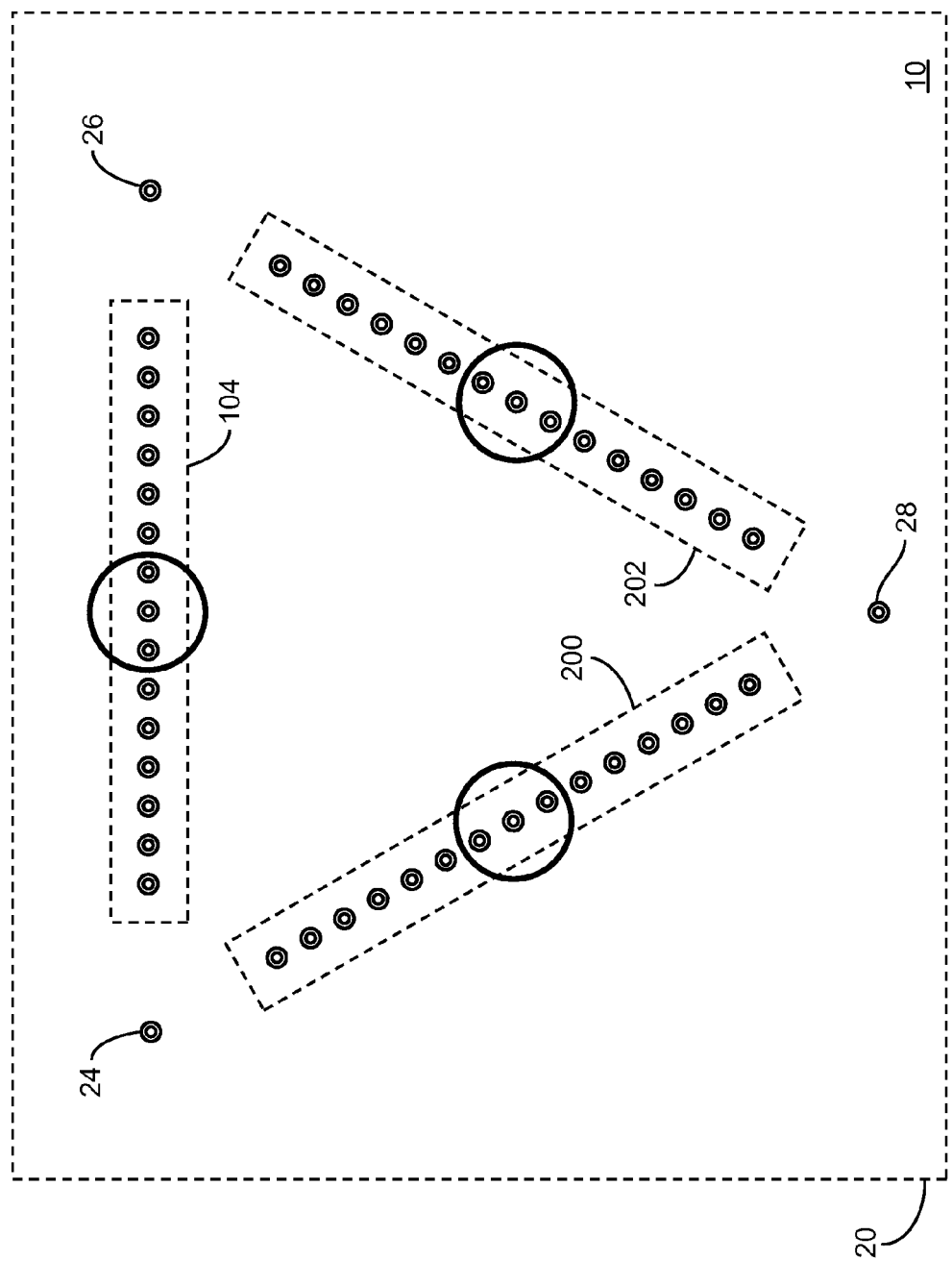
FIG. 41 shows a set of waves transmitted from transponders in transponder arrays illustrated in FIG. 40 that identify results of a division by two.

A special case for division using the polychronous wave propagation system 20 is division by two. FIG. 40 shows one set of waves transmitted from the transponders 24, 26, 28 illustrated in FIG. 33 according to an exemplary embodiment of the polychronous wave propagation system 20. The first set 204 of waves is transmitted at t=0 simultaneously from the transponders 24, 26, 28. FIG. 40 shows the first set 204 of waves arriving at transponders in the transponder arrays 104, 200, 202 that represent the parabolas of intersection 164 (not shown) associated with the middle spatial value $\xi_{MV}$, which occurs when t=D/2, as previously shown in FIG. 25. In this regard, the transponders in the transponder arrays 104, 200, 202 that represent the parabolas of intersection 164 (not shown) associated with the middle spatial value $\xi_{MV}$ are directly representative of division by two. Further, each of these transponders is selected by simultaneously receiving two waves from the first set 204 of waves. Due to symmetry in the arrangement of the transponder arrays 104, 200, 202, the selected transponders form a reverberating memory cell. In this regard, the results of the division by two may be stored. FIG. 41 shows a set of waves transmitted from the selected transponders illustrated in FIG. 40 that identify results of the division by two illustrated in FIG. 40. The waves will re-trigger the selected transponders to provide the reverberating memory cell. Division by two may be useful in manipulations of binary numbers. As such, each medium in the wave propagation media 10, 208, 210, 212 (FIG. 36) may be associated with a corresponding binary digit and the results may be stored in a similar manner as shown in FIGS. 40 and 41.

Additional embodiments of the present disclosure are included in Appendix 1 and Appendix 2.

Some of the circuitry previously described may use discrete circuitry, integrated circuitry, programmable circuitry, non-volatile circuitry, volatile circuitry, software executing instructions on computing hardware, firmware executing instructions on computing hardware, the like, or any combination thereof. The computing hardware may include mainframes, micro-processors, micro-controllers, DSPs, the like, or any combination thereof.

None of the embodiments of the present disclosure are intended to limit the scope of any other embodiment of the present disclosure. Any or all of any embodiment of the present disclosure may be combined with any or all of any other embodiment of the present disclosure to create new embodiments of the present disclosure.

Those skilled in the art will recognize improvements and modifications to the preferred embodiments of the present invention. All such improvements and modifications are considered within the scope of the concepts disclosed herein and the claims that follow.

What is claimed is:

1. A reverberating memory device comprising:
    a plurality of transponders, wherein each of the plurality of transponders is configured to detect simultaneous reception of memory pulses in a ferromagnetic material and transmit a memory pulse in the ferromagnetic material upon detecting each simultaneous reception of memory pulses wherein a first logic state corresponds to a state in which the simultaneous reception of memory pulses are regularly detected, and a second logic state corresponds to a state in which the simultaneous reception of memory pulses are not regularly detected; and
    control circuitry configured to:
        receive an indication from at least one of the plurality of transponders that is representative of one of the first logic state and the second logic state; and
        provide an output based on the indication.

2. The reverberating memory device of claim 1 wherein to store information in the reverberating memory device, the control circuitry is further configured to:
    instruct at least two of the plurality of transponders to initiate transmission of the memory pulses in the ferromagnetic material when storing the first logic state; and
    instruct the at least two of the plurality of transponders to not initiate transmission of the memory pulses in the ferromagnetic material when storing the second logic state.

3. The reverberating memory device of claim 1 wherein a longest dimension of the ferromagnetic material is less than about one meter.

4. The reverberating memory device of claim 1 wherein the plurality of transponders are disposed in fixed positions in the ferromagnetic material.

5. A reverberating memory device comprising:
    a plurality of transponders, wherein each of the plurality of transponders is configured to detect simultaneous reception of memory pulses in a ferromagnetic material and transmit a memory pulse in the ferromagnetic material upon detecting each simultaneous reception of memory pulses wherein a time between successive detections of simultaneous receptions of memory pulses corresponds to a stored value; and
    control circuitry configured to:
        determine the time from at least one of the plurality of transponders;
        determine the stored value based on the time; and
        provide the stored value as an output, wherein the stored value changes as the time changes.

6. The reverberating memory device of claim 5 wherein to write the stored value, the control circuitry is further configured to instruct at least two of the plurality of transponders to initiate transmission of the memory pulses in the ferromagnetic material such that the successive detections of simultaneous receptions of memory pulses are separated by the time.

7. The reverberating memory device of claim 5 wherein a longest dimension of the ferromagnetic material is less than about one meter.

8. The reverberating memory device of claim 5 wherein the plurality of transponders are disposed in fixed positions in the ferromagnetic material.

9. An apparatus comprising:
- a plurality of initiators, each initiator configured to transmit waves in a ferromagnetic material;
- a plurality of responders, each responder configured to detect simultaneous reception of waves, and upon detecting the simultaneous reception of waves, provide a signal identifying the responder; and
- control circuitry configured to:
  - instruct at least two of the plurality of initiators to initiate waves in the ferromagnetic material;
  - identify at least one of the plurality of responders that detected the simultaneous reception of waves based on the signal from each responder that detected the simultaneous reception of waves; and
  - determine an output based on the at least one of the plurality of responders that detected the simultaneous reception of waves.

10. The apparatus of claim 9 wherein to instruct the at least two of the plurality of initiators to initiate waves in the ferromagnetic material, the control circuitry is further configured to instruct a first initiator of the at least two of the plurality of initiators to initiate a first wave at a first time and instruct a second initiator of the at least two of the plurality of initiators to initiate a second wave at a second time.

11. The apparatus of claim 10 wherein the output is further based on the first time and the second time.

12. The apparatus of claim 9 wherein to instruct the at least two of the plurality of initiators to initiate waves in the ferromagnetic material, the control circuitry is further configured to instruct a first initiator of the at least two of the plurality of initiators to initiate a first wave at a first time and instruct a second initiator of the at least two of the plurality of initiators to initiate a second wave at the first time.

13. The apparatus of claim 9 wherein at least one of the plurality of responders and at least one of the plurality of initiators form a transponder.

14. The apparatus of claim 13 wherein the transponder is configured to initiate a wave in the ferromagnetic material upon detecting a simultaneous reception of waves.

15. The apparatus of claim 9 wherein the at least one of the plurality of responders that detected the simultaneous reception of waves is representative of at least one result of at least one Boolean function.

16. The apparatus of claim 9 wherein the at least one of the plurality of responders that detected the simultaneous reception of waves is representative of results of an arithmetical computation.

17. The apparatus of claim 16 wherein the arithmetical computation is a multiplication.

18. The apparatus of claim 16 wherein the arithmetical computation is a division.

19. The apparatus of claim 9 wherein a longest dimension of the ferromagnetic material is less than about one meter.

20. The apparatus of claim 9 wherein the plurality of responders and the plurality of initiators are disposed in fixed positions in the ferromagnetic material.

* * * * *